US012018386B2

(12) United States Patent
Wang et al.

(10) Patent No.: US 12,018,386 B2
(45) Date of Patent: Jun. 25, 2024

(54) MAGNETIC MATERIAL INCLUDING $\alpha''$-$Fe_{16}(N_xZ_{1-x})_2$ OR A MIXTURE OF $\alpha''$-$Fe_{16}Z_2$ AND $\alpha''$-$Fe_{16}N_2$, WHERE Z INCLUDES AT LEAST ONE OF C, B, OR O

(71) Applicant: Regents of the University of Minnesota, Minneapolis, MN (US)

(72) Inventors: Jian-Ping Wang, Shoreview, MN (US); Bin Ma, Minneapolis, MN (US); Guannan Guo, Pinellas Park, FL (US)

(73) Assignee: Regents of the University of Minnesota, Minneapolis, MN (US)

( * ) Notice: Subject to any disclaimer, the term of this patent is extended or adjusted under 35 U.S.C. 154(b) by 631 days.

(21) Appl. No.: 16/949,038

(22) Filed: Oct. 9, 2020

(65) Prior Publication Data

US 2021/0123126 A1 Apr. 29, 2021

Related U.S. Application Data

(60) Provisional application No. 62/914,230, filed on Oct. 11, 2019.

(51) Int. Cl.

| | |
|---|---|
| ***H01F 1/147*** | (2006.01) |
| ***B22D 23/00*** | (2006.01) |
| ***C22C 38/00*** | (2006.01) |
| ***C23C 8/34*** | (2006.01) |
| ***C23C 8/80*** | (2006.01) |

(52) U.S. Cl.

CPC ................ *C23C 8/34* (2013.01); *B22D 23/00* (2013.01); *C22C 38/001* (2013.01); *C23C 8/80* (2013.01); *H01F 1/147* (2013.01)

(58) Field of Classification Search

CPC ....................................................... H01F 1/147

See application file for complete search history.

(56) References Cited

U.S. PATENT DOCUMENTS

| | | | | |
|---|---|---|---|---|
| 5,032,947 | A | | 7/1991 | Li et al. |
| 5,068,147 | A | | 11/1991 | Hori et al. |
| 5,137,588 | A | | 8/1992 | Wecker et al. |
| 5,330,554 | A | | 7/1994 | Koyano et al. |
| 5,449,417 | A | | 9/1995 | Shimizu et al. |
| 5,617,275 | A | | 4/1997 | Ogura et al. |
| 6,053,989 | A | * | 4/2000 | Orillion ................ C22C 33/003 148/307 |
| 6,139,765 | A | | 10/2000 | Kitazawa et al. |
| 6,217,672 | B1 | | 4/2001 | Zhang |
| 6,319,485 | B1 | | 11/2001 | Nagatomi et al. |
| 6,457,629 | B1 | | 10/2002 | White |
| 6,778,358 | B1 | | 8/2004 | Jiang et al. |
| 6,841,259 | B1 | | 1/2005 | Takahaski et al. |
| 7,238,439 | B2 | | 7/2007 | Sasaki et al. |
| 9,715,957 | B2 | | 7/2017 | Wang et al. |
| 10,072,356 | B2 | | 9/2018 | Wang et al. |
| 2002/0117102 | A1 | | 8/2002 | Takahashi et al. |
| 2002/0191354 | A1 | | 12/2002 | Yoshikawa et al. |
| 2002/0197530 | A1 | | 12/2002 | Tani et al. |
| 2004/0247859 | A1 | | 12/2004 | Sasaki et al. |
| 2005/0208320 | A1 | | 9/2005 | Masada et al. |
| 2006/0105170 | A1 | | 5/2006 | Dobson et al. |
| 2006/0112873 | A1 | | 6/2006 | Uchida et al. |
| 2008/0166584 | A1 | | 7/2008 | Deligianni et al. |
| 2009/0042063 | A1 | | 2/2009 | Inoue et al. |
| 2009/0087688 | A1 | | 4/2009 | Masaki |
| 2010/0035086 | A1 | | 2/2010 | Inoue et al. |
| 2010/0104767 | A1 | | 4/2010 | Sskuma et al. |
| 2010/0288964 | A1 | | 11/2010 | Pirich et al. |
| 2011/0059005 | A1 | | 3/2011 | Sankar et al. |
| 2011/0074531 | A1 | | 3/2011 | Yamashita et al. |
| 2012/0090543 | A1 | | 4/2012 | Cheong |
| 2012/0145944 | A1 | | 6/2012 | Komuro et al. |
| 2012/0153212 | A1 | | 6/2012 | Liu |
| 2013/0126775 | A1 | | 5/2013 | Abe et al. |
| 2013/0140076 | A1 | | 6/2013 | Lee et al. |

(Continued)

FOREIGN PATENT DOCUMENTS

| | | | |
|---|---|---|---|
| CN | 1156516 | A | 8/1997 |
| CN | 1621549 | A | 6/2005 |

(Continued)

OTHER PUBLICATIONS

Slater, "Electronic Structure of Alloys," Journal of Applied Physics, vol. 8, No. 6, Jun. 1937, 8 pp.
Kikkawa et al., "Fine Fe16N2 powder prepared by low-temperature nitridation," Materials Research Bulletin, vol. 43, ScienceDirect, Feb. 19, 2008, 8 pp.
Zayak et al., "First-principles investigations of homogenous lattice-distortive strain and shuffles in Ni2MnGA," Journal of Physics: Condensed Matter, vol. 15, No. 2, Jan. 22, 2003, 8 pp.
Bogaerts et al., "Monte Carlo simulation of an analytical glow discharge: motion of electrons, ions and fast neutrals in the cathode dark space," Elsevier, Spectrochimica Acta, vol. 50B, No. 1, Jan. 1995, 20 pp.
Gagnoud et al., "Electromagnetic Modelling of Induction Melting Devices in Cold Crucible," IEEE Transactions on Magnetics, vol. 24, No. 1, Jan. 1988, 5 pp.

(Continued)

*Primary Examiner* — Jophy S. Koshy

(74) *Attorney, Agent, or Firm* — Shumaker & Sieffert, P.A.

(57) ABSTRACT

The disclosure describes a method that includes forming a soft magnetic material by a technique including melt spinning. The soft magnetic material includes at least one of: at least one of an $\alpha''$-$Fe_{16}(N_xZ_{1-x})_2$ phase domain or an $\alpha'$-$Fe_8(N_xZ_{1-x})$, where Z includes at least one of C, B, or O, and where x is a number greater than zero and less than one; or at least one of an $\alpha''$-$Fe_{16}N_2$ phase domain or an $\alpha'$-$Fe_8N$ phase domain, and at least one of an $\alpha''$-$Fe_{16}Z_2$ phase domain or an $\alpha'$-$Fe_8Z$ phase domain.

23 Claims, 38 Drawing Sheets

(56) References Cited

U.S. PATENT DOCUMENTS

| | | | |
|---|---|---|---|
| 2014/0001398 | A1 | 1/2014 | Takahaski et al. |
| 2014/0008446 | A1 | 1/2014 | Carr |
| 2014/0290434 | A1 | 10/2014 | Matthiesen |
| 2014/0294657 | A1 | 10/2014 | Yamamoto et al. |
| 2014/0299810 | A1 | 10/2014 | Wang et al. |
| 2015/0380135 | A1 | 12/2015 | Wang et al. |
| 2015/0380158 | A1 | 12/2015 | Brady et al. |
| 2016/0042846 | A1 | 2/2016 | Wang et al. |
| 2016/0042849 | A1 | 2/2016 | Wang et al. |
| 2016/0141082 | A1 | 5/2016 | Wang et al. |
| 2016/0189836 | A1 | 6/2016 | Takahaski et al. |
| 2017/0186518 | A1 | 6/2017 | Wang |
| 2017/0243680 | A1 | 8/2017 | Wang et al. |

FOREIGN PATENT DOCUMENTS

| | | | |
|---|---|---|---|
| CN | 102576591 | A | 7/2012 |
| CN | 103339694 | A | 10/2013 |
| CN | 103827986 | A | 5/2014 |
| CN | 105849834 | A | 6/2014 |
| EP | 0509361 | A2 | 10/1992 |
| EP | 0633581 | A1 | 1/1995 |
| EP | 0994493 | A2 | 4/2000 |
| EP | 1548760 | A2 | 6/2005 |
| EP | 1675133 | A2 | 6/2006 |
| EP | 2492927 | A1 | 8/2012 |
| EP | 2666563 | A1 | 11/2013 |
| EP | 2696356 | A1 | 2/2014 |
| JP | S61143557 | A | 7/1986 |
| JP | S61157634 | A | 7/1986 |
| JP | 62232101 | A | 10/1987 |
| JP | S63132701 | A | 6/1988 |
| JP | H02173209 | A | 7/1990 |
| JP | H02212320 | A | 8/1990 |
| JP | H03100124 | A | 4/1991 |
| JP | H04217305 | A | 8/1992 |
| JP | H05269503 | A | 10/1993 |
| JP | H05311390 | A | 11/1993 |
| JP | H05326239 | A | 12/1993 |
| JP | H0696947 | A | 4/1994 |
| JP | H06267722 | A | 9/1994 |
| JP | H06311390 | A | 11/1994 |
| JP | 2000176513 | A | 6/2000 |
| JP | 2001135508 | A | 5/2001 |
| JP | 2001176715 | A | 6/2001 |
| JP | 2002334695 | A | 11/2002 |
| JP | 2004319923 | A | 11/2004 |
| JP | 2005183932 | A | 7/2005 |
| JP | 2006155894 | A | 6/2006 |
| JP | 2007070669 | A | 3/2007 |
| JP | 2007273038 | A | 10/2007 |
| JP | 2008311518 | A | 12/2008 |
| JP | 2009259402 | A | 11/2009 |
| JP | 2012190156 | A | 10/2012 |
| JP | 2012193409 | A | 10/2012 |
| JP | 2012246174 | A | 12/2012 |
| JP | 2013069926 | A | 4/2013 |
| JP | 2013080922 | A | 5/2013 |
| JP | 2013102122 | A | 5/2013 |
| KR | 1020120091091 | A | 8/2012 |
| TW | 272293 | B | 3/1996 |
| TW | 303072 | B | 11/2008 |
| TW | 201249564 | A | 12/2012 |
| TW | 201447934 | A | 12/2014 |
| WO | WO 0193286 | A1 | 12/2001 |
| WO | WO 2011049080 | A1 | 4/2011 |
| WO | WO 2012159096 | A2 | 11/2012 |
| WO | WO 2013026007 | A2 | 2/2013 |
| WO | WO 2013042721 | A1 | 3/2013 |
| WO | WO 2013090895 | A1 | 6/2013 |
| WO | WO 2014124135 | A2 | 8/2014 |
| WO | WO 2014210027 | A1 | 12/2014 |
| WO | WO 2015148810 | A1 | 10/2015 |
| WO | WO 2016022685 | A1 | 2/2016 |
| WO | WO 2016022711 | A1 | 2/2016 |
| WO | WO 2016122971 | A1 | 8/2016 |
| WO | WO 2016122987 | A1 | 8/2016 |
| WO | WO 2016122712 | A1 | 8/2017 |

OTHER PUBLICATIONS

Sakuma, "Electronic and Magnetic Structure of Iron Nitride, Fe16N2 (invited)," Journal of Applied Physics, vol. 79, No. 8, Apr. 15, 1996, 8 pp.

Resta, "Ab initio study of tetragonal variants in Ni2MnGa alloy," Journal of Physics: Condensed Matter, vol. 14, No. 20, May 27, 2002, 14 pp.

Becke, "Density-Functional Exchange-Energy Approximation With Correct Asymptotic Behavior," Physical Review A General Physics, vol. 38, No. 6, Sep. 15, 1988, 4 pp.

Floris et al., "Vibrational Properties of MnO and NiO from DFT + U-Based Density Functional Perturbation Theory," Physical Review B Condensed Matter, vol. 84, Oct. 2011, 6 pp.

Liechtenstein et al., "Density-Functional Theory and Strong Interactions: Orbital Ordering in Mott-Hubbard Insulators," Physical Review B Condensed Matter, vol. 52, No. 8, Aug. 15, 1995, 5 pp.

Vasil'Ev et al., "Structural and Magnetic Phase Transitions in Shape-Memory Alloys Ni2+xMn1-xGa," Physical Review B: Condensed Matter and Materials Physics, vol. 59. No. 2, Jan. 1, 1999, pp. 1113-1120.

Sozinov et al., "Crystal Structures and Magnetic Anisotropy Properties of Ni—Mn—Ga Martensitic Phases With Giant Magnetic-Field-Induced Strain," IEEE Transactions on Magnetics, vol. 38, No. 5, Sep. 2002, pp. 2814-2816.

Zayak et al., "Switchable Ni—Mn—Ga Heusler nanocrystals," Journal of Applied Physics vol. 104, No. 7, Oct. 2008, 6 pp.

Likhachev et al., "Modeling the Strain Response, Magneto-Mechanical Cycling Under the External Stress, Work Output and Energy Losses in Ni—Mn—Ga," Mechanics of Materials, vol. 38, May 2006 pp. 551-563.

Morisako et al., "Magnetic Anisotropy and Soft Magnetism of Iron Nitride Thin Films Prepared by Facing-Target Sputtering," Journal of Applied Physics, vol. 69, No. 8, Apr. 15, 1991, pp. 5619-5621.

Jordan et al., "Magnetic Fluid Hyperthermia (MFH): Cancer Treatment with AC Magnetic Field Induced Excitation of Biocompatible Superparamagnetic Nanoparticles," Journal of Magnetism and Magnetic Materials vol. 201, Jul. 1, 1999 pp. 413-419.

Chakrabarti et al., "Influence of Ni Doping on the Electronic Structure of Ni2MnGa," Physical Review B vol. 72, Aug. 5, 2005, 4 pp.

Kirby et al., "Anomalous ferromagnetism in TbMnO3 thin films," Journal of Applied Physics, vol. 105, No. 7, Apr. 2009, 5 pp.

"2014 Titans of Technology—Jian-Ping Wang," Minneapolis/St. Paul Business Journal, Sep. 19, 2014, 18 pp.

Brady et al., "The Formation of Protective Nitride Surfaces for PEM Fuel Cell Metallic Bipolar Plates," Journal of the Minerals, Aug. 2006, pp. 50-57.

Himmetoglu, et al., "First-Principles Study of Electronic and Structural Properties of CuO," Physical Review B. vol. 84, Sep. 14, 2011, 8 pp.

Wedel et al., "Low Temperature Crystal Structure of Ni—Mn—Ga Alloys," Journal of Alloys and Compounds, vol. 290, Aug. 30, 1999 pp. 137-143.

Min, "Enhancement of Fe Magnetic Moments in Ferromagnetic Fe16B2, Fe16C2, And Fel6N2," International Journal of Modern Physics B. vol. 7, No. 1-3, Jan. 1993, pp. 729-732.

Bozorth, "Atomic Moments of Ferromagnetic Alloys," The Physical Review, vol. 79, No. 5, Sep. 1, 1950. pp. 887.

Rong et al., "Fabrication of Bulk Nanocomposite Magnets Via Severe Plastic Deformation and Warm Compaction," Applied Physics Letters, vol. 96, No. 10, Mar. 8, 2010, 3 pp.

Lorenz et al., "Precise Determination of the Bond Percolation Thresholds and Finite-Size Scaling Corrections for the sc, fcc, and bcc Lattices," Physical Review E, vol. 57, No. 1, Jan. 1998, pp. 230-236.

Majkrzak, "Polarized Neutron Reflectometry," Physica B: Condensed Matter, vol. 173, No. 1 & 2, Aug. 1991, 16 pp.

(56) References Cited

OTHER PUBLICATIONS

Opeil et al., "Combined Experimental and Theoretical Investigation of the Premartensitic Transition in Ni2MnGa," Physical Review Letters, vol. 100, Apr. 25, 2008, 4 pp.
Gao et al., "Quantitative Correlation of Phase Structure With the Magnetic Moment in rf Sputtered Fe—N Films," Journal of Applied Physics, vol. 73, No. 10, May 15, 1993, pp. 6579-6581.
Ortiz et al., "Epitaxial Fe16N2 Films Grown by Sputtering," Applied Physics Letters, vol. 65. No. 21, Nov. 21, 1994, pp. 2737-2739.
Cheng et al., "Tempering of Iron-Carbon-Nitrogen Martensites," Metallurgical Transactions A: Physical Metallurgy and Materials Science, vol. 23A, No. 4, Apr. 1992, pp. 1129-1145.
Chikazumi, "Physics of Ferromagnetism," Oxford Science Publications, Ed. 2, 1999, pp. 199-203. (Applicant points out, in accordance with MPEP 609.04(a), that the year of publication, 1997, is sufficiently earlier than the effective U.S. filing date, so that the particular month of publication is not in issue.).
Wehrenberg et al., "Shock Compression Response of a"-Fe16N2 Nanoparticles," Journal of Applied Physics, vol. 111, No. 8, Apr. 23, 2012, 8 pp.
Ceperley et al., "Ground State of the Electron Gas by a Stochastic Method," Physical Review Letters, vol. 45, No. 7, Aug. 18, 1980, pp. 566-569.
Borsa et al., "Phase Identification of Iron Nitrides and Iron Oxy-Nitrides with M?ssbauer Spectroscopy," Hyperfine Interactions, vol. 151/152, Dec. 2003, pp. 31-48.
Cook, "Strain Induced Martensite Formation in Stainless Steel," Metallurgical Transactions A, vol. 18A, No. 2, Feb. 1987, pp. 201-210.
Sun et al., "Epitaxial Single Crystal Fe16N2 Films Grown by Facing Targets Sputtering," Journal of Applied Physics, vol. 79, No. 8, Apr. 15, 1996, pp. 5440-5442.
Ping et al., "Partitioning of Ga and Co Atoms in a Fe3B/Nd2Fe14B Nanocomposite Magnet," Journal of Applied Physics, vol. 83, No. 12, Jun. 15, 1998, pp. 7769-7775.
Scherlis et al., "Simulation of Heme Using DFT + U: A Step Toward Accurate Spin-State Energetics," The Journal of Physical Chemistry, vol. 111, No. 25, Apr. 21, 2007, pp. 7384-7391.
Jugovic et al., "A Review of Recent Developments in the Synthesis Procedures of Lithium Iron Phosphate Powders," Journal of Power Sources, vol. 190, Feb. 6, 2009, pp. 538-544.
Fullerton et al., "Structure and Magnetic Properties of Exchange-Spring Sm—Co/Co Superlattices," Applied Physics Letters vol. 72, No. 3, Jan. 19, 1998, pp. 380-382.
Van Voorthuysen et al., "Low-Temperature Extension of the Lehrer Diagram and the Iron-Nitrogen Phase Diagram," Metallurgical and Materials Transactions A: Physical Metallurgy and Materials Science, vol. 33A, No. 8, Aug. 2002, pp. 2593-2598.
Kita et al., "Magnetic Properties of Core-Shell Type Fe16N2 Nanoparticles," Journal of Magnetism and Magnetic Materials, vol. 310, Nov. 21, 2006, pp. 2411-2413.
Kneller et al., "The Exchange-Spring Magnet: A New Material Principle for Permanent Magnets," IEEE Transaction on Magnetics, vol. 27, No. 4, Jul. 1991, pp. 3588-3600.
Lavernia et al., "The Rapid Solidification Processing of Materials: Science, Principles, Technology, Advances, and Applications," Journal of Material Science, vol. 45, Dec. 1, 2009, pp. 287-325.
Casoli et al., "Exchange-Coupled FePt/Fe Bilayers with Perpendicular Magnetization," IEEE Transactions on Magnetics, vol. 41, No. 10, Oct. 2005, pp. 3877-3879.
Zhou et al., "Phase Separation in LixFePO4 Induced by Correlation Effects," Physical Review B, vol. 69, May 12, 2004, 4 pp.
Zhou et al., "First-Principles Prediction of Redox Potentials in Transition-Metal Compounds with LDA+U," Physical Review B. vol. 70, Dec. 20, 2004, 8 pp.
Zhou et al., "The Li Intercalation Potential of LiMPO4 and LiMSiO4 Olivines with M=Fe, Mn, Co, Ni," Electrochemistry Communications, vol. 6, Sep. 25, 2004, pp. 1144-1148.
Zhou et al., "Configurational Electronic Entropy and the Phase Diagram of Mixed-Valence Oxides: The Case of LixFePO4," Physical Review Letters, vol. 97, Oct. 13, 2006, 4 pp.
Herzer, "Grain Size Dependence of Coercivity and Permeability in Nanocrystalline Ferromagnets," IEEE Transactions on Magnetics, vol. 26, No. 5, Sep. 1990, pp. 1397-1402.
Ludtka et al., "In Situ Evidence of Enhanced Transformation Kinetics in a Medium Carbon Steel Due to a High Magnetic Field," Scripta Materialia, vol. 51, Apr. 20, 2004, pp. 171-174.
Felcher, "Neutron Reflection as a Probe of Surface Magnetism," Physical Review B: Condensed Matter, vol. 24, No. 3, Aug. 1, 1981, pp. 1595-1598.
Speich et al., "Elastic Constants of Binary Iron-Base Alloys," Metallurgical Transactions, vol. 3, No. 8, Aug. 1972, pp. 2031-2037.
Fernando et al., "Magnetic Moment of Iron in Metallic Environments," Physical Review B, vol. 61, No. 1, Jan. 1, 2000, pp. 375-381.
Felcher, "Magnetic Depth Profiling Studies by Polarized Neutron Reflection," Physica B: Condensed Matter, vol. 192, Nos. 1 & 2, Oct. 1993, pp. 137-149.
Gaunt, "The Magnetic Properties of Platinum Cobalt Near the Equiatomic Composition Part II. Mechanism of Magnetic Hardening," The Philosophical Magazine, vol. 13, No. 123, Mar. 1966, pp. 579-588.
Takahashi et al., "a"-Fe16N2 Problem—Giant Magnetic Moment Or Not," Journal of Magnetism and Magnetic Materials, vol. 208, No. 3, Jan. 11, 2000, pp. 145-157.
Shokrollahi et al., "Soft Magnetic Composite Materials (SMCs)," Journal of Materials Processing Technology, vol. 189, Feb. 20, 2007, pp. 1-12.
Sugita et al., "Magnetic and Electrical Properties of Single-Phase, Single-Crystal Fe16N2 Films Epitaxially Grown by Molecular Beam Epitaxy (Invited)," Journal of Applied Physics, vol. 79, No. 8, Apr. 15, 1996, pp. 5576-5581.
Takahashi et al., "Perpendicular Uniaxial Magnetic Anisotropy of Fe16N2(001) Single Crystal Films Grown by Molecular Beam Epitaxy," IEEE Transactions on Magnetics, vol. 35, No. 5, Sep. 1999, pp. 2982-2984.
Tanaka et al., "Electronic Band Structure and Magnetism of Fe16N2 Calculated by the FLAPW Method," Physical Review B: Condensed Matter and Materials Physics, vol. 62, No. 22, Dec. 1, 2000, pp. 15042-15046.
Zeng et al., "Exchange-Coupled Nanocomposite Magnets by Nanoparticle Self-Assembly," Nature, vol. 420, No. 6914, Nov. 28, 2002, pp. 395-398.
Du, "A Reevaluation of the Fe—N and Fe—C—N Systems," Journal of Phase Equilibria, vol. 14, No. 6, Aug. 24, 1993, pp. 682-693.
Jiang et al., "The Thermostability of the Fe16N2 Phase Deposited on a GaAs Substrate by Ion-Bean-Assisted Deposition," Journal of Physical Condensed Matter, vol. 6, Mar. 17, 1994, pp. L279-L282.
Jan et al., "Monte Carlo Simulations of Spin-1/2 Micelle and Microemulsion Models," Journal De Physique, vol. 49, No. 4, Apr. 1988, pp. 623-633.
Nelson, "Epitaxial Growth From The Liquid State and Its Application To The Fabrication of Tunnel and Laser Diodes," RCA Review, vol. 24, No. 4, Dec. 1963, pp. 603-615.
Shinno et al., "Effects of Film Thickness on Formation Processes of Fe16N2 in Nitrogen Ion-Implanted Fe Films," Surface and Coatings Technology vol. 103-104, May 1998, pp. 129-134.
Takahashi et al., "Ferromagnetic Resonance Studies of Fe16N2 Films with a Giant Magnetic Moment," Journal of Applied Physics, vol. 73, No. 10, May 15, 1993, pp. 6060-6062.
Shimba et al., "Preparation of Iron Nitride Fe16N2 Nanoparticles by Reduction of Iron Nitrate," J. Japan Inst. Metals, vol. 74, No. 3, 2010, 5 pp. (Applicant points out, in accordance with MPEP 609.04(a), that the year of publication, 2010, is sufficiently earlier than the effective U.S. filing date, Aug. 8, 2014, so that the particular month of publication is not in issue.).
Hook et al., "Magnetic Order," Solid State Physics, Ed. 2, Ch. 8, 1991, pp. 219-252. (Applicant points out, in accordance with MPEP 609.04(a), that the year of publication, 1991, is sufficiently earlier

(56) References Cited

OTHER PUBLICATIONS than the effective U.S. filing date, Aug. 8, 2014, so that the particular month of publication is not in issue.).
Hsu et al., "First-Principles Study for Low-Spin LaCoO3 with a Structurally Consistent Hubbard U," Physical Review B, vol. 79, Mar. 31, 2009, 9 pp.
Hsu et al., "Spin-State Crossover and Hyperfine Interactions of Ferric Iron in MgSiO3 Perovskite," Physical Review Letters, vol. 106, Mar. 18, 2011, 4 pp.
McCurrie, "Chapter 3: The Structure and Properties of Alinco Permanent Magnet Alloys," Handbook of Ferromagnetic Materials, vol. 3, 1982, 82 pp. (Applicant points out, in accordance with MPEP 609.04(a), that the year of publication, 1982, is sufficiently earlier than the effective U.S. filing date, Aug. 8, 2014, so that the particular month of publication is not in issue.).
Kulik et al., "Density Functional Theory in Transition-Metal Chemistry: A Self-Consistent Hubbard U Approach," Physical Review Letters, vol. 97, Sep. 8, 2006, 4 pp.
Bae et al., "Cost Effective Parallel-Branch Spiral Inductor with Enhanced Quality Factor and Resonance Frequency," Electronics and Telecommunications Research Institute, 2007, pp. 87-90. (Applicant points out, in accordance with MPEP 609.04(a), that the year of publication, 2007, is sufficiently earlier than the effective U.S. filing date, Aug. 8, 2014, so that the particular month of publication is not in issue.).
Galanakis et al., "Spin-Polarization and Electronic Properties of Half-Metallic Heusler Alloys Calculated from First Principles," Journal of Physics: Condensed Matter, vol. 19, No. 31, Jul. 3, 2007 (online), 16 pp.
Al-Omari et al., "Magnetic Properties of Nanostructured CoSm/FeCo Films," Physical Review B, vol. 52, No. 5, Aug. 1, 1995, pp. 3441-3447.
Mazin et al., "Insulating Gap in FeO: Correlations and Covalency," Physical Review B, vol. 55, No. 19, May 15, 1997, pp. 12822-12825.
Solovyev et al., "Corrected Atomic Limit in the Local-Density Approximation and the Electronic Structure of d Impurities in Rb," Physical Review B, vol. 50, No. 23, Dec. 15, 1994, pp. 16861-16871.
Campos et al., "Evaluation of the Diffusion Coefficient of Nitrogen in Fe4N1-x Nitride Layers During Microwave Post-Discharge Nitriding," Applied Surface Science, vol. 249, Dec. 30, 2004, pp. 54-59.
Issakov et al., "Fast Analytical Parameters Fitting of Planar Spiral Inductors," 2008 IEEE International Conference on Microwaves, Communications, Antennas and Electronic Systems, May 13-14, 2008, 10 pp.
Borchers et al., "Observation of Antiparallel Magnetic Order in Weakly Coupled Co/Cu Multilayers," Physical Review Letters, vol. 82, No. 13, Mar. 29, 1999, pp. 2796-2799.
Takahashi et al., "Structure and Magnetic Moment of a"-Fe16N2 Compound Films: Effect of Co and H on Phase Formation (Invited)," Journal of Applied Physics, vol. 79, No. 8, Apr. 15, 1996, pp. 5564-5569.
Buschbeck et al., "Full Tunability of Strain Along the fcc-bcc Bain Path in Epitaxial Films and Consequences for Magnetic Properties," Physical Review Letters, vol. 103, Nov. 20, 2009, 4 pp.
Chakhalian et al., "Magnetism at the Interface Between Ferromagnetic and Superconducting Oxides," Nature Physics, vol. 2, Apr. 1, 2006, pp. 244-248.
Cui et al., "Phase Transformation and Magnetic Anisotropy of an Iron-Palladium Ferromagnetic Shape-Memory Alloy," Acta Materialia, vol. 52, No. 1, Jan. 5, 2004, 35-47.
Davies et al., "Anisotropy Dependence of Irreversible Switching in Fe/SmCo and FeNi/FePt Exchange Spring Magnet Films," Applied Physics Letters, vol. 86, No. 26, Jun. 27, 2005, 3 pp.
Herbst et al., "Neodymium-Iron-Boron Permanent Magnets," Journal of Magnetism and Magnetic Materials, vol. 100, Nos. 1-3, Nov. 1991, pp. 57-78.
Fidler et al., "Recent Developments in Hard Magnetic Bulk Materials," Journal of Physics: Condensed Matter, vol. 16, Jan. 23, 2004, pp. 455-470.
Haenl et al., "Room-Temperature Ferroelectricity in Strain SrTiO3," Nature, vol. 430, Aug. 12, 2004, pp. 758-761.
Hoppler et al., "Giant Superconductivity-Induced Modulation of the Ferromagnetic Magnetization in a Cuprate-Manganite Superlattice," Nature Materials, vol. 8, Apr. 2009, pp. 315-319.
Coey, "The Magnetization of Bulk a"-Fe16N2 (Invited)," Journal of Applied Physics, vol. 76, No. 19, Nov. 15, 1994, pp. 6632-6636.
Coey et al., "The Magnetization of a"-Fe16N2," Journal of Physics: Condensed Matter, vol. 6, Sep. 27, 1993, pp. 23-28.
Coey, "Magic Moments in Magnetism," Physics World, vol. 6, No. 8, Aug. 1993, pp. 25-26.
Qiu et al., "Tuning the Crystal Structure and Magnetic Properties of FePt Nanomagnets," Advanced Materials, vol. 19, Jun. 6, 2007, pp. 1703-1706.
Wang, "FePt Magnetic Nanoparticles and Their Assembly for Future Magnetic Media," Proceedings of the IEEE, vol. 96, No. 11, Nov. 2008, pp. 1847-1863.
Qiu et al., "Monodispersed and Highly Ordered L10 FePt Nanoparticles Prepared in the Gas Phase," Applied Physics Letters, vol. 88, May 9, 2006, 3 pp.
Qiu et al., "In Situ Magnetic Field Alignment of Directly Ordered L10 FePt Nanoparticles," Applied Physics Letters, vol. 89, Nov. 29, 2006, 3 pp.
Liu et al., "High Energy Products in Rapidly Annealed Nanoscale Fe/Pt Multilayers," Applied Physics Letters, vol. 72, No. 4, Jan. 26, 1998, pp. 483-485.
Wang et al., "Fabrication of Fe16N2 Films by Sputtering Process and Experimental Investigation of Origin of Giant Saturation Magnetization in Fe16N2," IEEE Transactions on Magnetics, vol. 48, No. 5, May 2012, pp. 1710-1717.
Shi et al., "Diamond-Like Carbon Films Prepared by Facing-Target Sputtering," Thin Solid Films, vols. 420-421, Dec. 2, 2002, pp. 172-175.
Jiang et al., "Improving Exchange-Spring Nanocomposite Permanent Magnets," Applied Physics Letters, vol. 85, No. 22, Nov. 29, 2004, pp. 5293-5295.
Zhou et al., "Permanent-Magnet Properties of Thermally Processed FePt and FePt—Fe Multilayer Films," IEEE Transactions on Magnetics, vol. 38, No. 5, Sep. 2002, pp. 2802-2804.
MacLaren, "Role of Alloying on the Shape Memory Effect in Ni2MnGa," Journal of Applied Physics, vol. 91, No. 10, May 15, 2002, pp. 7801-7803.
Perdew et al., "Self-Interaction Correction to Density-Functional Approximations for Many-Electron Systems," Physical Review B, vol. 23, No. 10, May 15, 1981, pp. 5048-5079.
Dong et al., "Shape Memory and Ferromagnetic Shape Memory Effects in Single-Crystal Ni2MnGa Thin Films," Journal of Applied Physics, vol. 95, No. 5, Mar. 1, 2004, pp. 2593-2600.
Bland et al., "Ferromagnetic Moments in Metastable Magnetic Films by Spin-Polarized-Neutron Reflection," Physical Review Letters, vol. 58, No. 12, Mar. 23, 1987, pp. 1244-1247.
Bland et al., "Layer Selective Magnetometry in Ultrathin Magnetic Structures by Polarised Neutron Reflection," Journal of Magnetism and Magnetic Materials, vol. 165, Jun. 1997, pp. 46-51.
Ji et al., "Elemental Specific Study on FeCo—Au nanoparticles," [Abstract] Bulletin of the American Physical Society, APS Meeting 2010, vol. 55, No. 2, Mar. 15-19, 2010, 1 pp.
Coey, "Permanent Magnet Applications" Journal of Magnetism and Magnetic Materials, vol. 248, Apr. 24, 2002, pp. 441-456.
Zhang et al., "Polarizer angular dependence of spin transfer oscillation in magnetic tunnel junction," [Abstract] Bulletin of the American Physical Society, APS Meeting 2010, vol. 55, No. 2, Mar. 15-19, 2010, 1 pp.
Kronmüller et al., "Micromagnetic Analysis of the Magnetic Hardening Mechanisms in RE—Fe—B Magnets," Journal De Physique, C8, No. 12, Tome 49, Dec. 1988, 6 pp.
Tang et al., "Formation of Nanocrystalline Fe—N—B—Cu Soft Magnetic Ribbons," Journal of Non-Crystalline Solids, vol. 337, Sep. 9, 2003, pp. 276-279.

(56) References Cited

OTHER PUBLICATIONS

Chen et al., "Modeling of On-Chip Differential Inductors and Transformers/Baluns," IEEE Transactions on Electron Devices, vol. 54, No. 2, Feb. 2007, pp. 369-371.
Ji et al., "N Site Ordering Effect on Partially Ordered Fe16N2," Applied Physics Letters, vol. 98, No. 9, Feb. 28, 2011, 3 pp.
Ji et al., "Epitaxial High Saturation Magnetization FeN Thin Films on Fe(001) Seeded GaAs(001) Single Crystal Wafer Using Facing Target Sputterings," Journal of Applied Physics, vol. 109, No. 7, Apr. 2011, 6 pp.
Ji et al., "Theory of Giant Saturation Magnetization in a"-Fe16N2: Role of Partial Localization in Ferromagnetism of 3d Transition Metals," New Journal of Physics, vol. 12, Jun. 17, 2010, 8 pp.
Cho, "The Best Refrigerator Magnet Ever?," Science/AAAD News, Science Now, Mar. 19, 2010, retrieved from the internet http://news.sciencemag.org/physics/2010/03/best-refrigerator-magnet-ever?sms_ss=email, 2 pp.
Ji et al., "Perpendicular Magnetic Anisotropy and High Spin-Polarization Ratio in Epitaxial Fe—N Thin Films," Physical Review B, vol. 84, Dec. 14, 2011, 8 pp.
Ziegler, "SRIM—The Stopping and Range of Ions in Matter," retrieved from http://srim.org/ on Oct. 13, 2016, 4 pp.
Jiang et al., "FeN Foils by Nitrogen Ion-Implantation," Journal of Applied Physics, vol. 115, Mar. 12, 2014, 3 pp.
Jiang et al., "9 T High Magnetic Field Annealing Effects on FeN Bulk Sample," Journal of Applied Physics, vol. 115, Mar. 13, 2014, 3 pp.
"International Energy Outlook 2013," U.S. Energy Information Administration, Jul. 2013, 312 pp.
Croat, "Current Status of Rapidly Solidified Nd—Fe—B Permanent Magnets," IEEE Transactions on Magnetics, vol. 25, No. 5, Sep. 1989, pp. 3550-3554.
Perdew et al., "Generalized Gradient Approximation Made Simple," Physical Review Letters, vol. 77, No. 18, Oct. 28, 1996, pp. 3865-3868.
Guo et al., "A Broadband and Scalable Model for On-Chip Inductors Incorporating Substrate and Conductor Loss Effects," IEEE Radio Frequency Integrated Circuits Symposium, Jun. 12-14, 2005, pp. 593-596.
Jack, "The Occurrence and the Crystal Structure of a"-Iron Nitride; A New Type of Interstitial Alloy Formed During the Tempering of Nitrogen-Martensite," Proceedings of the Royal Society of London, vol. 208, Sep. 24, 1951, pp. 216-224.
Jack, "The Iron-Nitrogen System: The Preparation and the Crystal Structures of Nitrogen-Austenite (?) and Nitrogen-Martensite (a')*," Proceedings of the Royal Society of London, Mar. 13, 1951, pp. 200-217.
Yamanaka et al., "Humidity Effects in Fe16N2 Fine Powder Preparation by Low-Temperature Nitridation," Journal of Solid State Chemistry, vol. 183, Aug. 4, 2010, pp. 2236-2241.
Frisk, "A New Assessment of the Fe—N Phase Diagram" Calphad, vol. 11, No. 2, 1987, pp. 127-134. (Applicant points out, in accordance with MPEP 609.04(a), that the year of publication, 1987, is sufficiently earlier than the effective U.S. filing date, Aug. 8, 2014, so that the particular month of publication is not in issue.).
Nakajima et al., "Large Magnetization Induced in Single Crystalline Iron Films by High-Dose Nitrogen Implantation," Applied Physics Letters, vol. 56, No. 1, Jan. 1, 1990, pp. 92-94.
Nakajima et al., "Nitrogen-Implantation-Induced Transformation of Iron to Crystalline Fe16N2 in Epitaxial Iron Films," Applied Physics Letters, vol. 54, No. 25, Jun. 19, 1989, pp. 2536-2538.
Nakajima et al., "Formation of Ferromagnetic Iron Nitrides in Iron Thin Films by High-Dose Nitrogen Ion Implantation," Journal of Applied Physics, vol. 65, No. 11, Jun. 1, 1989, pp. 4357-4361.
Kaneko et al., "Fe—Cr—Co Ductile Magnet With (BH)max = 8 MGOe," AIP Conference Proceedings, 1976, 2 pp. (Applicant points out, in accordance with MPEP 609.04(a), that the year of publication, 1976, is sufficiently earlier than the effective U.S. filing date, Aug. 8, 2014, so that the particular month of publication is not in issue.).
Strnat, "Modern Permanent Magnets for Applications in Electro-Technology," Proceedings Of The IEEE, vol. 78, No. 6, Jun. 1990, pp. 923-946.
Strnat et al., "Bonded Rare Earth-Cobalt Permanent Magnets," Proceedings of the 12 th Rare Earth Research Conference, vol. 1, Jul. 18-22, 1976, 11 pp.
Strnat et al., "Rare Earth-Cobalt Permanent Magnets," Journal of Magnetism and Magnetic Materials, vol. 100, Nos. 1-3, Nov. 1991, pp. 38-56.
Yang et al., "The Effect of Strain Induced by Ag Underlayer on Saturation Magnetization of Partially Ordered Fe16N2 Thin Films," Applied Physics Letters, vol. 103, Dec. 12, 2013, 4 pp.
Lewis et al., "Perspectives on Permanent Magnetic Materials for Energy Conversion and Power Generation," Metallurgical and Materials Transactions A, vol. 44A, Jan. 2013, 19 pp.
Pauling, "The Nature of the Interatomic Forces in Metals," Physical Review, vol. 54, Dec. 1, 1938, pp. 899-904.
Davison et al., "Shock Compression of Solids," Physics Reports, vol. 55, No. 4, Apr. 1979, pp. 255-379.
Liu et al., "Nanocomposite Exchange-Spring Magnet Synthesized by Gas Phase Method: From Isotropic to Anisotropic," Applied Physics Letters, vol. 98, Jun. 3, 2011, 3 pp.
Liu et al., "Discovery of localized states of Fe 3D electrons in Fe16N2 and Fe8N films: an evidence of the existence of giant saturation magnetization," arXiv: 0909.4478, Sep. 2009, 13 pp.
Amato et al., "Exchange-Spring Behavior of Hard/Soft Magnetic Multilayers: Optimization Study of the Nanostructure," Physica B: Condensed Matter, vol. 275, Nos. 1-3, Jan. 2000, pp. 120-123.
Tijssens et al., "Towards an Improved Continuum Theory for Phase Transformations," Materials Science and Engineering, vol. 378, Sep. 23, 2003, pp. 453-458.
Komuro et al., "Epitaxial Growth and Magnetic Properties of Fe16N2 Films with High Saturation Magnetic Flux Density (Invited)," Journal of Applied Physics, vol. 67, No. 9, May 1, 1990, pp. 5126-5130.
Brady et al., "Alloy Design of Intermetallics for Protective Scale Formation and for use as Precursors for Complex Ceramic Phase Surfaces," Intermetallics, vol. 12, Apr. 1, 2004, pp. 779-789.
Brady et al., "Pre-Oxidized and Nitrided Stainless Steel Alloy Foil for Proton Exchange Membrane Fuel Cell Bipolar Plates: Part 1. Corrosion, Interfacial Contact Resistance, and Surface Structure," Journal of Power Sources, vol. 195, Mar. 20, 2010, pp. 5610-5618.
"Annual Energy Outlook 2015, with projects to 2040," U.S. Energy Information Administration, Apr. 2015, 154 pp.
Kim et al., "New Magnetic Material Having Ultrahigh Magnetic Moment," Applied Physics Letters, vol. 20, No. 12, Jun. 15, 1972, pp. 492-494.
Zhuge et al., "Preparation and Property of Iron Nitrides by Ball Mill Method," Journal of Functional Materials, vol. 31, No. 5, 2000, pp. 471-472 (Abstract Only (on last page)) (Applicant points out, in accordance with MPEP 609.04(a), that the year of publication, 2000, is sufficiently earlier than the effective U.S. filing date, Aug. 8, 2014, so that the particular month of publication is not in issue.).
Takahashi et al., "Magnetic Moment of a"-Fe16N2 Films (Invited)," Journal of Applied Physics, vol. 76, No. 10, Nov. 15, 1994, pp. 6642-6647.
Takahashi et al., "Structure and Magnetic Moment of Fe16N2 Sputtered Film," Journal of Magnetism and Magnetic Materials, vol. 174, Nos. 1-2, Oct. 1, 1997, pp. 57-69.
Takahashi et al., "Magnetocrystalline Anisotropy for a'-Fe-C and a'-Fe—N Films," IEEE Transactions on Magnetics, vol. 37, No. 4, Jul. 2001, pp. 2179-2181.
Mühlethaler et al., "Improved Core-Loss Calculation for Magnetic Components Employed in Power Electronic Systems," IEEE Transactions on Power Electronics, vol. 27, No. 2, Feb. 2012, pp. 964-973.
Watanabe et al., "Perpendicular Magnetization of Epitaxial FePt(001) Thin Films with High Squareness and High Coercive Force," Japanese Journal of Applied Physics, vol. 35, No. 10A, Oct. 1, 1996, pp. 1264-1267.
Zhang et al., "Thermal Stability of Partially Ordered Fe16N2 Film on Non-Magnetic Ag Under Layer," Journal of Applied Physics, vol. 115, No. 17A, Mar. 20, 2014, 3 pp.

(56) References Cited

OTHER PUBLICATIONS

Uijttewaal et al., "Understanding the Phase Transitions of the Ni2MnGa Magnetic Shape Memory System from First Principles," Physical Review Letters, vol. 102, Jan. 23, 2009, 4 pp.
Pugaczowa-Michalska et al., "Electronic Structure and Magnetic Properties of Ni2MnGa1—xGex and Disordered Ni2MnSn Heusler Alloys," Acta Physica Polonica A, vol. 115, No. 1, Jan. 2009, pp. 241-243.
Brewer et al., "Magnetic and Physical Microstructure of Fe16N2 Films Grown Epitaxially on Si(001)," Journal of Applied Physics, vol. 81, No. 8, Apr. 15, 1997, pp. 4128-4130.
Abdellateef et al., "Magnetic Properties and Structure of the a"-Fe16N2 Films," Journal of Magnetism and Magnetic Materials, vol. 256, Nos. 1-3, Jan. 11, 2003, pp. 214-220.
Brewer et al., "Epitaxial Fe16N2 Films Grown on Si(001) by Reactive Sputtering," Journal of Applied Physics, vol. 79, No. 8, Apr. 15, 1996, pp. 5321-5323.
Van Genderen et al., "Atom Probe Analysis of the First Stage of Tempering of Iron-Carbon-Nitrogen Martensite," Zeitschrift Für Metallkunde, vol. 88, No. 5, May 1997, pp. 401-409.
Takahashi et al., "Impurity effect of carbon on structure and saturation magnetization of Fe—N films," Journal of Magnetism and Magnetic Materials, vol. 210, Sep. 1, 1999, pp. 333-340.
Huang et al., "Magnetism of a'-FeN Alloys and a'-(Fe16N2) Fe Nitrides," Journal of Magnetism and Magnetic Materials, vol. 135, Nov. 30, 1993, pp. 226-230.
Huang et al., "Spin-Density Distribution in Ferromagnetic a'-Fe16N2," Physical Review B: Condensed Matter, vol. 51, No. 5, Feb. 1, 1995, pp. 3222-3225.
Cococcioni et al., "Linear Response Approach to the Calculation of the Effective Interaction Parameters in the LDA+U Method," Physical Review B, vol. 71, Jan. 18, 2005, 16 pp.
Takahashi, "Discovery of Fe16N2 with Giant Magnetic Moment and Its Future View," IEEE Translation Journal on Magnetics in Japan, vol. 6, No. 12, Dec. 1991, pp. 1024-1038.
Zhang et al., "Strain Effect of Multilayer FeN Structure on GaAs Substrate," Journal of Applied Physics, vol. 113, No. 17, Apr. 10, 2013, 3 pp.
"New Compound Opens Way to EV Magnet without Rare Earths," Nikkei.com Morning Edition, Mar. 4, 2011, 1 pp.
Coey et al., "Magnetic nitrides," Journal of Magnetism and Magnetic Materials, vol. 200, Mar. 10, 1999, pp. 405-420.
Tomioka et al., "Iron Nitride Powder Produced as Substitute for Rare Metal," Nikkei Technology, Mar. 7, 2011, 2 pp.
Ji et al., "Direct Observation of Giant Saturation Magnetization in Fe16N2," arXiv: 1211.0553, Nov. 2012, 27 pp.
Zheng et al., "Iron Nitride Thin Films Deposited by Chloride Assisted Plasma Enhanced Chemical Vapour Deposition: Facile Stoichiometry Control and Mechanism Study," Journal of Applied Physics D: Applied Physics, vol. 42, No. 18, Sep. 21, 2009, 9 pp.
Ji et al., "Strain Induced Giant Magnetism in Epitaxial Fe16N2 Thin Film," Applied Physics Letters, vol. 102, Feb. 21, 2013, 4 pp.
Lanska et al., "Composition and Temperature Dependence of the Crystal Structure of Ni—Mn—Ga Alloys," Journal of Applied Physics, vol. 95, No. 12, Jun. 15, 2004, pp. 8074-8078.
Takahashi et al., "Growth Mechanism of FeN Films by Means of an Atmospheric Pressure Halide Chemical Vapor Deposition," Materials Chemistry and Physics, vol. 65, Jan. 18, 2000. pp. 113-116.
Ji et al., "Growth and Depth-Dependence of Saturation Magnetization of Iron Nitride Thin Films on MgO Substrate," Spin, vol. 2, No. 1, Mar. 2012, 4 pp.
"Nanocrystalline soft magnetic material, FINEMET," Materials Magic, Hiatchi Metals, Apr. 2005, 12 pp.
Gutfleisch et al., "Magnetic Materials and Devices for the 21 st Century: Stronger, Lighter, and More Energy Efficient," Advanced Materials, vol. 23, 2011, Dec. 15, 2010, pp. 821-842.
Ferguson et al., "The Tempering of Fe—C—N Martensite" Scripta Metallurgica, vol. 18, No. 11, Nov. 1984, pp. 1189-1194.
Brown et al., "The Crystal Structure and Phase Transitions of the Magnetic Shape Memory Compound Ni2MnGa," Journal of Physics: Condensed Matter, vol. 14, No. 43, Oct. 18, 2002, pp. 10159-10171.
Bruno, "Tight-Binding Approach to the Orbital Magnetic Moment and Magnetocrystalline Anisotropy of Transition-Metal Monolayers," Physical Review B, vol. 39, No. 1, Jan. 1, 1989, pp. 865-868.
Blöchl, "Projector Augmented-Wave Method," Physical Review B, vol. 50, No. 24, Dec. 15, 1994, pp. 17953-17979.
Entel et al., "Ab Initio Modeling of Martensitic Transformation (MT) in Magnetic Shape Memory Alloys," Journal of Magnetism and Magnetic Materials, vol. 310, Nov. 27, 2006, pp. 2761-2763.
Hohenberg et al., "Inhomogeneous Electron Gas," Physical Review, vol. 136, No. 3B, Nov. 9, 1964, pp. 864-871.
Sit et al., "Realistic Quantitative Descriptions of Electron Transfer Reactions: Diabatic Free-Energy Surfaces from First-Principles Molecular Dynamics," Physical Review Letters, vol. 97, Jul. 11, 2006, 4 pp.
Paseka et al., "Structure and Magnetic Properties of Ball-Milled Iron Nitride Powders," Journal of Alloys and Compounds, vol. 274, Mar. 10, 1998, pp. 248-253.
Giannozzi et al., "Quantum Espresso: A Modular and Open-Source Software Project for Quantum Simulations of Materials," Journal of Physics: Condensed Matter, vol. 21, Sep. 1, 2009, pp. 1-19.
Tong et al., "Low Temperature Wafer Direct Bonding," Journal of Microelectromechanical Systems, vol. 3, No. 1, Mar. 1994, pp. 29-35.
Fan et al., "Ferromagnetism at the Interfaces of Antiferromagnetic FeRh Epilayers," Physical Review B, vol. 82, Nov. 12, 2010, 5 pp.
Yao et al., "Formation and Magnetic Properties of Fe16N2 Films Prepared by Ion-Beam-Assisted Deposition," Journal of Magnetism and Magnetic Materials, vol. 177-181, Jan. 1998, pp. 1291-1292.
Skomski et al., "Giant Energy Product in Nanostructured Two-Phase Magnets," Physical Review B, vol. 48, No. 21, Dec. 1, 1993, pp. 15812-15816.
Tickle et al., "Magnetic and Magnetomechanical Properties of Ni2MnGa," Journal of Magnetism and Magnetic Materials, vol. 195, No. 3, Jun. 11, 1999, pp. 627-638.
Sabiryanov et al., "Electronic Structure and Magnetic Properties of Hard/Soft Multilayers," Journal of Magnetism and Magnetic Materials, vol. 177-181, Pt. 2, Jan. 1998, pp. 989-990.
Metzger et al., "Magnetism of a"-Fe16N2 (Invited)," Journal of Applied Physics, vol. 76, No. 10, Nov. 15, 1994, pp. 6626-6631.
Kardonina et al., "Transformations in the Fe—N System," Metal Science and Heat Treatment, vol. 52, Nos. 9-10, Oct. 2010, pp. 5-15.
Chu et al., "Opportunities and Challenges for a Sustainable Energy Future," Nature, vol. 488, No. 7411, Aug. 16, 2012, pp. 294-303.
Blundell et al., "Polarized Neutron Reflection as a Probe of Magnetic Films and Multilayers," Physical Review B, vol. 46, No. 6, Aug. 1, 1992, pp. 3391-3400.
Zhang et al., "Energy Barriers and Hysteresis in Martensitic Phase Transformations," Acta Materialia, vol. 57, Jul. 17, 2009, pp. 4332-4352.
Kikkawa et al., "Particle Size Dependence in Low Temperature Nitridation Reaction for Fe16N2," Journal of Alloys and Compounds, vol. 449, Dec. 21, 2006 (online), pp. 7-10.
Okamoto et al., "Crystal Distortion and the Magnetic Moment of Epitaxially Grown a"-Fe 16N2," Journal of Magnetism and Magnetic Materials, vol. 208, Jul. 12, 1999, pp. 102-114.
Roy et al., "Depth Profile of Uncompensated Spins in an Exchange Bias System," Physical Review Letters, vol. 95, Jul. 21, 2005, 4 pp.
Uchida et al., "Magnetocrystalline Anisotropy Energies of Fe16N2 and Fe16C2," Journal of Magnetism and Magnetic Materials, vol. 310, Nov. 15, 2006, pp. 1796-1798.
Wang et al., "Properties of a New Soft Magnetic Material," Nature, vol. 407, Sep. 14, 2000, pp. 150-151.
Dudarev et al., "Electron-Energy-Loss Spectra and the Structural Stability of Nickel Oxide: An LSDA+U Study," Physical Review B, vol. 57, No. 3, Jan. 15, 1998, pp. 1505-1509.
Kart et al., "DFT Studies on Structure, Mechanics and Phase Behavior of Magnetic Shape Memory Alloys: Ni2MnGa," Physica Status Solidi, vol. 205, No. 5, Mar. 20, 1998, pp. 1026-1035.

(56) References Cited

OTHER PUBLICATIONS

Barman et al., "Structural and Electronic Properties of Ni2MnGa," Physical Review B, vol. 72, Nov. 8, 2005, 7 pp.
Atiq et al., "Preparation and the Influence of Co, Pt and Cr Additions on the Saturation Magnetization of a"-Fe16N2 Thin Films," Journal of Alloys and Compounds, vol. 479, Feb. 23, 2009, pp. 755-758.
Okamoto et al., "Characterization of Epitaxially Grown Fe—N Films by Sputter Beam Method," Journal of Applied Physics, vol. 79, No. 3, Feb. 1, 1996, pp. 1678-1683.
Sugita et al., "Magnetic and M?ssbauer Studies of Single-Crystal Fe16N2 and Fe—N Martensite Films Epitaxially Grown by Molecular Beam Epitaxy (Invited)," Journal of Applied Physics, vol. 76, No. 10, Nov. 15, 1994, pp. 6637-6641.
Sugita et al., "Giant Magnetic Moment and Other Magnetic Properties of Epitaxially Grown Fe16N2 Single-Crystal Films (Invited)," Journal of Applied Physics, vol. 70, No. 10, Nov. 15, 1991, pp. 5977-5982.
Toops et al., "Pre-Oxidized and Nitrided Stainless Steel Alloy Foil for Proton Exchange Membrane Fuel Cell Bipolar Plates. Part 2: Single-Cell Fuel Evaluation of Stamped Plates," Journal of Power Sources, vol. 195, Mar. 19, 2010, pp. 5619-5627.
Klemmer et al., "Magnetic Hardening and Coercivity Mechanisms in L1 Ordered FePd Ferromagnets," Scripta Metallurgica et Materialia, vol. 33, Nos. 10-11, Dec. 1, 1995, pp. 1793-1805.
Ohtani et al., "Magnetic Properties of Mn—Al—C Permanent Magnet Alloys," IEEE Transactions on Magnetics, vol. MAG-13, No. 5, Sep. 1977, pp. 1328-1330.
Osaka et al., "A Soft Magnetic CoNiFe Film With High Saturation Magnetic Flux Density and Low Coercivity," Nature, vol. 392, Apr. 23, 1998, pp. 796-798.
Schrefl et al., "Exchange Hardening in Nano-Structured Two-Phase Permanent Magnets," Journal of Magnetism and Magnetic Materials, vol. 127, Jul. 12, 1993, pp. 273-277.
Kakeshita et al., "Effect of Magnetic Fields on Athermal and Isothermal Martensitic Transformations in Fe—Ni—Mn Alloys," Materials Transactions, vol. 34, No. 5, Dec. 9, 1992, pp. 415-422.
Koyano et al., "Magnetization of a' Iron Nitride Produced Through the fcc?bct Martensitic Transformation in High Magnetic Field," Journal of Applied Physics, vol. 100, No. 3, Aug. 1, 2006, 5 pp.
Oku et al., "Small-Angle Polarized Neutron Scattering Study of Spherical Fe16N2 Nano-Particles for Magnetic Recording Tape," Physica B, vol. 404, Sep. 1, 2009, pp. 2575-2577.
Shimoda et al., "High-Energy Cast Pr—Fe—B Magnets," Journal of Applied Physics, vol. 64, No. 10, Nov. 15, 1988, pp. 5290-5292.
Weber et al., "Search for Giant Magnetic Moments in Ion-Beam-Synthesized a"-Fe16N2," Thin Solid Films, vol. 279, Nos. 1-2, Jun. 1996, pp. 216-220.
Watanabe et al., "A New Challenge: Grain Boundary Engineering for Advanced Materials by Magnetic Field Application," Journal of Materials Science, vol. 41, No. 23, Oct. 24, 2006 (online), pp. 7747-7759.
Takahashi et al., "Preparation of FeN Thin Films by Chemical Vapor Deposition Using a Chloride Source," Materials Letters, vol. 42, No. 6, Mar. 2000, pp. 380-382.
Stern et al., "Electronic and Structural Properties of Fe3Pd—Pt Ferromagnetic Shape Memory Alloys," Journal of Applied Physics, vol. 91, No. 10, May 15, 2002, pp. 7818-7820.
Qian et al., "NiZn Ferrite Thin Films Prepared by Facing Target Sputtering," IEEE Transactions Magnetics, vol. 33, No. 5, Sep. 1997, pp. 3748-3750.
Takahashi et al., "New Soft Magnetic Material of a'-Fe—C With High Bs," Journal of Magnetism and Magnetic Materials, vol. 239, Nos. 1-3, Feb. 1, 2002, pp. 479-483.
Inque et al., "Enhancement of the Formation of Fe16N2 on Fe Films by Co Additions (Invited)," Journal of Applied Physics, vol. 76, No. 10, Nov. 15, 1994, pp. 6653-6655.
Tsuchiya et al., "Spin Transition in Magnesiowüstite in Earth's Lower Mantle," Physical Review Letters, vol. 94, May 18, 2006, 4 pp.
Liu et al., "Nucleation Behavior of Bulk Ni—Cu Alloy and Pure Sb in High Magnetic Fields," Journal of Crystal Growth, vol. 321, Mar. 2, 2011, pp. 167-170.
Liu et al., "Effects of High Magnetic Fields on Solidification Microstructure of Al—Si Alloys," Journal of Material Science, vol. 46, Oct. 22, 2010, pp. 1628-1634.
Okunev et al., "The Low-Temperature Electric Conductivity of YBaCuO and LaSrMnO Dielectric Films Obtained by a Pulsed Laser Sputter Deposition Technique," Technical Physics Letters, vol. 26, No. 10, May 6, 2000, pp. 903-906.
Anisimov et al., "Density-Functional Calculation of Effective Coulomb Interactions in Metals," Physical Review B, vol. 43, No. 10, Apr. 1, 1991, pp. 7570-7574.
Anisimov et al., "Band-Structure Description of Mott Insulators (NiO, MnO, FeO, CoO)," Journal of Physics: Condensed Matter, vol. 2, No. 17, Apr. 30, 1990, pp. 3973-3987.
Anisimov et al., "First-Principles Calculations of the Electronic Structure and Spectra of Strongly Correlated Systems: the LDA+U Method," Journal of Physics: Condensed Matter, vol. 9, No. 4, Jan. 27, 1997, pp. 767-808.
Anisimov et al., "Band Theory and Mott Insulators: Hubbard U Instead of Stoner I," Physical Review B, vol. 44, No. 3, Jul. 15, 1991, pp. 943-954.
Campo et al., "Extended DFT + U + V Method With On-Site and Inter-Site Electronic Interactions," Journal of Physics: Condensed Matter, vol. 22, Jan. 19, 2010 (online), 12 pp.
Nimura et al., "Facing Targets Sputtering System for Depositing Co—Cr Perpendicular Magnetic Recording Media," Journal of Vacuum Science Technology, vol. 5, No. 1, Jan. 1987, pp. 109-110.
Lauter et al., "Highlights from the Magnetism Reflectometer at the SNS," Physica B, vol. 404, Sep. 1, 2009, pp. 2543-2546.
Godlevsky et al., "Soft Tetragonal Distortions in Ferromagnetic Ni2MnGa and Related Materials from First Principles," Physical Review B, vol. 63, Mar. 2, 2001, 5 pp.
Hou et al., "SmCo5/Fe Nanocomposites Synthesized from Reductive Annealing of Oxide Nanoparticles," Applied Physics Letters, vol. 91, Oct. 12, 2007, 3 pp.
Zhang et al., "Shift of the Eutectoid Point in the Fe—C Binary System by a High Magnetic Field," Journal of Physics D: Applied Physics, vol. 40, Oct. 19, 2007, pp. 6501-6506.
Pickett et al., "Reformulation of the LDA + U Method for a Local-Orbital Basis," Physical Review B, vol. 58, No. 3, Jul. 15, 1998, pp. 1201-1209.
Kohn et al., "Self-Consistent Equations Including Exchange and Correlation Effects," Physical Review, vol. 140, No. 4A, Nov. 15, 1965, pp. 1133-1138.
Gong et al., "Mechanically Alloyed Nanocomposite Magnets," Journal of Applied Physics, vol. 75, No. 10, May 15, 1994, pp. 6649-6651.
Li et al., "Effect of Assistant rf Field on Phase Composition of Iron Nitride Film Prepared by Magnetron Sputtering Process," Journal of Vacuum Science & Technology A, vol. 24, No. 1, Dec. 23, 2005 (online), pp. 170-173.
Liu et al., "Nanocrystalline Soft Magnetic Ribbon with a"-Fe16N2 Nanocrystallites Embedded in Amorphous Matrix," Journal of Magnetism and Magnetic Materials, vol. 320, Jun. 10, 2008, pp. 2752-2754.
Wallace et al., "Enhanced Fe Moment in Nitrogen Martensite and Fe16N2 (Invited)," Journal of Applied Physics, vol. 76, No. 10, Nov. 15, 1994, pp. 6648-6652.
Wang et al., "Searching, Fabricating and Characterizing Magnetic Materials With Giant Saturation Magnetization," TMRC 2014, Aug. 11, 2014, 2 pp.
Wang et al., "Growth, Structural, and Magnetic Properties of Iron Nitride Thin Films Deposited by dc Magnetron Sputtering," Applied Surface Science, vol. 220, May 20, 2003, pp. 30-39.
Yamamoto et al., "Formation of Fe16N2 in Deformed Iron by Ion Implantation Method," Proceedings of 1998 International Conference on Ion Implantation Technology, Jun. 22-26, 1998, 4 pp.
Rui et al., "In-Cluster-Structured Exchange-Coupled Magnets with High Energy Densities," Applied Physics Letters, vol. 89, Sep. 19, 2006, 3 pp.

(56) References Cited

OTHER PUBLICATIONS

Bao et al., "Synthesis and Properties of a"-Fe16N2 in Magnetic Particles," Journal of Applied Physics, vol. 75, No. 10, May 15, 1994, pp. 5870-5872.
Gao et al., "Exchange-coupling interaction and effective anisotropy in nanocomposite permanent materials," Chinese Science Bulletin, vol. 47, No. 14, Jul. 2002, 4 pp.
Grimsditch et al., "Exchange-spring systems: Coupling of hard and soft ferromagnets as measured by magnetization and Brillouin light scattering (Invited)," Journal of Applied Physics, vol. 85, No. 8, Apr. 15, 1999, 5 pp.
Stäblein, "Chapter 7: Hard Ferrites and Plastoferrites," Handbook of Ferromagnetic Materials, vol. 3, 1982, 162 pp. (Applicant points out, in accordance with MPEP 609.04(a), that the year of publication, 1982, is sufficiently earlier than the effective U.S. filing date, Aug. 8, 2014, so that the particular month of publication is not in issue.).
Murata et al., "Physical Properties of Steel and Nitrogen," Japan, Agne Gijutsu Center Inc., Dec. 15, 2005, 8 pp.
U.S. Appl. No. 15/129,439, by Wang et al., filed Sep. 27, 2016.
U.S. Appl. No. 62/107,733, by Wang et al., filed Jan. 26, 2015.
U.S. Appl. No. 62/107,748, by Wang et al., filed Jan. 26, 2015.
U.S. Appl. No. 62/035,245, by Wang et al., filed Aug. 8, 2014.
U.S. Appl. No. 62/035,230, by Wang et al., filed Aug. 8, 2014.
U.S. Appl. No. 62/107,700, by Wang et al., filed Jan. 26, 2015.
U.S. Appl. No. 61/840,221, by Wang et al., filed Jun. 27, 2013.
U.S. Appl. No. 61/840,248 by Wang et al., filed Jun. 27, 2013.
Huang et al., "Synthesis and characterization of Fe16N2 in bulk form," Journal of Applied Physics, vol. 75, No. 10, May 15, 1994, 3 pp.
Tsubakino et al., "Formation of Fe16N2 in iron sheet by an ion implantation method," Materials Chemistry and Physics 54, Elsevier, Jul. 1998, pp. 301-304.
Tsubakino et al., "High resolution transmission electron microscopic study of the formation of Fe16N2 in bulk iron by ion implantation," Material Letters 26, Elsevier, Feb. 1996, pp. 155-159.
Aoshima et al., "Preparation and Characterization of Fe—N Nanoparticles by Gas Flow Sputtering," Japanese Journal of Applied Physics, vol. 47, No. 1, Jan. 22, 2008, 4 pp.
Coey et al., "The Magnetization of a"-Fe16N2," Journal of Physics: Condensed Matter, vol. 6, 1994, pp. 23-28. Per MPEP 609.09(a), Applicant points out that the year of publication, 1994, is sufficiently earlier than the effective U.S. filing date, Aug. 5, 2015, and any foreign priority date so that the particular month of publication is not in issue.
Jack et al., "The Synthesis, Structure, and Characterization of a'Fe16N2", Journal of Applied Physics, American Institute of Physics, Nov. 15, 1994.
Turgut et al., "Thermal Plasma Synthesis of ?-FeN, Nanoparticles as Precursors for the Fe16N2 Synthesis by Annealing," ResearchGate, MRS Online Proceeding Library Jan. 2011, 7 pp.
Zhang et al., "High saturdation magnetization and low magnetic anisotropy Fe—CN martensite thin film," Applied Physics Letters, vol. 114, 152401, https://doi.org/10.1063/1.5088969, Apr. 15, 2019, 5 pp.
Kojima et al., "FeNi and Fe16N2 Magnets Prepared Using Leaching," Materials Transactions, The Japan Institute of Metals and Materials, Apr. 5, 2019, 6 pp.
Mehedi et al., "Minnealloy: a new magnetic material with high saturation flux density and low magnetic anistropy," IOP Publishing, Journal of Physics D, vol. 50, https://doi.org/10.1088/1361-6463/aa8130, Aug. 22, 2017, 7 pp.
Guo et al., "Carbon and Microstructure Effects on the Magnetic Properties of Fe—CN Soft Magnetic Materials (Minnealloy)," ResearchGate, The Minerals, Metals & Materials Society, TMS 2020 149th Annual Meeting & Exhibition Supplemental Proceedings, The Minerals, Metals & materials Series, https://doi.org/10.1007/978-3-030-36296-6_170, Feb. 2020, pp. 1841-1856.
Gutfleisch et al., "Magnetic Materials and Devices for the 21st Century: Stronger, Lighter, and More Energy Efficient," Wiley Online, Advanced Materials, vol. 38, Issue 7, DOI: 10.1002/adma.201002180, Dec. 15, 2010, pp. 821-842.
Prosecution History from U.S. Appl. No. 14/820,284, dated Sep. 18, 2015 through June.

* cited by examiner

MAGNETIC MATERIAL INCLUDING $\alpha''$-$Fe_{16}(N_xZ_{1-x})_2$ OR A MIXTURE OF $\alpha''$-$Fe_{16}Z_2$ AND $\alpha''$-$Fe_{16}N_2$, WHERE Z INCLUDES AT LEAST ONE OF C, B, OR O This application claims the benefit of U.S. Provisional Patent Application No. 62/914,230, titled, "MAGNETIC MATERIAL INCLUDING $\alpha''$-$Fe_{16}(N_xZ_{1-x})_2$ OR A MIXTURE OF $\alpha''$-$Fe_{16}Z_2$ AND $\alpha''$-$Fe_{16}N_2$, WHERE Z INCLUDES AT LEAST ONE OF C, B, OR O," filed Oct. 11, 2019, the entire content of which is incorporated herein by reference.

TECHNICAL FIELD

The disclosure relates to soft magnetic materials and techniques for forming soft magnetic materials.

BACKGROUND

Magnetic materials, including both hard magnetic materials and soft magnetic materials, are used in many different applications. Soft magnetic materials possess relatively low coercivity, while hard magnetic materials possess relatively high coercivity. For example, soft magnetic materials may be used in transformer and inductor cores, magnetic recording write heads, microwave devices, magnetic shielding, and the like.

SUMMARY

The disclosure describes soft magnetic materials including $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$, where Z includes at least one of C, B, or O, and x is a number greater than zero and less than one and techniques for forming such materials. The soft magnetic materials may be formed using a technique that includes melt spinning of a molten iron-containing material. The molten iron-containing material may include elemental Fe, and Fe-based alloy, an Fe—Z mixture, an iron-N mixture, or an iron-Z—N mixture. Thus, the melt-spun ribbons may include elemental Fe, an Fe-based alloy, an Fe—Z mixture, an Fe—N mixture, or an Fe—Z—N mixture. The melt-spun ribbons may be further processed, such as by introducing nitrogen atoms, Z atoms, or both, to form a material that includes Fe, Z, and N. The material that includes Fe, Z, and N may be the soft magnetic material that includes $\alpha'$-$Fe_{16}(N_xZ_{1-x})_2$ or $\alpha'$-$Fe_8(N_xZ_{1-x})$, or a mixture of at least one of $\alpha'$-$Fe_{16}N_2$ or $\alpha'$-$Fe_8N$ and at least one of $\alpha'$-$Fe_{16}Z_2$ or $\alpha'$-$Fe_8Z$, where Z includes at least one of C, B, or O, and x is a number greater than zero and less than one, or may be annealed to form the soft magnetic material. In some examples, the soft magnetic material then may be consolidated with other soft magnetic material to form a bulk soft magnet.

In some examples, the disclosure describes a method that includes forming a soft magnetic material by a technique comprising melt spinning, wherein the soft magnetic material comprises at least one of at least one of an $\alpha''$-$Fe_{16}(N_xZ_{1-x})_2$ phase domain or an $\alpha'$-$Fe_8(N_xZ_{1-x})$, wherein Z includes at least one of C, B, or O, and wherein x is a number greater than zero and less than one; or at least one of an $\alpha'$-$Fe_{16}N_2$ phase domain or an $\alpha'$-$Fe_8N$ phase domain, and at least one of an $\alpha''$-$Fe_{16}Z_2$ phase domain or an $\alpha'$-$Fe_8Z$ phase domain.

The details of one or more examples are set forth in the accompanying drawings and the description below. Other features, objects, and advantages will be apparent from the description and drawings, and from the claims.

DETAILED DESCRIPTION

Figure 1:
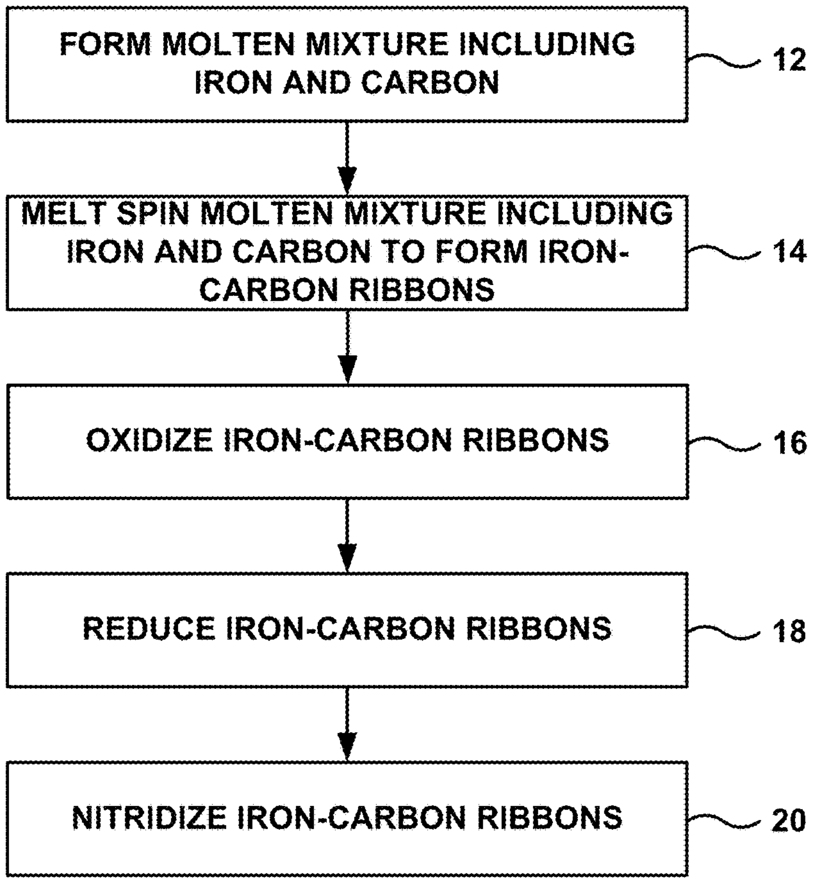
FIG. 1 is a flow diagram illustrating an example technique for forming a soft magnetic material that includes $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_6Z_2$ or $\alpha'$-$Fe_8Z$, where Z includes at least one of C, B, or O, and x is a number greater than zero and less than one.

The disclosure describes magnetic materials including $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$, where Z includes at least one of C, B, or O, and x is a number greater than zero and less than one and techniques for forming such materials. In some examples, the magnetic material including $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$, may include a relatively high magnetic saturation, such as greater than about 219 emu/gram, greater than about 242 emu/gram, or greater than about 250 emu/gram. In addition, in some examples, the magnetic material including $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$ may include a relatively low coercivity. For example, the coercivity of the magnetic material may be less than about 10 Oersted. In some examples, magnetic materials with a coercivity of less than about 10 Oersted may be referred to as soft magnetic materials. The combination of relatively high magnetic saturation and relatively low coercivity may make the magnetic material an attractive soft magnetic material for use in transformer and inductor cores, magnetic recording media write heads, microwave devices, magnetic shielding, and the like. In some examples, the magnetic material including $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$ also may possess high magnetic permeability, high frequency response, and the like.

The soft magnetic materials may be formed using a technique that includes melt spinning of a molten iron-containing material. The molten iron-containing material may include elemental Fe, an Fe-based alloy, an Fe—Z mixture, an Fe—N mixture, or an Fe—Z—N mixture. Thus, the melt-spun material may include elemental Fe, an Fe-based alloy, an Fe—Z mixture, an Fe—N mixture, or an Fe—Z—N mixture. The melt-spun material may facilitate further processing of the material to form the soft magnetic material described herein. For example, the melt-spun material may facilitate further processing to introduce Fe atoms, Z atoms, or both, to the material due to nano-pores formed in the surface and/or interior of melt-spun ribbons after heat treatment.

The melt-spun material may be further processed to result in a material including Fe, Z, and N, such as by introducing N atoms, Z atoms, or both. The material that includes Fe, Z, and N may in some examples be annealed to form the soft magnetic material that includes $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$, where Z includes at least one of C, B, or O, and x is a number greater than zero and less than one. In other examples, N and/or Z introduction may be performed at conditions that directly result in the soft magnetic material.

FIG. 1 is a flow diagram illustrating an example technique for forming a soft magnetic material that includes $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$, where Z includes at least one of C, B, or O, and x is a number greater than zero and less than one, from a precursor that includes iron and carbon (and/or boron and/or oxygen). The following description primarily describes examples in which carbon is used. However, it will be appreciated that similar techniques may be used for boron and/or oxygen.

The technique of FIG. 1 includes forming a molten mixture including iron and carbon (12). For example, a precursor that includes iron and carbon may be melted in an arc melting furnace. The precursor may include, for example, cast iron. Cast iron generally includes between about 1.8 weight percent (wt. %) and about 4 wt. % carbon in iron, such as between 2.5 wt. % and about 4 wt. %. In some examples, cast iron powder, pellets, or ingots may be mixed with elemental iron to arrive at a desired carbon concentration. The desired carbon concentration may be between about 0.01 atomic percent (at. %) and about 12 at. % carbon, such as between about 2 at. % and about 10 at. % or between about 4 at. % and about 8 at. %, or between about 5 at. % and about 7 at. % or about 6 at. %. For instance, cast iron pellets or powder may be at least partially encapsulated in an iron foil (e.g., an elemental iron foil), where a thickness of the iron foil is selected to result in the desired concentration. For example, the iron foil may have a thickness of at least about 100 micrometers.

The precursor that includes iron and carbon may be placed in the arc melting furnace (or other furnace used to melt the precursor). In some examples, the arc melting furnace may heat the mixture including iron and carbon at a temperature above about 1500° C., or above about 1600° C., or above about 2000° C.

The precursor then may be mixed to form a molten mixture in which the carbon is substantially homogeneously mixed throughout the iron. For example, in some implementations in which the precursor includes cast iron pellets encapsulated in iron foils, the molten mixture may be flipped a plurality of times (e.g., about 6 to 10 times) to approach a homogeneous composition.

Once the molten mixture including iron and carbon is formed, the molten mixture may be melt spun to form iron-carbon ribbons (14). The melt spinning parameters may be selected to form ribbons having a selected size (e.g., thickness). For example, the melt spinner may be configured with a gap distance of about 0.3 mm and a wheel speed of about 50 Hz.

The operating temperature of the melt spinner may be selected based on the Fe—C phase diagram. For example, the melt spinner may be operated at a temperature of between about 1,300° C. and about 1,500° C.

The resulting ribbons include a mixture of iron and carbon (e.g., iron-carbon ribbons), and the mixture may be substantially homogeneous (e.g., a concentration of carbon varies by less than about 2 at. % throughout the volume of the ribbons. In some examples, the ribbons may have a thickness between about 30 micrometers and about 60 micrometers. The ribbons may include alpha phase iron carbide and gamma phase iron carbide.

The iron-carbon ribbons then may be nitrided to introduce nitrogen and form iron-nitrogen-carbon ribbons (20). However, in some examples, the iron-carbon ribbons may optionally be reduced (18), and, if reduced, may optionally be oxidized (16).

The iron-carbon ribbons may be exposed to a reducing environment (18) to reduce or substantially eliminate oxides in the iron-carbon ribbons. The oxides may be from the precursor material or may form during subsequent processing and/or handling. The oxides may include iron oxides, and may affect magnetic properties of the soft magnetic material. As such, in some implementations, the oxides may be removed by exposing the iron-carbon ribbons to a reducing environment. The reducing environment may include gaseous hydrogen or another reducing gas. Further, the reducing environment may include an elevated temperature, such as a temperature between about 300° C. and about 400° C., such as about 350° C. The reduction process may be performed for any suitable time, such as at least one hour, or about 2 hours.

In some examples, prior to exposing the iron-carbon ribbon to the reducing environment (18), the iron-carbon ribbon optionally may be exposed to an oxidizing environment (16). The oxidizing environment may cause oxides to form on and/or in the iron-carbon ribbon, such as iron oxides. Exposure to the reducing environment (18) then may remove most or all of these oxides, leaving nano-pores in the surface and/or interior of the iron-carbon ribbon. This may facilitate nitriding of the iron-carbon ribbons to form iron-carbon-nitrogen ribbons.

The oxidizing environment may include an oxidizing gas, such as air or oxygen, and a high temperature, such as between about 900° C. and about 1000° C., for a sufficient time to form a desired concentration of oxides. For example, the time may be about 30 minutes.

In other examples, the oxidation (16) may be omitted and the iron-carbon ribbons may be exposed to the reducing environment (18).

After the optional oxidation (16) and/or reduction (18), the iron-carbon ribbons may be nitrided (20). For example, the iron-carbon ribbons may be exposed to a source of atomic nitrogen, such as nitrogen ($N_2$), gaseous ammonia ($NH_3$), ammonium nitrate ($NH_4NO_3$; solid), an amide (liquid or solid), or hydrazine (liquid). Amides include a C—N—H bond and hydrazine includes an N—N bond. Ammonium nitrate, amides and hydrazine may serve as a nitrogen donor for forming the powder including iron nitride. Example amides include carbamide ($(NH2)_2CO$; also referred to as urea), methanamide (Formula 1), benzamide (Formula 2), and acetamide (Formula 3), although any amide may be used.

Formula 1

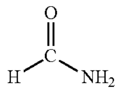

Formula 2

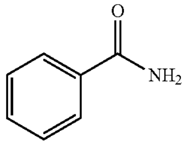

Formula 3

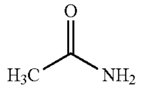

In some examples, amides may be derived from carboxylic acids by replacing the hydroxyl group of a carboxylic acid with an amine group. Amides of this type may be referred to as acid amides.

The iron-carbon ribbons and the source of atomic nitrogen also may be heated to decompose the source of atomic nitrogen and enable the nitrogen atoms to diffuse into the iron-carbon ribbons.

Figure 2:
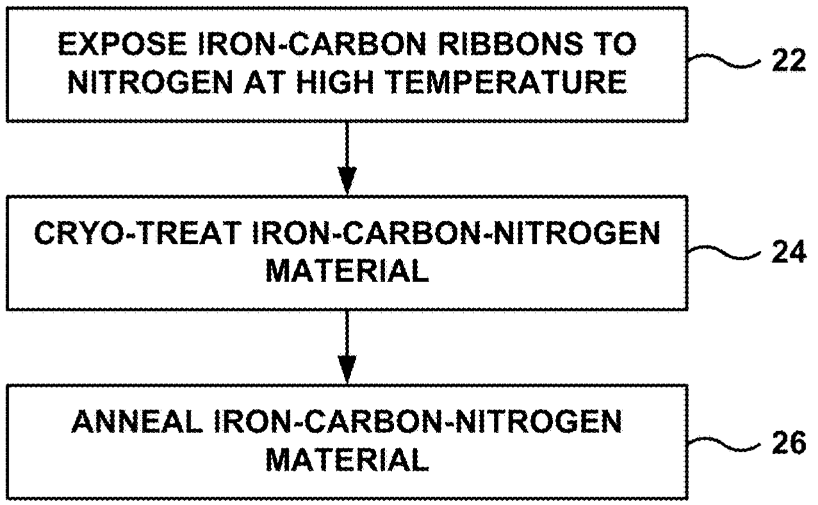
FIG. 2 is a flow diagram illustrating an example technique for nitriding an iron-carbon material to form a soft magnetic material that includes $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$, where Z includes at least one of C, B, or O, and x is a number greater than zero and less than one.

FIG. 2 is a flow diagram illustrating one example technique for nitriding an iron-carbon material to form a soft magnetic material that includes $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$, where Z includes at least one of C, B, or O, and x is a number greater than zero and less than one. In the technique of FIG. 2, the iron-carbon ribbons are exposed to a source of atomic nitrogen at a relatively high temperature (22). The source of atomic nitrogen may be any of the sources mentioned above. The relatively high temperature may be between about 600° C. and about 1000° C., such as between about 650° C. and about 900° C., about 600° C., or about 660° C. for at least about 30 minutes, such as about 45 minutes, about 1.5 hours, or about 2 hours. The nitriding process forms iron-carbon-nitrogen ribbons.

The nitrogen may be diffused into the iron-carbon ribbon so that a collective concentration of nitrogen and carbon is between about 8 atomic percent (at. %) and about 14 at. %, such as about 11 at. %. The concentration of nitrogen and carbon in iron may be an average concentration and may vary throughout the volume of the iron-carbon-nitrogen ribbon. In some examples, the atomic ratio of iron to the combination of nitrogen plus carbon is between about 11.5:1 (iron:nitrogen+carbon) and about 5.65:1 (iron:nitrogen+carbon). For example, the atomic ratio of iron to the combination of nitrogen and carbon may be about 9:1 (iron:nitrogen+carbon), about 8:1 (iron:nitrogen+carbon), or about 6.65:1 (iron:nitrogen+carbon).

The iron-carbon-nitrogen ribbons may be quenched to room temperature by a quenching medium, such as water, ice water, oil, or brine. The iron-carbon-nitrogen ribbons then are cryo-treated using a cryogenic coolant, such as liquid nitrogen or liquid helium (24). The cryo-treatment may facilitate formation of martensite phase iron nitride, iron carbide, and/or iron-nitride-carbide.

After the cryo-treatment, the iron-carbon-nitrogen ribbons may be annealed (26). The annealing technique may be performed using a crucible heating stage, a plasma arc lamp, a radiation heat source, such as an infrared heat lamp, an oven, or a closed retort. The annealing technique may facilitate magnetic material including at least one of α"-$Fe_{16}(N_xZ_{1-x})_2$ phase (where Z includes at least one of C, B, or O) or a mixture of α"-$Fe_{16}N_2$ phase and α"-$Fe_{16}Z_2$ phase. The annealing technique allows diffusion of N+ ions, C+ ions, or both within iron to form at least one of α"-$Fe_{16}N_2$, α"-$Fe_{16}C_2$, or α"-$Fe_{16}(N_xC_{1-x})_2$. In some examples, annealing at relatively low temperatures allows transformation of partial $Fe_8N$ disordered phase into α"-$Fe_{16}N_2$ ordered phase. Similarly, annealing at relatively low temperatures is expected to allow transformation of partial $Fe_8C$ disordered phase into α"-$Fe_{16}C_2$ ordered phase and partial $Fe_8(N_xC_{1-x})$ disordered phase into α"-$Fe_{16}(N_xC_{1-x})_2$ ordered phase.

In some examples, the annealing technique may be carried out at a temperature below about 300° C., such as between about 120° C. and about 300° C., between about 120° C. and about 220° C., or between about 150° C. and about 220° C. The annealing technique may be performed in a nitrogen ($N_2$) or argon (Ar) atmosphere, or in a vacuum or near-vacuum.

The temperature and duration of the annealing step may be selected based on, for example, a size of the ribbons and diffusion coefficient of nitrogen atoms in iron and carbon atoms in iron at the annealing temperature. Based on these factors, the temperature and duration may be selected to provide sufficient time for nitrogen atoms and carbon atoms to diffuse to locations within the iron-carbon-nitrogen ribbons to form $Fe_{16}N_2$ domains, α"-$Fe_{16}C_2$ domains, and/or α"-$Fe_{16}(N_xC_{1-x})_2$ domains.

Additionally, the temperature and duration of the annealing technique may be selected based on a desired volume fraction of the respective phase domains in the ribbons. For example, at a selected temperature, a longer annealing technique may result in a higher volume fraction of α"-$Fe_{16}N_2$, α"-$Fe_{16}C_2$, and/or α"-$Fe_{16}(N_xC_{1-x})_2$. Similarly, for a given annealing technique duration, a higher temperature may result in a higher volume fraction of α"-$Fe_{16}N_2$, α"-$Fe_{16}C_2$, and/or α"-$Fe_{16}(N_xC_{1-x})_2$. However, for durations above a threshold value, the additional volume fraction of α"-$Fe_{16}N_2$, α"-$Fe_{16}C_2$, and/or α"-$Fe_{16}(N_xC_{1-x})_2$ may be limited or eliminated, as the volume fraction of α"-$Fe_{16}N_2$, α"-$Fe_{16}C_2$, and/or α"-$Fe_{16}(N_xC_{1-x})_2$ reaches a relatively stable value. For example, at a temperature of about 150° C., after about 20 hours, the volume fraction of α"-$Fe_{16}N_2$ reaches a stable value. The duration of the annealing step may be at least about 5 hours, such as at least about 20 hours, or between about 5 hours and about 100 hours, or between about 5 hours and about 80 hours or between about 20 hours and about 80 hours, or about 40 hours.

Figure 3:
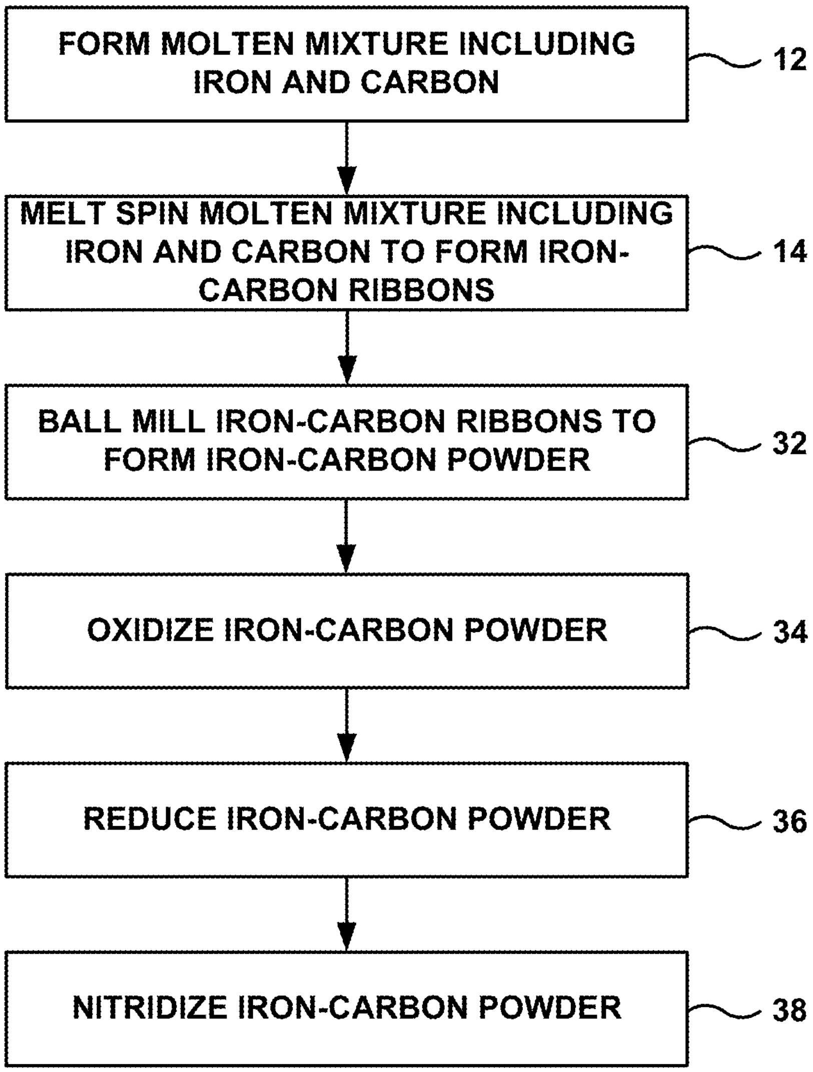
FIG. 3 is a flow diagram illustrating an example technique for forming a soft magnetic material that includes $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha'$-$Fe_{16}Z_2$ or $\alpha'$-$Fe_8Z$, where Z includes at least one of C, B, or O, and x is a number greater than zero and less than one.

In some examples, rather than using ribbons throughout the processing, the ribbons may be milled to form a powder, and the powder subsequently processed to form the soft magnetic material described herein. FIG. 3 is a flow diagram illustrating an example technique for forming a soft magnetic material that includes α"-$Fe_{16}(N_xZ_{1-x})_2$ or α'-$Fe_8(N_xZ_{1-x})$, or a mixture of at least one of α"-$Fe_{16}N_2$ or α'-$Fe_8N$ and at least one of α"-$Fe_{16}Z_2$ or α'-$Fe_8Z$, where Z includes at least one of C, B, or O, and x is a number greater than zero and less than one.

Like the technique of FIG. 1, the technique of FIG. 3 includes forming a molten mixture including iron and carbon (12) and melt spinning the molten mixture including iron and carbon to form iron-carbon ribbons (14). These steps may be similar to or the same as the corresponding steps described in FIG. 1. Once the iron-carbon ribbons are formed, the may be ball milled to form iron-carbon powder (32).

During the ball milling, a milling apparatus may be manipulated to cause agitation of milling media, such as milling spheres, which impact the iron-carbon ribbon and eventually wear the iron-carbon ribbon into powder. The milling media may be formed of a sufficiently hard material, such as steel, stainless steel, or the like. In some examples, the material from which the milling media are formed may not chemically react with the iron-carbon ribbon or powder. In some examples, the milling media may have an average diameter between about 5 millimeters (mm) and about 20 mm.

Once ball milling (32) is complete, the iron-carbon powder may have a relatively small average diameter. For example, the average diameter may be on the order of hundreds of nanometers, such as between about 100 nm and about 1 micrometer, or between about 300 nm and about 500 nm.

The iron-carbon powder then may be nitrided (38). However, in some examples, the powder optionally may be oxidized to form oxides in and/or on the iron-carbon powder (34), and/or may be exposed to a reducing atmosphere to reduce any oxides present in the iron-carbon powder (36). Each of these steps may be similar to or substantially the same as the corresponding steps described with reference to FIG. 1. In other examples, the oxidation (34) may be omitted and the iron-carbon ribbons may be exposed to the reducing environment (36).

The iron-carbon powder may be nitrided using a high temperature technique as described with reference to FIG. 2 or may be nitrided using a relatively low temperature technique. In the relatively low temperature nitriding technique, the iron-carbon powder may be exposed to a source of atomic nitrogen at a temperature between about 120° C. and about 200° C. In some examples, the nitriding temperature may be between about 140° C. and about 170° C. The source of atomic nitrogen may be any of the sources described above with reference to FIGS. 1 and 2. In some examples, the source of atomic nitrogen is ammonia.

The iron-carbon-nitrogen powder then may optionally be annealed, as described with reference to FIG. 2. However, in some examples, the nitriding at the relatively low temperature may directly form the soft magnetic material described herein and annealing may be omitted.

Figure 4:
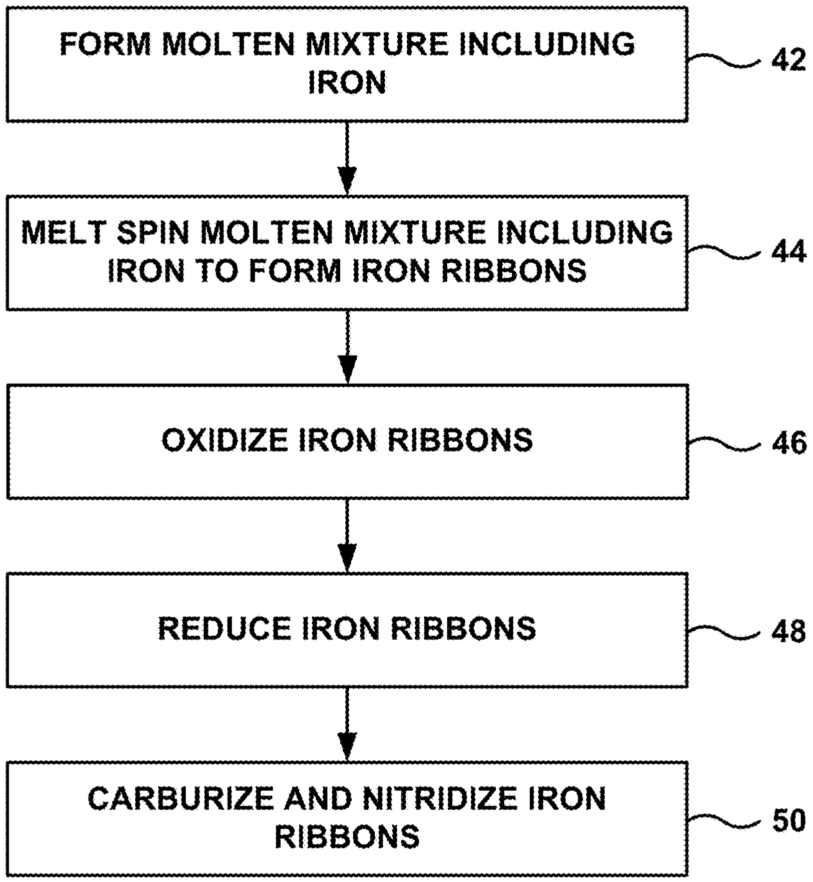
FIG. 4 is a flow diagram illustrating an example technique for forming a soft magnetic material that includes $\alpha'$-$Fe_{16}(N_xZ_{1-x})_2$ or $\alpha'$-$Fe_8(N_xZ_{1-x})$, or a mixture of at least one of $\alpha'$-$Fe_{16}N_2$ or $\alpha'$-$Fe_8N$ and at least one of $\alpha'$-$Fe_{16}Z_2$ or $\alpha'$-$Fe_8Z$, where Z includes at least one of C, B, or O, and x is a number greater than zero and less than one.

In some examples, rather than using an iron-carbon precursor material, an iron-containing precursor (that does not include sufficient (or any) carbon or nitrogen) may be used as a starting material. FIG. 4 is a flow diagram illustrating an example technique for forming a soft magnetic material that includes α"-$Fe_{16}(N_xZ_{1-x})_2$ or α'-$Fe(N_xZ_{1-x})$, or a mixture of at least one of α"-$Fe_6N_2$ or α'-$Fe_8N$ and at least one of α"-$Fe_6Z_2$ or α'-$Fe_8Z$, where Z includes at least one of C, B, or O, and x is a number greater than zero and less than one. The technique of FIG. 4 includes forming a molten mixture including iron (42), melt spinning the molten mixture including iron to form iron ribbons (44), optionally oxidizing the iron ribbons (46), and optionally reducing the iron ribbons (48). Each of these steps may be similar to or substantially the same as corresponding steps described above with reference to FIGS. 1-3, except that the material is an iron-containing material, not an iron-carbon material.

The technique of FIG. 4 then includes carburizing and nitriding the iron ribbons (50). In some examples, the carburizing and nitriding are performed together using a source of both carbon and nitrogen atoms. For example, urea may be a source of both carbon and nitrogen atoms. In other examples, the carburizing and nitriding are performed together using separate source of carbon and nitrogen atoms. The source of nitrogen atoms may be any of the sources described herein, including, for example, diatomic nitrogen ($N_2$), ammonia, ammonium nitrate, an amide (such as urea), or hydrazine. The source of carbon atoms may include, for example, carbon monoxide (CO), carbon dioxide ($CO_2$), or methane ($CH_4$), graphite, urea, or the like. In other examples, the carburizing and the nitriding may be performed separately (e.g., sequentially), with either carburizing or nitriding being performed first.

During the carburizing and nitriding, the iron-containing ribbons may be heated, for example, in a furnace, an autoclave, or the like. Pressure exerted in an autoclave may stabilize $\alpha''$-$Fe_{16}(N_xZ_{1-x})_2$ or $\alpha'$-$Fe(N_xZ_{1-x})$, or a mixture of at least one of $\alpha''$-$Fe_6N_2$ or $\alpha'$-$Fe_8N$ and at least one of $\alpha''$-$Fe_6Z_2$ or $\alpha'$-$Fe_8Z$, where Z includes at least one of C, B, or O.

Figure 5:
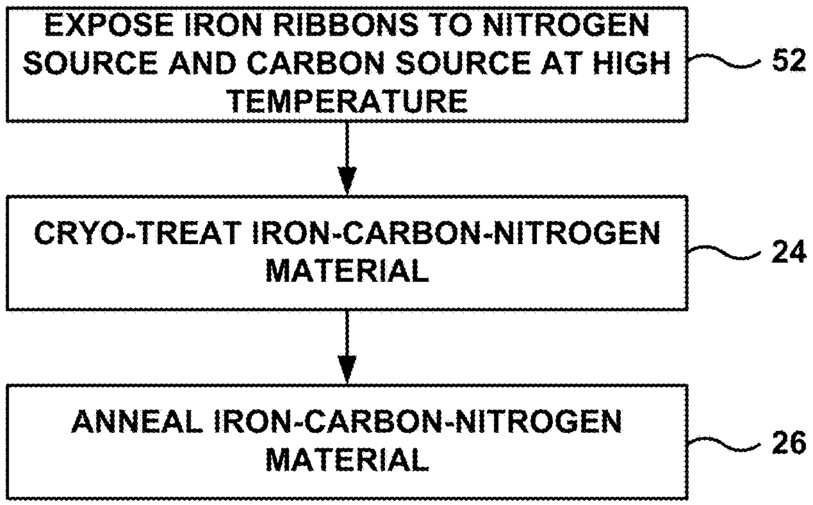
FIG. 5 is a flow diagram illustrating an example technique for carburizing and nitriding an iron material to form a soft magnetic material that includes $\alpha'$-$Fe_{16}(N_xZ_{1-x})_2$ or $\alpha'$-$Fe_8(N_xZ_{1-x})$, or a mixture of at least one of $\alpha'$-$Fe_{16}N_2$ or $\alpha'$-$Fe_8N$ and at least one of $\alpha'$-$Fe_{16}Z_2$ or $\alpha'$-$Fe_8Z$, where Z includes at least one of C, B, or O, and x is a number greater than zero and less than one.

The carburizing and nitriding each may be performed at relatively high temperatures, like the technique described with reference to FIG. 2, or relatively low temperatures, like the technique described with reference to FIG. 3. FIG. 5 is a flow diagram illustrating an example technique for carburizing and nitriding an iron-containing material at relatively high temperatures to form a soft magnetic material that includes $\alpha'$-$Fe_{16}(N_xZ_{1-x})_2$ or $\alpha'$-$Fe(N_xZ_{1-x})$, or a mixture of at least one of $\alpha''$-$Fe_6N_2$ or $\alpha'$-$Fe_8N$ and at least one of $\alpha''$-$Fe_6Z_2$ or $\alpha'$-$Fe_8Z$, where Z includes at least one of C, B, or O, and x is a number greater than zero and less than one. In the technique of FIG. 5, the iron-containing ribbons are exposed to a source of atomic nitrogen and a source of atomic carbon at a relatively high temperature (52). As described above, this may occur simultaneously or sequentially. The sources of atomic nitrogen and atomic carbon may be any of the sources mentioned above. The relatively high temperature may be between about 600° C. and about 1000° C., such as between about 650° C. and about 900° C., about 600° C., or about 660° C. for at least about 30 minutes, such as about 45 minutes, about 1.5 hours, or about 2 hours. The carburizing and nitriding processes form iron-carbon-nitrogen ribbons.

The nitrogen and carbon may be diffused into the iron-containing ribbons so that a collective concentration of nitrogen and carbon is between about 8 atomic percent (at. %) and about 14 at. %, such as about 11 at. %. The concentration of nitrogen and carbon in iron may be an average concentration and may vary throughout the volume of the iron-carbon-nitrogen ribbon. In some examples, the atomic ratio of iron to the combination of nitrogen plus carbon is between about 11.5:1 (iron:nitrogen+carbon) and about 5.65:1 (iron:nitrogen+carbon). For example, the atomic ratio of iron to the combination of nitrogen and carbon may be about 9:1 (iron:nitrogen+carbon), about 8:1 (iron:nitrogen+carbon), or about 6.65:1 (iron:nitrogen+carbon). In some examples, the carbon concentration is about 6 at. %.

The iron-carbon-nitrogen ribbons may be quenched to room temperature by a quenching medium, such as water, ice water, oil, or brine. The iron-carbon-nitrogen ribbons then are cryo-treated using a cryogenic coolant, such as liquid nitrogen or liquid helium (24). This step may be similar to or substantially the same as the corresponding step described with reference to FIG. 2.

After the cryo-treatment, the iron-carbon-nitrogen ribbons may be annealed (26). This step may be similar to or substantially the same as the corresponding step described with reference to FIG. 2.

Figure 6:
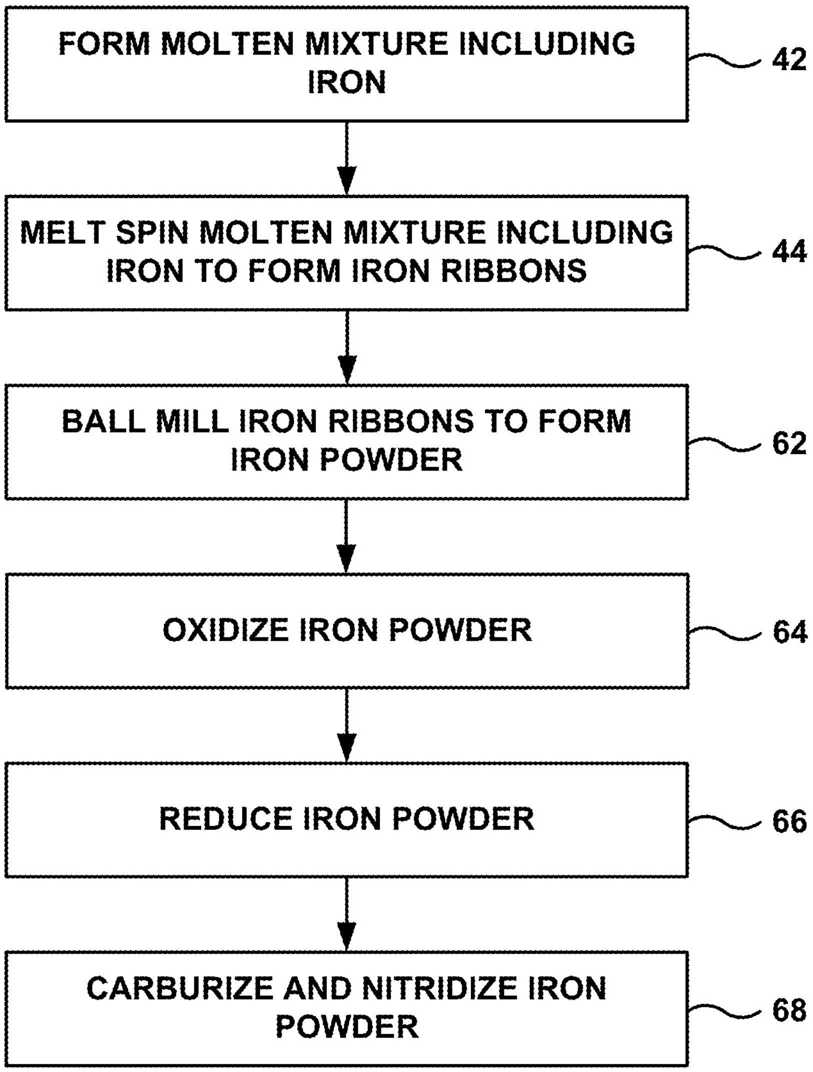
FIG. 6 is a flow diagram illustrating an example technique for forming a soft magnetic material that includes $\alpha'$-$Fe_{16}(N_xZ_{1-x})_2$ or $\alpha'$-$Fe_8(N_xZ_{1-x})$, or a mixture of at least one of $\alpha'$-$Fe_{16}N_2$ or $\alpha'$-$Fe_8N$ and at least one of $\alpha'$-$Fe_{16}Z_2$ or $\alpha'$-$Fe_8Z$, where Z includes at least one of C, B, or O, and x is a number greater than zero and less than one.

FIG. 6 is a flow diagram illustrating an example technique for forming a soft magnetic material that includes $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$, where Z includes at least one of C, B, or O, and x is a number greater than zero and less than one. Like the technique of FIG. 4, the technique of FIG. 6 includes forming a molten mixture including iron (42) and melt spinning the molten mixture including iron to form iron-containing ribbons (44). These steps may be similar to or the same as the corresponding steps described in FIG. 4. Once the iron-containing ribbons are formed, the ribbons may be ball milled to form iron-containing powder (62).

During the ball milling, a milling apparatus may be manipulated to cause agitation of milling media, such as milling spheres, which impact the iron-containing ribbon and eventually wear the iron-containing ribbon into powder. The milling media may be formed of a sufficiently hard material, such as steel, stainless steel, or the like. In some examples, the material from which the milling media are formed may not chemically react with the iron-containing ribbon or powder. In some examples, the milling media may have an average diameter between about 5 millimeters (mm) and about 20 mm.

Once ball milling (62) is complete, the iron-containing powder may have a relatively small average diameter. For example, the average diameter may be on the order of hundreds of nanometers, such as between about 100 nm and about 1 micrometer, or between about 300 nm and about 500 nm.

The iron-containing powder then may be carburized and nitrided (68). However, in some examples, the powder optionally may be oxidized to form oxides in and/or on the iron-containing powder (64), and/or may be exposed to a reducing atmosphere to reduce any oxides present in the iron-containing powder (66). Each of these steps may be similar to or substantially the same as the corresponding steps described with reference to FIGS. 1 and 4.

The iron-containing powder may be carburized and nitrided using a high temperature technique as described with reference to FIG. 5 or may be carburized and nitrided using a relatively low temperature technique. In the relatively low temperature carburizing and nitriding technique, the iron-containing powder may be exposed to a source of atomic nitrogen and a source of atomic carbon (simultaneously or sequentially). In some examples, in which the iron-containing powder is exposed to the source of atomic nitrogen and the source of atomic carbon sequentially, the iron-containing powder may be exposed to the source of atomic nitrogen at a temperature between about 120° C. and about 200° C., such as between about 140° C. and about 170° C. The iron-containing powder may be exposed to the source of atomic carbon at a temperature between about 700° C. and about 1100° C., such as between about 700° C. and about 750° C., or between about 960° C. and about 1100° C. The source of atomic nitrogen may be any of the sources described above with reference to FIGS. 1 and 2, and the source of atomic carbon may be any of the sources described above with reference to FIGS. 4 and 5. In some examples, the source of atomic nitrogen is ammonia, or the source of both atomic nitrogen and atomic carbon is urea.

The iron-carbon-nitrogen powder then may optionally be annealed, as described with reference to FIGS. 2 and 5. However, in some examples, the carburizing and nitriding at the relatively low temperature may directly form the soft magnetic material described herein and annealing may be omitted.

Figure 7:
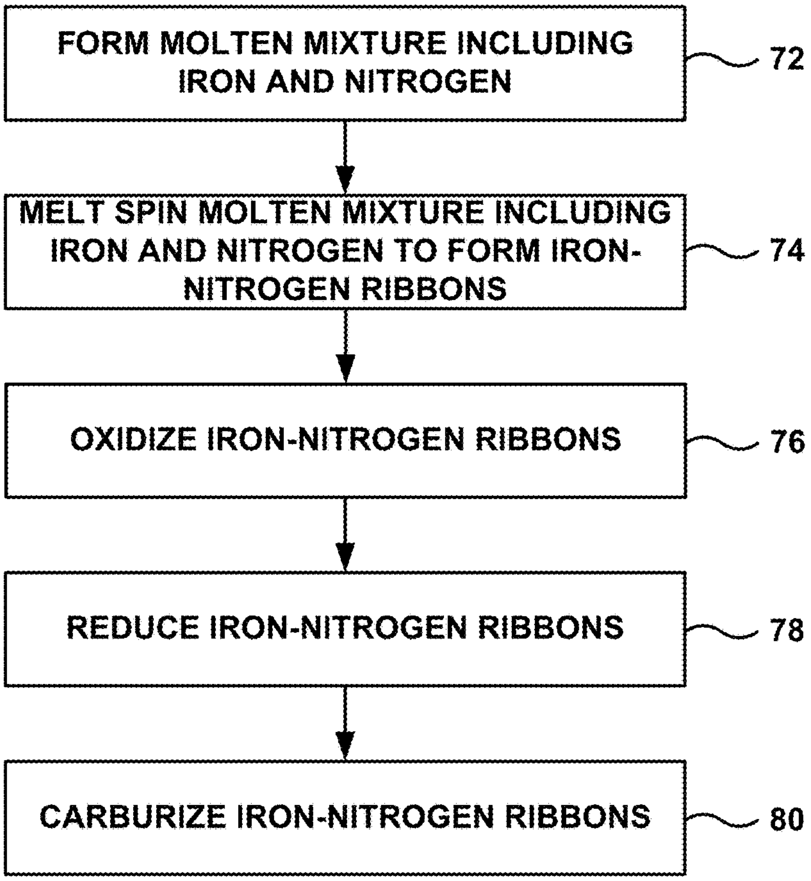
FIG. 7 is a flow diagram illustrating an example technique for forming a soft magnetic material that includes $\alpha'$-$Fe_{16}(N_xZ_{1-x})_2$ or $\alpha'$-$Fe_8(N_xZ_{1-x})$, or a mixture of at least one of $\alpha'$-$Fe_{16}N_2$ or $\alpha'$-$Fe_8N$ and at least one of $\alpha'$-$Fe_{16}Z_2$ or $\alpha'$-$Fe_8Z$, where Z includes at least one of C, B, or O, and x is a number greater than zero and less than one.

In some examples, a material that includes carbon and nitrogen may be used as the precursor material for forming the soft magnetic material described herein. FIG. 7 is a flow diagram illustrating an example technique for forming a soft magnetic material that includes α"-$Fe_{16}(N_xZ_{1-x})_2$ or α'-$Fe_8(N_xZ_{1-x})$, or a mixture of at least one of α'-$Fe_{16}N_2$ or α'-$Fe_8N$ and at least one of α'-$Fe_{16}Z_2$ or α'-$Fe_8Z$, where Z includes at least one of C, B, or O, and x is a number greater than zero and less than one. The technique of FIG. 7 includes forming a molten mixture including iron and nitrogen (72), melt spinning the molten mixture including iron and nitrogen to form iron-nitrogen ribbons (74), optionally oxidizing the iron-nitrogen ribbons (76), and optionally reducing the iron-nitrogen ribbons (78). Each of these steps may be similar to or substantially the same as corresponding steps described above with reference to FIGS. 1-3, except that the material is an iron-nitrogen material, not an iron-carbon material.

The technique of FIG. 7 then includes carburizing the iron-nitrogen ribbons (80) by exposing the iron-nitrogen ribbons to a source of carbon atoms. The source of carbon atoms may include, for example, carbon monoxide (CO), carbon dioxide ($CO_2$), or methane ($CH_4$), graphite, urea, or the like.

During the carburizing, the iron-nitrogen ribbons may be heated, for example, in a furnace, an autoclave, or the like. Pressure exerted in an autoclave may stabilize α'-$Fe_{16}(N_xZ_{1-x})_2$ or α'-$Fe_8(N_xZ_{1-x})$, or a mixture of at least one of α'-$Fe_{16}N_2$ or α'-$Fe_8N$ and at least one of α'-$Fe_{16}Z_2$ or α'-$Fe_8Z$, where Z includes at least one of C, B, or 0.

Figure 8:
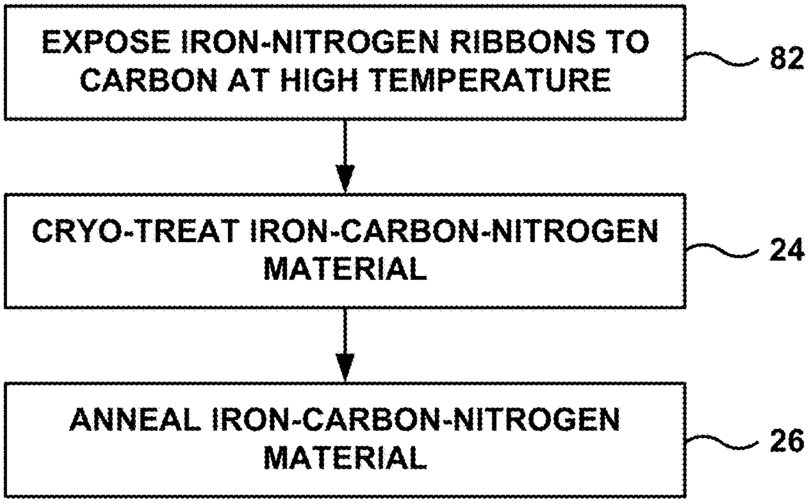
FIG. 8 is a flow diagram illustrating an example technique for carburizing an iron-nitrogen material to form a soft magnetic material that includes $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_{16}Z_2$ or $\alpha'$-$Fe_8Z$, where Z includes at least one of C, B, or O, and x is a number greater than zero and less than one.

The carburizing may be performed at a relatively high temperature, such as between about 960° C. and about 1100° C., or a relatively lower temperature, such as between about 700° C. and about 750° C. FIG. 8 is a flow diagram illustrating an example technique for carburizing an iron-nitrogen material at relatively high temperatures to form a soft magnetic material that includes α"-$Fe_{16}(N_xZ_{1-x})_2$ or α'-$Fe_8(N_xZ_{1-x})$, or a mixture of at least one of α"-$Fe_{16}N_2$ or α'-$Fe_8N$ and at least one of α"-$Fe_{16}Z_2$ or α'-$Fe_8Z$, where Z includes at least one of C, B, or O, and x is a number greater than zero and less than one. In the technique of FIG. 8, the iron-nitrogen ribbons are exposed to a source of atomic carbon at a relatively high temperature (82). The iron-nitrogen material may be exposed to the source of atomic carbon for at least about 30 minutes, such as about 45 minutes, about 1.5 hours, or about 2 hours. The carburizing process forms iron-carbon-nitrogen ribbons.

The carbon may be diffused into the iron-nitrogen ribbons so that a collective concentration of nitrogen and carbon is between about 8 atomic percent (at. %) and about 14 at. %, such as about 11 at. %. The concentration of nitrogen and carbon in iron may be an average concentration and may vary throughout the volume of the iron-carbon-nitrogen ribbon. In some examples, the atomic ratio of iron to the combination of nitrogen plus carbon is between about 11.5:1 (iron:nitrogen+carbon) and about 5.65:1 (iron:nitrogen+carbon). For example, the atomic ratio of iron to the combination of nitrogen and carbon may be about 9:1 (iron:nitrogen+carbon), about 8:1 (iron:nitrogen+carbon), or about 6.65:1 (iron:nitrogen+carbon). In some examples, the carbon concentration is about 6 at. %.

The iron-carbon-nitrogen ribbons may be quenched to room temperature by a quenching medium, such as water, ice water, oil, or brine. The iron-carbon-nitrogen ribbons then are cryo-treated using a cryogenic coolant, such as liquid nitrogen or liquid helium (24). This step may be similar to or substantially the same as the corresponding step described with reference to FIGS. 2 and 5.

After the cryo-treatment, the iron-carbon-nitrogen ribbons may be annealed (26). This step may be similar to or substantially the same as the corresponding step described with reference to FIGS. 2 and 5.

Figure 9:
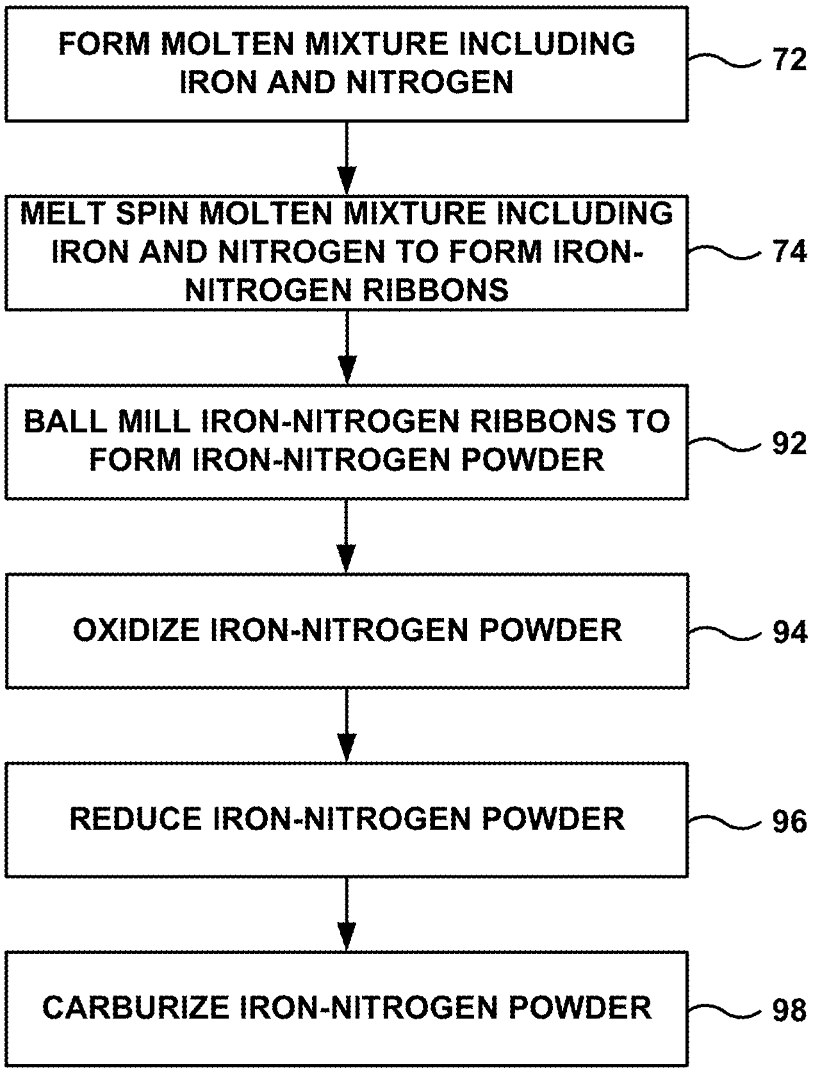
FIG. 9 is a flow diagram illustrating an example technique for forming a soft magnetic material that includes $\alpha''$-$Fe_{16}(N_xZ_{1-x})_2$ or $\alpha'$-$Fe_8(N_xZ_{1-x})$, or a mixture of at least one of $\alpha''$-$Fe_{16}N_2$ or $\alpha'$-$Fe_8N$ and at least one of $\alpha''$-$Fe_6Z_2$ or $\alpha'$-$Fe_8Z$, where Z includes at least one of C, B, or O, and x is a number greater than zero and less than one.

FIG. 9 is a flow diagram illustrating an example technique for forming a soft magnetic material that includes α"-$Fe_{16}(N_xZ_{1-x})_2$ or α'-$Fe_8(N_xZ_{1-x})$, or a mixture of at least one of α"-$Fe_{16}N_2$ or α'-$Fe_8N$ and at least one of α"-$Fe_{16}Z_2$ or α'-$Fe_8Z$, where Z includes at least one of C, B, or O, and x is a number greater than zero and less than one. Like the technique of FIG. 7, the technique of FIG. 9 includes forming a molten mixture including iron and nitrogen (72) and melt spinning the molten mixture including iron and nitrogen to form iron-nitrogen ribbons (74). These steps may be similar to or the same as the corresponding steps described in FIG. 7. Once the iron-nitrogen ribbons are formed, the ribbons may be ball milled to form iron-nitrogen powder (92).

During the ball milling, a milling apparatus may be manipulated to cause agitation of milling media, such as milling spheres, which impact the iron-containing ribbon and eventually wear the iron-containing ribbon into powder. The milling media may be formed of a sufficiently hard material, such as steel, stainless steel, or the like. In some examples, the material from which the milling media are formed may not chemically react with the iron-containing ribbon or powder. In some examples, the milling media may have an average diameter between about 5 millimeters (mm) and about 20 mm.

Once ball milling (92) is complete, the iron-containing powder may have a relatively small average diameter. For example, the average diameter may be on the order of hundreds of nanometers, such as between about 100 nm and about 1 micrometer, or between about 300 nm and about 500 nm.

The iron-nitrogen powder then may be carburized (98). However, in some examples, the powder optionally may be oxidized to form oxides in and/or on the iron-nitrogen powder (94), and/or may be exposed to a reducing atmosphere to reduce any oxides present in the iron-nitrogen powder (96). Each of these steps may be similar to or substantially the same as the corresponding steps described with reference to FIGS. 1, 4, and 7.

The iron-nitrogen powder may be carburized using a high temperature technique as described with reference to FIG. 8 or may be carburized using a relatively low temperature technique. In the relatively low temperature carburizing technique, the iron-nitrogen powder may be exposed to a source of atomic carbon at a temperature between about 700° C. and about 750° C. The source of atomic carbon may be any of the sources described above with reference to FIGS. 4 and 5. In some examples, the source of atomic carbon is methane.

The iron-carbon-nitrogen powder then may optionally be annealed, as described with reference to FIGS. 2, 5, and 8. However, in some examples, the carburizing at the relatively low temperature may directly form the soft magnetic material described herein and annealing may be omitted.

Figure 10:
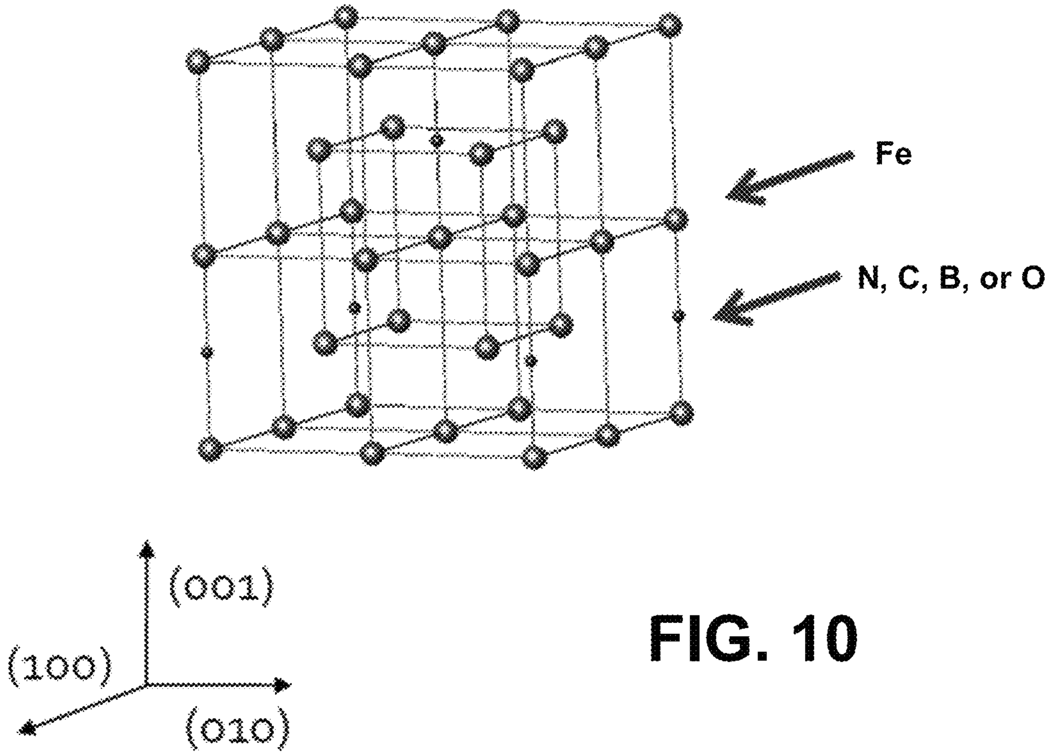
FIG. 10 is a conceptual diagram that shows an $\alpha''$-$Fe_{16}X_2$ unit cell, where X is at least one of N, C, B, or O.

FIG. 10 is a conceptual diagram that shows an α"-$Fe_{16}X_2$ unit cell. As shown in FIG. 10, in the α"-$Fe_{16}X_2$ phase, the X atoms are aligned along the (002) (iron) crystal planes. The X atoms may include at least one of N, C, B, or O. When all the X atoms are N atoms, the iron nitride unit cell is distorted such that the length of the unit cell along the <001> axis is approximately 6.28 angstroms (Å) while the length of the unit cell along the <010> and <100> axes is approximately 5.72 Å. The α"-$Fe_{16}N_2$ unit cell may be referred to as a bct unit cell when in the strained state. When the α"-$Fe_6N_2$ unit cell is in the strained state, the <001> axis may be referred to as the c-axis of the unit cell. The c-axis may be the magnetic easy axis of the α"-$Fe_6N_2$ unit cell. In other words, α"-$Fe_6N_2$ crystals exhibit magnetic anisotropy.

α"-$Fe_6N_2$ has high saturation magnetization and magnetic anisotropy constant. The high saturation magnetization and magnetic anisotropy constants result in a magnetic energy product that may be higher than rare earth magnets. Additionally, iron and nitrogen are abundant elements, and thus are relatively inexpensive and easy to procure.

Calculations show that the magnetocrystalline anisotropy of α"-$Fe_{16}N_2$ may be about $1.6\times10^7$ erg/$cm^3$. α"-$Fe_{16}N_2$ also has a relatively high theoretical magnetic saturation moment of about 2.3 Bohr magnetons per iron atom B/Fe.

Similarly, when X includes at least one of C, B, or O (Z atoms) α"-$Fe_6Z_2$ may be a hard magnetic material when the Z atoms are ordered within the iron crystal lattice. Like α"-$Fe_{16}N_2$, the Z atoms (C, B, or O) in ordered α"-$Fe_6Z_2$ may be positioned at octahedral interstitial sites within the iron crystal. However, in ordered α"-$Fe_{16}Z_2$, the lattice parameters may be different than the lattice parameters of α"-$Fe_{16}N_2$. For example, while not wishing to be bound by any theory, the presence of carbon atoms is expected to reduce the distance between the C atoms and the surrounding Fe atoms lying in the (002) (iron) crystal planes from 3.74 Angstroms to 3.68 Angstroms. This is expected to increase p-d mixing, which is expected to increase bandwidth and lower the density of states. This is expected to reduce the magnetocrystalline anisotropy of α"-$Fe_{16}C_2$ to a negative value. Similar results may be expected for B and O atoms.

Ordered α"-$Fe_{16}Z_2$, such as when Z is carbon (C), may exhibit magnetocrystalline anisotropy with a magnetic easy axis lying in the a-b plane (e.g., [100]; perpendicular to the c-axis). Hence, the direction of magnetocrystalline anisotropy in α"-$Fe_6Z_2$ may be substantially perpendicular to the direction of magnetocrystalline anisotropy in α"-$Fe_{16}N_2$. Calculations show that the magnetocrystalline anisotropy in ordered α"-$Fe_{16}C_2$ may be about $-1.4\times10^7$ erg/$cm^3$. α"-$Fe_{16}C_2$ also has a relatively high theoretical magnetic saturation moment of about 2.1 $\mu_B$/Fe.

Hence, when ordered α"-$Fe_{16}C_2$ is mixed in predetermined quantities with α"-$Fe_{16}N_2$ with c-axes of the respective α"-$Fe_{16}C_2$ and α"-$Fe_{16}N_2$ crystals oriented in substantially the same direction, the magnetocrystalline anisotropies of α"-$Fe_{16}C_2$ and α"-$Fe_6N_2$ may substantially cancel. This may result in a material with a magnetocrystalline anisotropy value of near zero (depending on the volume ratio of α"-$Fe_{16}C_2$ to α"-$Fe_6N_2$), while providing a theoretical magnetic saturation moment of, e.g., about 2.2 pB/Fe (the average of the theoretical magnetic saturation moments of α"-$Fe_6N_2$ and α"-$Fe_{16}C_2$). For example, a magnetic material including a volume ratio of α"-$Fe_6N_2$ to α"-$Fe_{16}C_2$ of about 4.667:5.333 may have a magnetic anisotropy of about 0 (e.g., less than about 10 Oersteds) and a theoretical magnetic saturation moment of about 2.2 $\mu_B$/Fe. In this way, a mixture of predetermined volumes of α"-$Fe_6N_2$ domains and α"-$Fe_{16}C_2$ domains may produce a soft magnetic material with a magnetocrystalline anisotropy value of near zero and a relatively high magnetic saturation moment. Similar results may be expected when B, O, or both are substituted for C, based on the similar atomic radii of C, B, and O.

Figure 11:
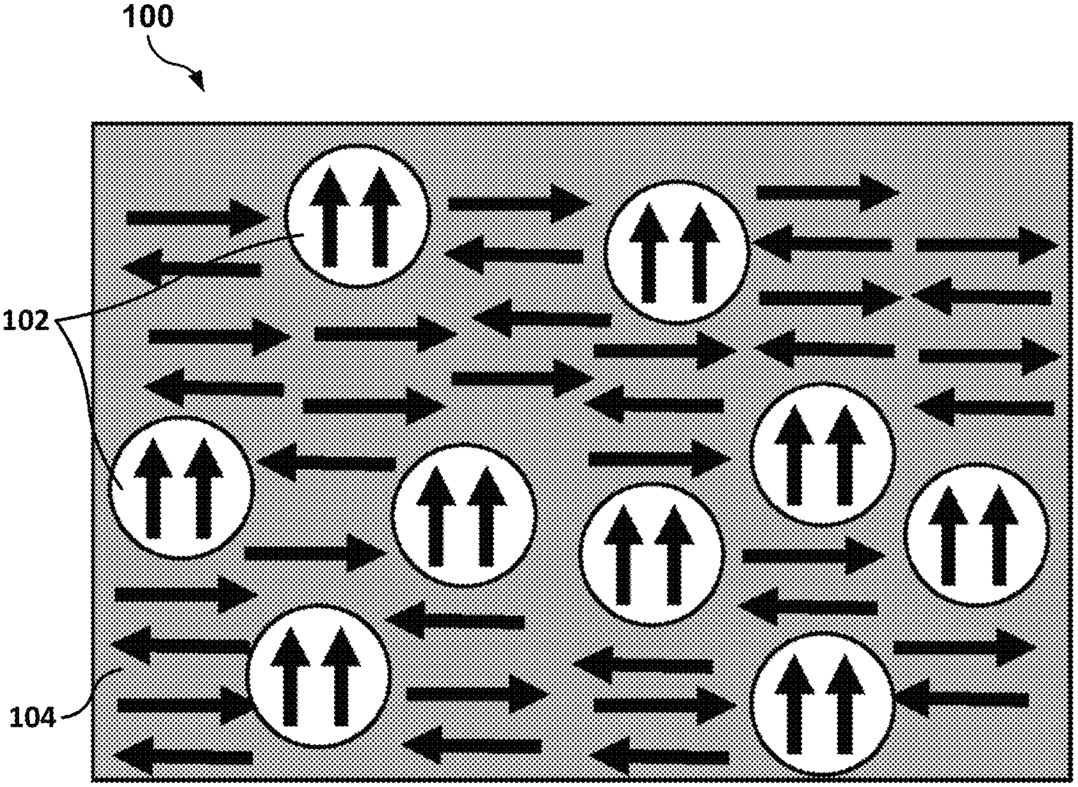
FIG. 11 is a conceptual diagram illustrating a magnetic material including domains of α"-$Fe_6N_2$ and domains of α"-$Fe_{16}Z_2$, where Z includes at least one of C, B, or O.

In some examples, the soft magnetic material formed by any of the techniques described herein may be similar to that shown in FIG. 11. FIG. 11 is a conceptual diagram illustrating a soft magnetic material 100 including domains of α"-$Fe_{16}N_2$ 102 and domains of α"-$Fe_{16}Z_2$ 104, where Z includes at least one of C, B, or O. In some examples, discrete domains of α"-$Fe_{16}N_2$ 102 may be present, along with discrete domains of α"-$Fe_{16}Z_2$ 104. The easy axes of the domains of α"-$Fe_{16}N_2$ 102 are illustrated as being oriented substantially vertically in FIG. 11, while the easy axes of the domains of α"-$Fe_{16}Z_2$ 104 are illustrated as being oriented substantially horizontally in FIG. 11. When domains of α"-$Fe_{16}N_2$ 102 and domains of α"-$Fe_{16}Z_2$ 104 are present in predetermined volumes (e.g., about 4.667:5.333), this may lead the magnetocrystalline anisotropy of similar magnitudes and opposite signs to annihilate each other, resulting in a soft magnetic material 100 with high saturation magnetization and low magnetocrystalline anisotropy.

In other examples, rather than all of the respective domains of α"-$Fe_{16}N_2$ 102 having their magnetic easy axes lying in substantially the same direction, the respective easy axes of the respective domains of α"-$Fe_{16}N_2$ 102 may be substantially randomly distributed. Similarly, the respective easy axes of the respective domains of α"-$Fe_{16}Z_2$ 104 may be substantially randomly distributed. This also may lead to a soft magnetic material 100 with high saturation magnetization and low magnetocrystalline anisotropy.

In some examples, soft magnetic material 100 including a mixture of domains of α"-$Fe_{16}N_2$ 12 and domains of α"-$Fe_{16}Z_2$ 104 may not include only domains of α"-$Fe_{16}N_2$ 102 and domains of α"-$Fe_{16}Z_2$ 104. For example, soft magnetic material 100 may include at least one $Fe_{16}(N_xZ_{1-x})_2$ phase domain in addition to domains of α"-$Fe_{16}N_2$ 102 and domains of α"-$Fe_{16}Z_2$ 104. The size of the domains may be between about 1 nm and about 100 micrometers. The average domain size distribution may influence the permeability of the material as evidenced by the slope of the hysteresis loop. In some examples, soft magnetic material 100 including a mixture of domains of α"-$Fe_{16}N_2$ 102 and domains of α"-$Fe_{16}Z_2$ 104 may include other iron phases, other iron nitride phases, other iron carbide phases, or other phases including other constituents (e.g., dopants or impurities) present in the soft magnetic material. Dopants may include, for example, Cu, Co, Ti, Mn, Al, V, Cr, Zn, Ga, Ge, Zr, nNb, Mo, P, Si, Mg, or the like. Dopants may be used to fine tune the microstructure and magnetocrystalline anisotropy of the soft magnetic material. In some examples, the dopants may be present in an amount between about 0.1 atomic percent and about 15 atomic percent.

In some examples, the structure shown in FIG. 11 may be formed by low temperature carburizing and/or nitriding an iron-containing material, and/or annealing a material including a mixture of iron, carbon, and nitrogen in selected ratios to convert the mixture of iron, carbon, and nitrogen to domains of α"-$Fe_6N_2$ 102 and domains of α"-$Fe_{16}Z_2$ 104. In other examples, the structure shown in FIG. 11 may be formed by first forming particles (e.g., ribbons or powder) including α"-$Fe_6N_2$ and particles including α"-$Fe_6Z_2$ (e.g., using melt spinning and/or milling), then consolidating the ribbons or particles to form the material including domains of α"-$Fe_{16}N_2$ 102 and domains of α"-$Fe_{16}Z_2$ 104.

In some examples, rather than including discrete domains of α"-$Fe_6N_2$ and α"-$Fe_{16}Z_2$, a material may include one or more crystals of $\alpha''$-$Fe_{16}(N_xZ_{1-x})_2$, where Z includes at least one of C, B, or O, and x is a number greater than 0 and less than 1. In these examples, rather than forming discrete domains, the iron, nitrogen, and Z atoms form a crystalline structure in which some interstitial locations are filled by nitrogen atoms and some interstitial locations are filled by Z atoms. For example, FIG. 10 illustrates an example $\alpha''$-$Fe_6X_2$ unit cell, as described above. The unit cell in FIG. 10 illustrates five X atoms (1 X atom is fully in the unit cell, and 4 X atoms are partially in the unit cell). In $\alpha''$-$Fe_{16}(N_xZ_{1-x})_2$ at least some of the X atoms may be N atoms, and at least some of the X atoms may be Z (C, B, or O) atoms. Although $\alpha''$-$Fe_{16}(N_xZ_{1-x})_2$ may not include some N atoms and some Z atoms in each unit cell (e.g., some unit cells may include only N atoms and some unit cells may include only Z atoms), when averaged over the volume of the soft magnetic material, the ratio of Fe to N to Z atoms may be expressed by the chemical formula $Fe_{16}(N_xZ_{1-x})_2$, where x is greater than 0 and less than 1. In some examples, X may be about 0.5 or about 0.4667.

In some examples, the soft magnetic material including $Fe_{16}(N_xZ_{1-x})_2$ may not include only $Fe_{16}(N_xZ_{1-x})_2$. For example, the soft magnetic material may include at least one $\alpha''$-$Fe_6N_2$ phase domain or at least one $\alpha''$-$Fe_6Z_2$ domain in addition to at least one $Fe_{16}(N_xZ_{1-x})_2$ phase domain. In some examples, the soft magnetic material including $Fe_{16}(N_xZ_{1-x})_2$ may include other iron phases, other iron nitride phases, other iron carbide phases, or other phase including other constituents (e.g., dopants or impurities) present in the soft magnetic material.

In some examples, a soft magnetic material including at least one $\alpha''$-$Fe_{16}(N_xZ_{1-x})_2$ phase domain may include at least about 35 volume percent $\alpha''$-$Fe_{16}(N_xZ_{1-x})_2$ phase domain(s). In other examples, the soft magnetic material may include at least about 40 volume percent, at least about 50 volume percent, or at least about 60 volume percent $\alpha''$-$Fe_{16}(N_xZ_{1-x})_2$ phase domain(s). Similarly, a soft magnetic material including a mixture of $\alpha''$-$Fe_{16}N_2$ and $\alpha''$-$Fe_{16}Z_2$ may include at least about 35 volume percent of the combination of $\alpha''$-$Fe_{16}N_2$ and $\alpha''$-$Fe_{16}Z_2$ phase domains. In other examples, the soft magnetic material may include at least about 40 volume percent, at least about 50 volume percent, or at least about 60 volume percent of the combination of $\alpha''$-$Fe_{16}N_2$ and $\alpha''$-$Fe_{16}Z_2$ phase domains.

In some examples, the soft magnetic material including $Fe_{16}(N_xZ_{1-x})_2$ or a mixture of $\alpha''$-$Fe_{16}N_2$ and $\alpha''$-$Fe_{16}Z_2$ may have a saturation magnetization of at least about 219 emu/gram, which is the saturation magnetization of pure iron. In some examples, the soft magnetic material including $Fe_{16}(N_xZ_{1-x})_2$ or a mixture of $\alpha''$-$Fe_{16}N_2$ and $\alpha''$-$Fe_{16}Z_2$ may have a saturation magnetization of at least about 242 emu/gram, which is the saturation magnetization of $Fe_{65}Co_{35}$. In some examples, the soft magnetic material including $Fe_{16}(N_xZ_{1-x})_2$ or a mixture of $\alpha''$-$Fe_{16}N_2$ and $\alpha''$-$Fe_{16}Z_2$ may have a saturation magnetization of at least about 250 emu/gram.

In some examples, the soft magnetic material including $Fe_{16}(N_xZ_{1-x})_2$ or a mixture of $\alpha''$-$Fe_{16}N_2$ and $\alpha''$-$Fe_{16}Z_2$ may have a soft magnetic coercivity of less than or equal to about 10 Oersteds. In some examples, the soft magnetic material including $\alpha''$-$Fe_{16}(N_xZ_{1-x})_2$ or a mixture of $\alpha''$-$Fe_{16}N_2$ and $\alpha''$-$Fe_{16}Z_2$ also may possess high magnetic permeability, high frequency response, or the like.

The soft magnetic materials described herein may be formed into bulk soft magnetic materials by assembling multiple ribbons, powders, or the like. The ribbons, powders, or the like may be assembled using compaction, resins or adhesives, or the like. In some examples, the ribbons, powders, or the like may be assembled in a relatively low temperature process, e.g., a process performed at less than about 200° C., to reduce or substantially avoid affecting the magnetic properties of the soft magnetic materials. The bulk soft magnetic material may be formed with any desired shape during the assembly process, e.g., depending on the final use of the bulk soft magnetic material.

In some examples, the soft magnetic materials that are assembled into bulk soft magnetic materials may include oxide coatings or shells. For instance, as described above, during some preparation techniques, the material is oxidized and, optionally, reduced. The oxidation may form an oxide (e.g., iron oxide) outer layer or shell, which may be left (i.e., not reduced) or may be not fully reduced (i.e., reduction is performed, but at conditions that result in some oxide remaining). Alternatively, the material may be oxidized after forming the soft magnetic material including $\alpha''$-$Fe_6(N_xZ_{1-x})_2$ or a mixture of $\alpha''$-$Fe_{16}N_2$ and $\alpha''$-$Fe_6Z_2$, e.g., using an intentional reaction process or by exposing the material to ambient air. The oxide coating or shell may be useful when the bulk soft magnetic material is used in some applications, e.g., high frequency electromagnetic applications.

In some examples, a powder including a soft magnetic material including $\alpha''$-$Fe_{16}(N_xZ_{1-x})_2$ or a mixture of $\alpha''$-$Fe_{16}N_2$ and $\alpha''$-$Fe_{16}Z_2$ may be used for electromagnetic shielding. For instance, the powder may be spray coated on a component with any selected shape to form an electromagnetic shield for all or part of the component.

Clause 1: A method comprising: forming a soft magnetic material by a technique comprising melt spinning, wherein the soft magnetic material comprises at least one of: at least one of an $\alpha''$-$Fe_6(N_xZ_{1-x})_2$ phase domain or an $\alpha'$-$Fe_8(N_xZ_{1-x})$, wherein Z includes at least one of C, B, or O, and wherein x is a number greater than zero and less than one; or at least one of an $\alpha''$-$Fe_{16}N_2$ phase domain or an $\alpha'$-$Fe_8N$ phase domain, and at least one of an $\alpha''$-$Fe_{16}Z_2$ phase domain or an $\alpha'$-$Fe_8Z$ phase domain.

Clause 2: The method of clause 1, wherein forming the soft magnetic material by the technique comprising melt spinning comprises: forming a molten mixture comprising iron and carbon; melt spinning the molten mixture comprising iron and carbon to form iron-carbon ribbons; and nitriding the iron-carbon ribbons to form an iron-carbon-nitrogen material.

Clause 3: The method of clause 2, wherein nitriding the iron-carbon ribbons comprises exposing the iron-carbon ribbons to a nitrogen source at a temperature of between about 650° C. and about 900° C.

Clause 4: The method of clause 3, wherein the nitrogen source comprises at least one of ammonia, ammonium nitrate, urea, an amide, or hydrazine.

Clause 5: The method of any one of clauses 2 to 4, further comprising cryo-treating the iron-carbon-nitrogen material in liquid nitrogen.

Clause 6: The method of any one of clauses 2 to 5, further comprising annealing the iron-carbon-nitrogen material in a nitrogen-containing atmosphere at a temperature between about 100° C. and about 210° C. for between about 5 hours and about 100 hours.

Clause 7: The method of any one of clauses 2 to 6, further comprising, prior to nitriding the iron-carbon ribbons, exposing the iron-carbon ribbons to a reducing atmosphere to reduce a concentration of oxides in the iron-carbon ribbon.

Clause 8: The method of clause 7, further comprising, prior to exposing the iron-carbon ribbons to the reducing atmosphere, exposing the iron-carbon ribbons to an oxidizing atmosphere to form oxides in the iron-carbon ribbons, wherein exposing the iron-carbon ribbons to the reducing atmosphere removes at least some of the oxides and forms pores in the iron-carbon ribbons.

Clause 9: The method of any one of clauses 2 to 8, further comprising, prior to nitriding the iron-carbon ribbons, leaching some carbon from at least a surface of the iron-carbon ribbons to create porosity in the iron-carbon ribbons.

Clause 10: The method of clause 1, wherein forming the soft magnetic material by the technique comprising melt spinning comprises: forming a molten mixture comprising iron and carbon; melt spinning the molten mixture comprising iron and carbon to form iron-carbon ribbons; ball milling the iron-carbon ribbons to form iron-carbon powder; and nitriding the iron-carbon powder.

Clause 11: The method of clause 10, wherein nitriding the iron-carbon powder comprises exposing the iron-carbon powder to a nitrogen source at a temperature between about 100° C. and about 210° C. for between about 5 hours and about 100 hours.

Clause 12: The method of clause 11, wherein the nitrogen source comprises at least one of ammonia, ammonium nitrate, urea, an amide, or hydrazine.

Clause 13: The method of any one of clauses 10 to 12, further comprising, prior to nitriding the iron-carbon powder, exposing the iron-carbon powder to a reducing atmosphere to reduce a concentration of oxides in the iron-carbon powder.

Clause 14: The method of clause 13, further comprising, prior to exposing the iron-carbon powder to the reducing atmosphere, exposing the iron-carbon powder to an oxidizing atmosphere to form oxides in the iron-carbon powder, wherein exposing the iron-carbon powder to the reducing atmosphere removes at least some of the oxides and forms pores in the iron-carbon powder.

Clause 15: The method of any one of clauses 10 to 14, further comprising, prior to nitriding the iron-carbon powder, leaching some carbon from at least a surface of the iron-carbon powder to create porosity in the iron-carbon powder.

Clause 16: The method of any one of claims 2 to 15, wherein forming the molten mixture comprising iron and carbon comprises melting cast iron.

Clause 17: The method of clause 16, wherein the cast iron is encapsulated in elemental iron.

Clause 18: The method of any one of clauses 2 to 17, wherein the molten mixture comprises a substantially homogeneous distribution of carbon.

Clause 19: The method of clause 1, wherein forming the soft magnetic material by the technique comprising melt spinning comprises: forming a molten mixture comprising iron; melt spinning the molten mixture comprising iron and carbon to form iron ribbons; and carburizing and nitriding the iron ribbons to form an iron-carbon-nitrogen material.

Clause 20: The method of clause 19, wherein carburizing and nitriding the iron ribbons comprises exposing the iron ribbons to a nitrogen source at a temperature of between about 650° C. and about 900° C.

Clause 21: The method of clause 20, wherein the nitrogen source comprises at least one of ammonia, ammonium nitrate, urea, an amide, or hydrazine.

Clause 22: The method of any one of clauses 19 to 21, wherein carburizing and nitriding the iron ribbons comprises exposing the iron ribbons to a carbon source.

Clause 23: The method of clause 22, wherein the carbon source comprises at least one of urea, graphite, carbon monoxide, carbon dioxide, or methane.

Clause 24: The method of clause 19, wherein carburizing and nitriding the iron ribbons comprises exposing the iron ribbons to a carbon-nitrogen source.

Clause 25: The method of clause 24, wherein the carbon-nitrogen source comprises a carbamide.

Clause 26: The method of any one of clauses 19 to 25, further comprising cryo-treating the iron-carbon-nitrogen material in liquid nitrogen.

Clause 27: The method of any one of claims 19 to 26, further comprising annealing the iron-carbon-nitrogen material in a nitrogen-containing atmosphere at a temperature between about 100° C. and about 210° C. for between about 5 hours and about 100 hours.

Clause 28: The method of any one of clauses 19 to 27, further comprising, prior to carburizing and nitriding the iron ribbons, exposing the iron ribbons to a reducing atmosphere to reduce a concentration of oxides in the iron ribbon.

Clause 29: The method of clause 28, further comprising, prior to exposing the iron ribbons to the reducing atmosphere, exposing the iron ribbons to an oxidizing atmosphere to form oxides in the iron ribbons, wherein exposing the iron ribbons to the reducing atmosphere removes at least some of the oxides and forms pores in the iron ribbons.

Clause 30: The method of any one of clauses 19 to 29, further comprising, prior to carburizing and nitriding the iron ribbons, leaching some carbon from at least a surface of the iron ribbons to create porosity in the iron ribbons.

Clause 31: The method of clause 1, wherein forming the soft magnetic material by the technique comprising melt spinning comprises: forming a molten mixture comprising iron; melt spinning the molten mixture comprising iron to form iron ribbons; ball milling the iron ribbons to form iron powder; and carburizing and nitriding the iron powder to form an iron-carbon-nitrogen material.

Clause 32: The method of clause 31, wherein nitriding the iron-carbon powder comprises exposing the iron-carbon powder to a nitrogen source at a temperature between about 100° C. and about 210° C. for between about 5 hours and about 100 hours.

Clause 33: The method of clause 32, wherein the nitrogen source comprises ammonia, ammonium nitrate, urea, an amide, or hydrazine.

Clause 34: The method of any one of clauses 31 to 33, wherein carburizing and nitriding the iron ribbons comprises exposing the iron ribbons to a carbon source.

Clause 35: The method of clause 34, wherein the carbon source comprises at least one of urea, graphite, carbon monoxide, carbon dioxide, or methane.

Clause 36: The method of clause 31, wherein carburizing and nitriding the iron ribbons comprises exposing the iron ribbons to a carbon-nitrogen source.

Clause 37: The method of clause 36, wherein the carbon-nitrogen source comprises a carbamide.

Clause 38: The method of any one of clauses 31 to 37, further comprising, prior to carburizing and nitriding the iron powder, exposing the iron powder to a reducing atmosphere to reduce a concentration of oxides in the iron powder.

Clause 39: The method of clause 38, further comprising, prior to exposing the iron powder to the reducing atmosphere, exposing the iron powder to an oxidizing atmosphere to form oxides in the iron powder, wherein exposing the iron powder to the reducing atmosphere removes at least some of the oxides and forms pores in the iron powder.

Clause 40: The method of clause 1, wherein forming the soft magnetic material by the technique comprising melt spinning comprises: forming a molten mixture comprising iron and nitrogen; melt spinning the molten mixture comprising iron and nitrogen to form iron-nitrogen ribbons; and carburizing the iron-nitrogen ribbons to form an iron-carbon-nitrogen material.

Clause 41: The method of clause 40, wherein nitriding the iron-nitrogen ribbons comprises exposing the iron-nitrogen ribbons to a carbon source.

Clause 42: The method of clause 41, wherein the carbon source comprises at least one of urea, graphite, carbon monoxide, carbon dioxide, or methane.

Clause 43: The method of any one of clauses 40 to 42, further comprising cryo-treating the iron-carbon-nitrogen in liquid nitrogen.

Clause 44: The method of any one of clauses 40 to 43, further comprising annealing the iron-carbon-nitrogen material in a nitrogen-containing atmosphere at a temperature between about 100° C. and about 210° C. for between about 5 hours and about 100 hours.

Clause 45: The method of any one of clauses 40 to 44, further comprising, prior to carburizing the iron-nitrogen ribbons, exposing the iron-nitrogen ribbons to a reducing atmosphere to reduce a concentration of oxides in the iron-nitrogen ribbon.

Clause 46: The method of clause 45, further comprising, prior to exposing the iron-nitrogen ribbons to the reducing atmosphere, exposing the iron-nitrogen ribbons to an oxidizing atmosphere to form oxides in the iron-nitrogen ribbons, wherein exposing the iron-nitrogen ribbons to the reducing atmosphere removes at least some of the oxides and forms pores in the iron-nitrogen ribbons.

Clause 47: The method of any one of clause 40 to 46, further comprising, prior to carburizing the iron-nitrogen ribbons, leaching some nitrogen from at least a surface of the iron-nitrogen ribbons to create porosity in the iron-nitrogen ribbons.

Clause 48: The method of clause 1, wherein forming the soft magnetic material by the technique comprising melt spinning comprises: forming a molten mixture comprising iron and nitrogen; melt spinning the molten mixture comprising iron and nitrogen to form iron-nitrogen ribbons; ball milling the iron-nitrogen ribbons to form iron-nitrogen powder; and carburizing the iron-nitrogen powder.

Clause 49: The method of clause 48, wherein carburizing the iron-nitrogen powder comprises exposing the iron-carbon powder to a carbon source.

Clause 50: The method of clause 49, wherein the carbon source comprises at least one of urea, graphite, carbon monoxide, carbon dioxide, or methane.

Clause 51: The method of any one of clauses 48 to 50, further comprising, prior to carburizing the iron-nitrogen powder, exposing the iron-nitrogen powder to a reducing atmosphere to reduce a concentration of oxides in the iron-nitrogen powder.

Clause 52: The method of clause 51, further comprising, prior to exposing the iron-nitrogen powder to the reducing atmosphere, exposing the iron-nitrogen powder to an oxidizing atmosphere to form oxides in the iron-nitrogen powder, wherein exposing the iron-nitrogen powder to the reducing atmosphere removes at least some of the oxides and forms pores in the iron-nitrogen powder.

Clause 53: The method of any one of clauses 48 to 52, further comprising, prior to carburizing the iron-nitrogen powder, leaching some carbon from at least a surface of the iron-nitrogen powder to create porosity in the iron-nitrogen powder.

Clause 54: The method of any one of claims 40 to 53, wherein the molten mixture comprises a substantially homogeneous distribution of nitrogen.

EXAMPLES

Cast iron ingots with known carbon concentrations were wrapped in pure iron foils with selected thicknesses to achieve a desired carbon concentration. The ingots were melted in an arc melting machine (a SP-MSM20-7 compact vacuum arc melting system, available from MTI Corporation) at a temperature of about 1600° C. at 700 mTorr. Between 6 and 10 flips of the molten material were made to approach a homogeneous composition.

The molten material was then melt spun using a Melt Spinner SC, available from Edmund Buhler GmbH. The gap distance was set at 0.3 mm and the wheel speed was about 50 Hz. The melting temperature was between about 1300° C. and about 1500° C., depending on the carbon content.

Figure 12:
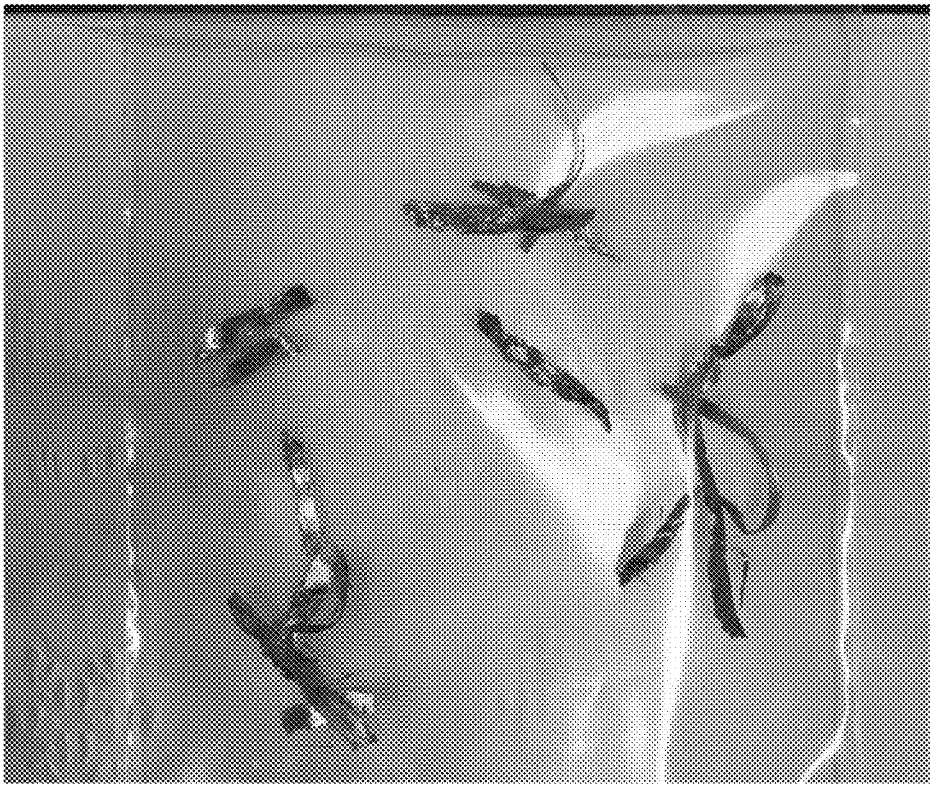
FIG. 12 is a photograph of iron-carbon ribbons including about 6 atomic percent carbon.
Figure 13:
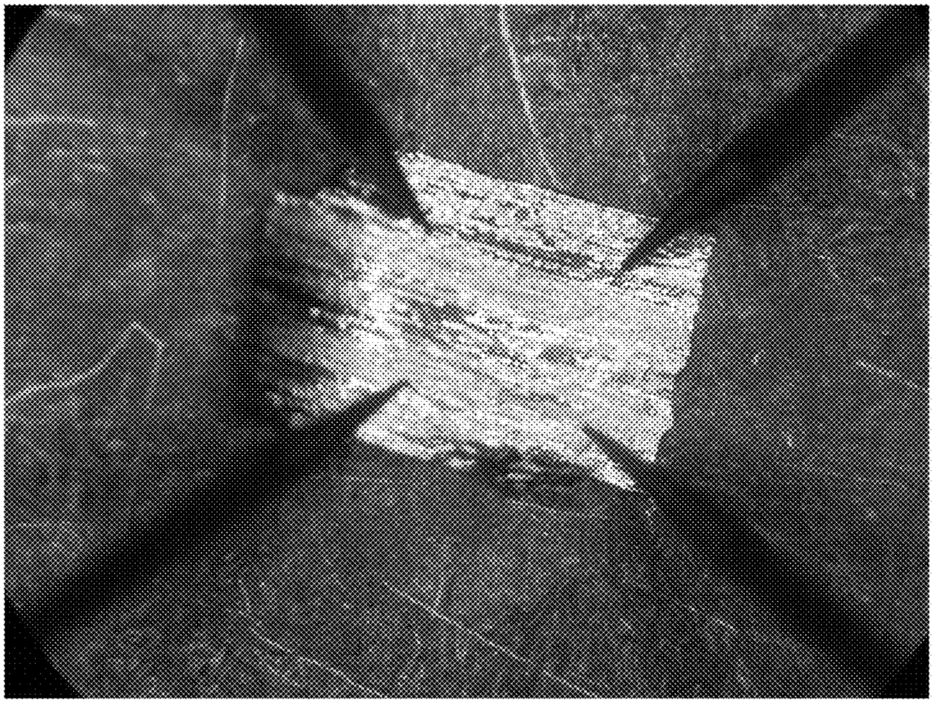
FIG. 13 is a zoomed-in view of an iron-carbon ribbon.
Figure 14:
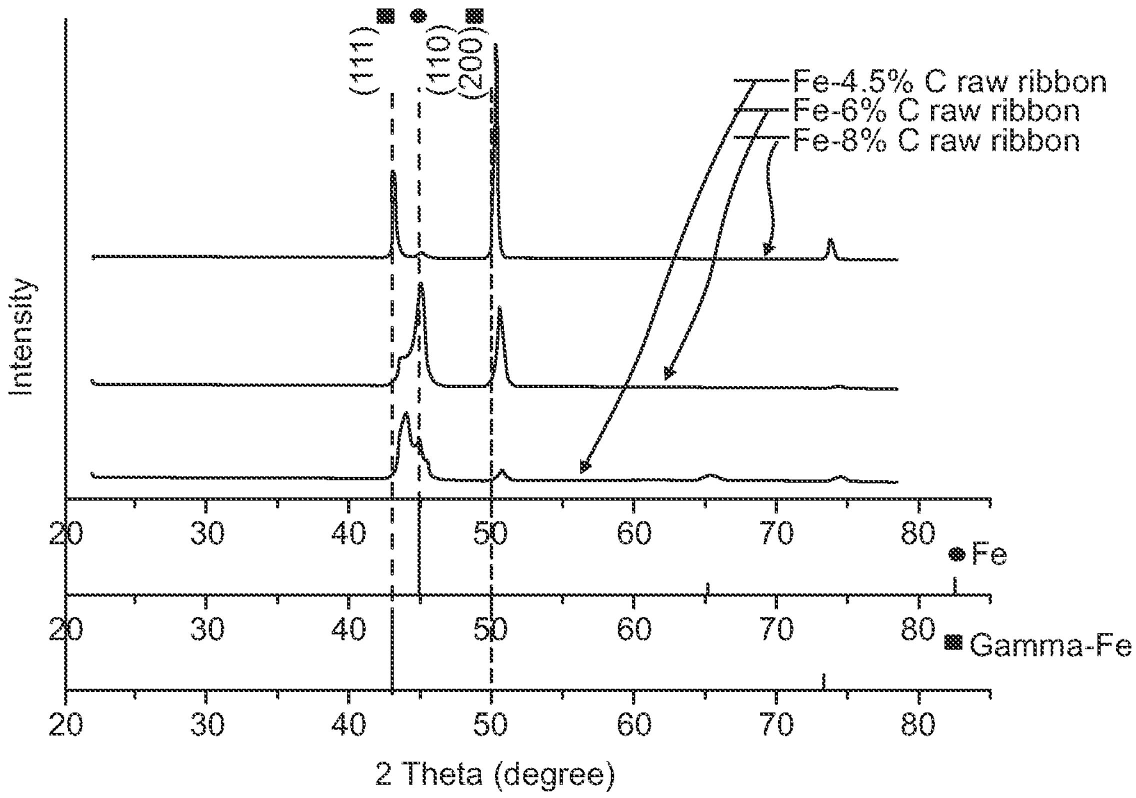
FIG. 14 is an x-ray diffraction plot for iron-carbon ribbons having different carbon content.

The resulting ribbons are shown in FIGS. 12 and 13. The ribbons had a thickness between about 30 micrometers and about 60 micrometers. The ribbons exhibited strong γ-Fe(C) peaks when the carbon concentration was high (e.g., about 8 atomic percent). The α-Fe(C) peaks overlapped the γ-Fe (C) at lower carbon concentrations (e.g., 4.5 atomic percent). FIG. 14 is an x-ray diffraction plot for iron-carbon ribbons having different carbon content (4.5 atomic percent, 6 atomic percent, and 8 atomic percent carbon).

Figure 15:
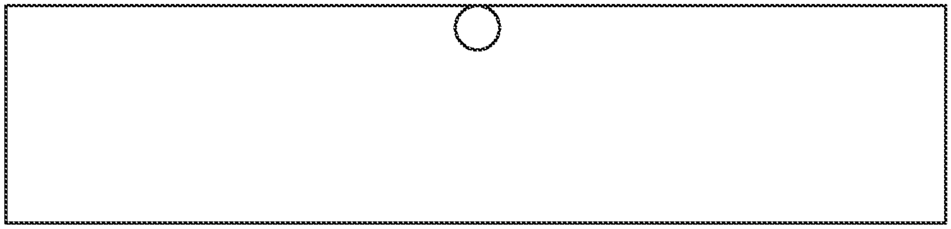
FIG. 15 is a conceptual diagram illustrating a location within an iron-carbon ribbon at which the data shown in FIGS. 16A-16E was measured.
Figure 16A:
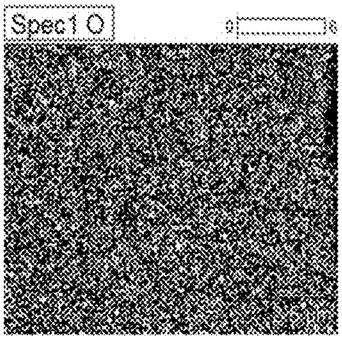
FIGS. 16A-16C are scanning electron microscopy wavelength-dispersive spectrometry images of an example iron-carbon ribbon at the location illustrated in FIG. 15.
Figure 16B:
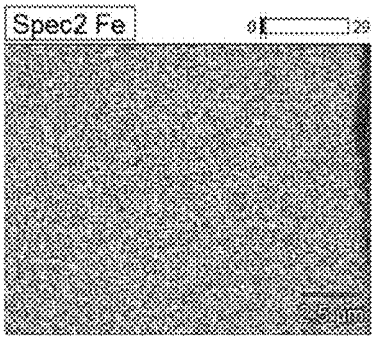
Figure 16C:
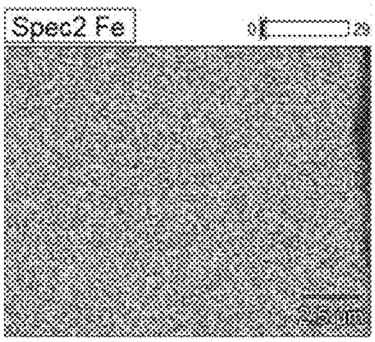
Figure 16D:
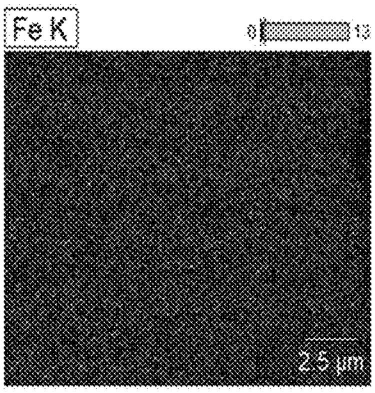
FIGS. 16D and 16E are scanning electron microscopy energy-dispersive spectrometry images of an example iron-carbon ribbon at the location illustrated in FIG. 15.
Figure 16E:
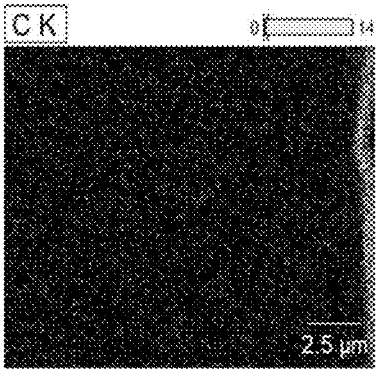

FIG. 15 is a conceptual diagram illustrating a location within an iron-carbon ribbon at which the data shown in FIGS. 16A-16E was measured. The iron-carbon ribbon had a nominal carbon content of 6 atomic percent. FIGS. 16A-16C are scanning electron microscopy wavelength-dispersive spectrometry images of an example iron-carbon ribbon at the location illustrated in FIG. 15 collected using a JEOL JXA-8350FPlus Electron Probe Microanalyzer, available from JEOL USA, Inc., Peabody Massachusetts FIGS. 16D and 16E are scanning electron microscopy energy-dispersive spectrometry images of an example iron-carbon ribbon at the location illustrated in FIG. 15 collected using the JEOL JXA-8350FPlus Electron Probe Microanalyzer. As shown in FIGS. 16A-16E, carbon distributed substantially homogeneously in the iron, with no significant clustering. The carbon content at this portion of the iron-carbon ribbon was about 7.861 atomic percent.

Figure 17:
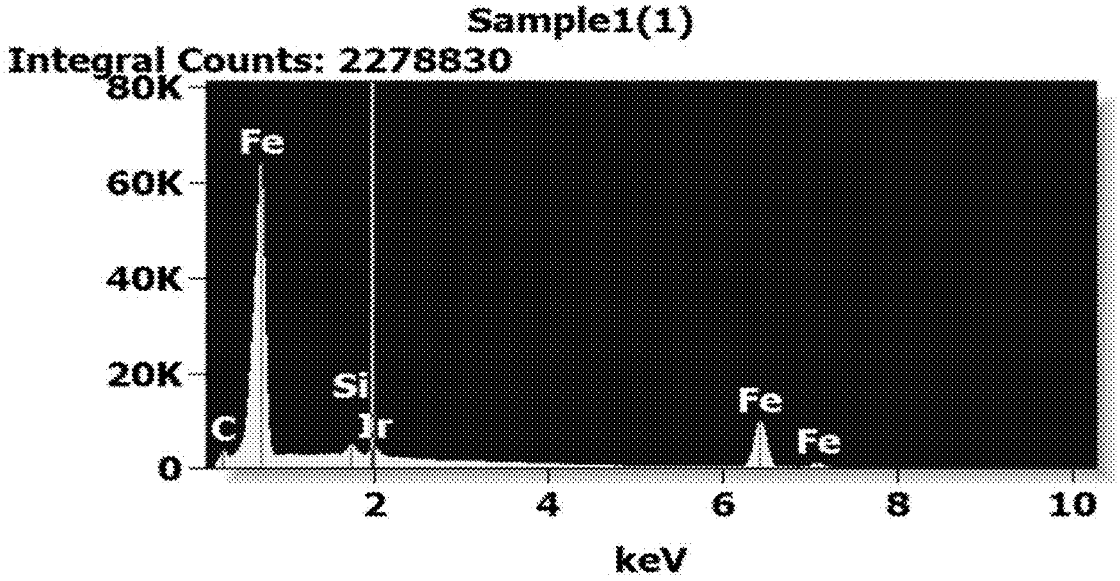
FIG. 17 is a plot of chemical composition of the iron-carbon ribbon at the location shown in FIG. 15, generated using scanning electron microscopy energy-dispersive spectrometry.

FIG. 17 is a plot of chemical composition of the iron-carbon ribbon at the location shown in FIG. 15, generated using scanning electron microscopy energy-dispersive spectrometry. Silicon was present due to the polishing process and iridium was detected because of its presence in the coating before SEM-WDS measurement.

Figure 18:
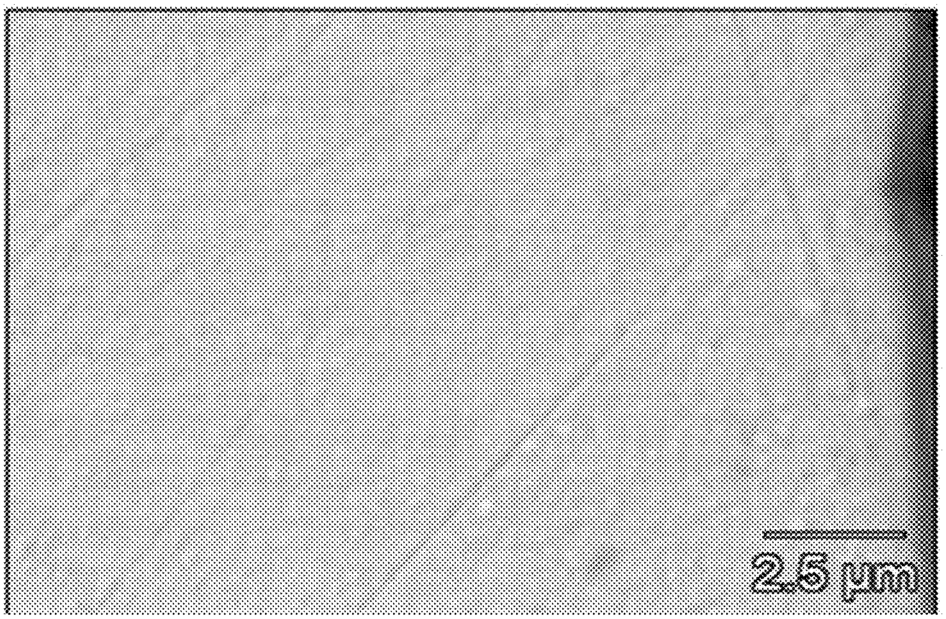
FIG. 18 is an image of the iron-carbon ribbon of FIG. 15.

FIG. 18 is an image of the iron-carbon ribbon of FIG. 15.

Figure 19:
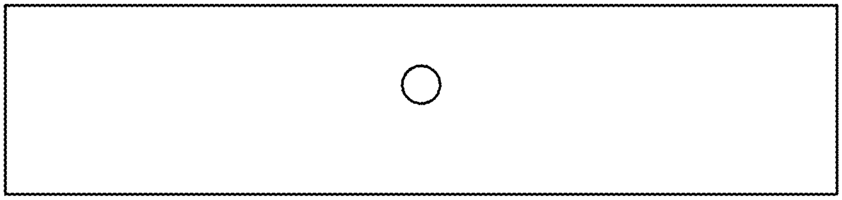
FIG. 19 is a conceptual diagram illustrating a location within an iron-carbon ribbon at which the data shown in FIGS. 20A-20E was measured.
Figure 20A:
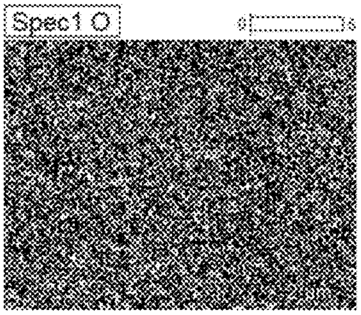
FIGS. 20A-20C are scanning electron microscopy wavelength-dispersive spectrometry images of an example iron-carbon ribbon at the location illustrated in FIG. 19.
Figure 20B:
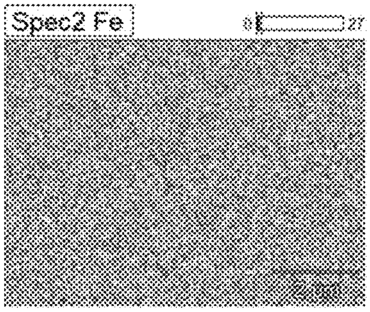
Figure 20C:
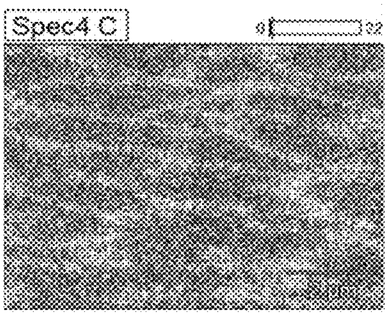
Figure 20D:
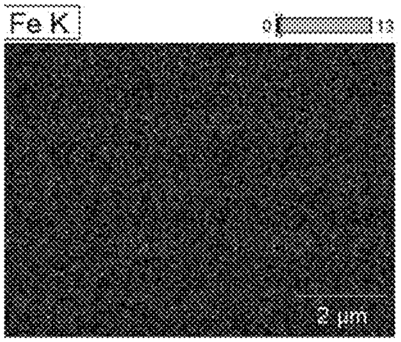
FIGS. 20D and 20E are scanning electron microscopy energy-dispersive spectrometry images of an example iron-carbon ribbon at the location illustrated in FIG. 19.
Figure 20E:
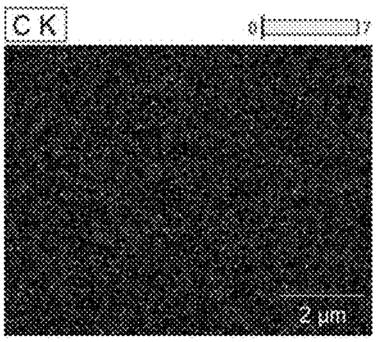

FIG. 19 is a conceptual diagram illustrating a location within an iron-carbon ribbon at which the data shown in FIGS. 20A-20E was measured. The iron-carbon ribbon is the same ribbon as shown in FIG. 18. FIGS. 20A-20C are scanning electron microscopy wavelength-dispersive spectrometry images of an example iron-carbon ribbon at the location illustrated in FIG. 19 collected using the JEOL JXA-8350FPlus Electron Probe Microanalyzer. FIGS. 20D and 20E are scanning electron microscopy energy-dispersive spectrometry images of an example iron-carbon ribbon at the location illustrated in FIG. 19 collected using the JEOL JXA-8350FPlus Electron Probe Microanalyzer. As shown in FIGS. 16A-16C, there was some clustering of carbon at this location of the iron-carbon ribbon. The carbon content at this portion of the iron-carbon ribbon was between about 5.7 and 6 atomic percent.

Figure 21:
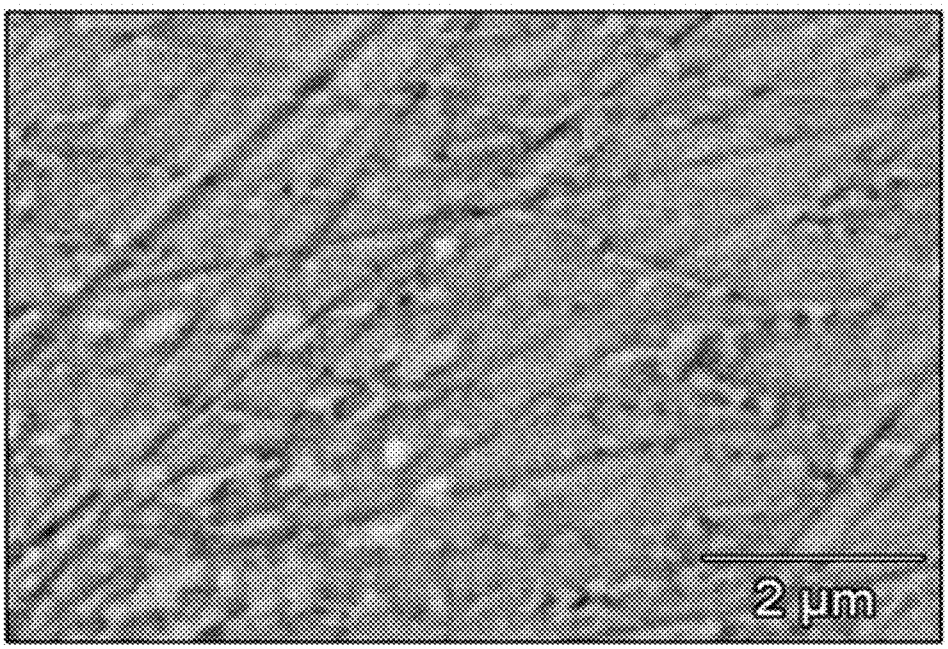
FIG. 21 is an image of the iron-carbon ribbon of FIG. 19.

FIG. 21 is an image of the iron-carbon ribbon of FIG. 19.

Figure 22:
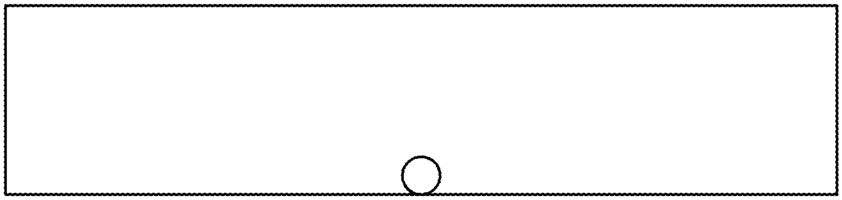
FIG. 22 is a conceptual diagram illustrating a location within an iron-carbon ribbon at which the data shown in FIGS. 23A-23E was measured.
Figure 23A:
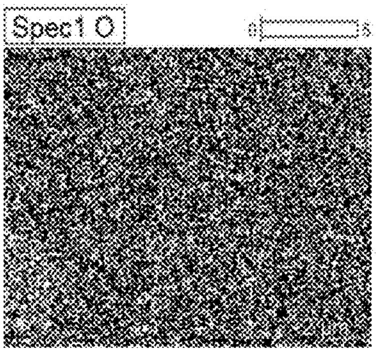
FIGS. 23A-23C are scanning electron microscopy wavelength-dispersive spectrometry images of an example iron-carbon ribbon at the location illustrated in FIG. 22.
Figure 23B:
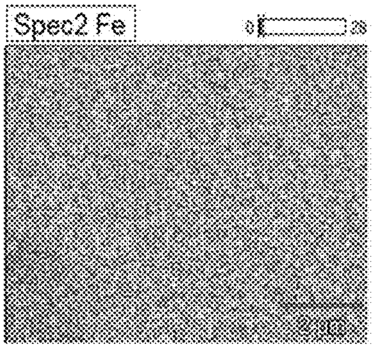
Figure 23C:
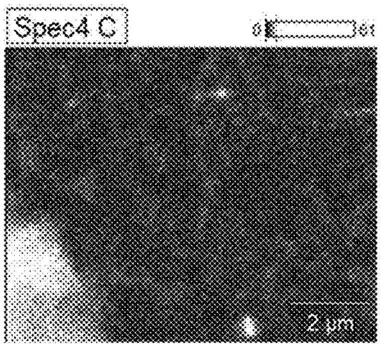
Figure 23D:
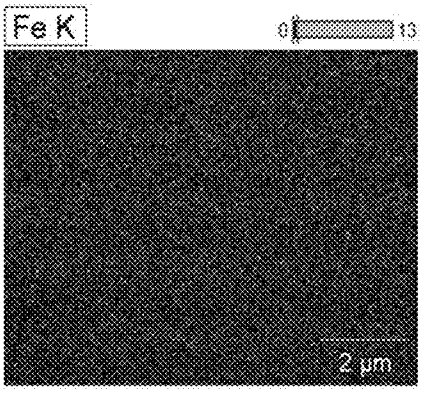
FIGS. 23D and 23E are scanning electron microscopy energy-dispersive spectrometry images of an example iron-carbon ribbon at the location illustrated in FIG. 22.
Figure 23E:
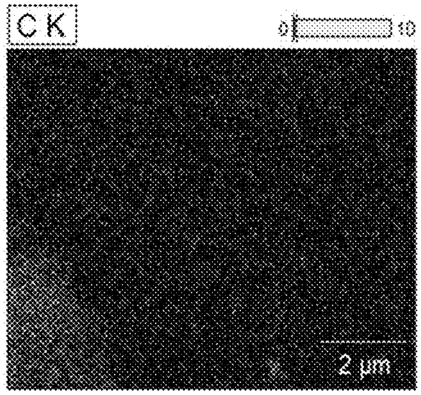

FIG. 22 is a conceptual diagram illustrating a location within an iron-carbon ribbon at which the data shown in FIGS. 23A-23E was measured. FIGS. 23A-23C are scanning electron microscopy wavelength-dispersive spectrometry images of an example iron-carbon ribbon at the location illustrated in FIG. 22 collected using the JEOL JXA-8350FPlus Electron Probe Microanalyzer. FIGS. 23D and 23E are scanning electron microscopy energy-dispersive spectrometry images of an example iron-carbon ribbon at the location illustrated in FIG. 22 collected using the JEOL JXA-8350FPlus Electron Probe Microanalyzer. As shown in FIGS. 23A-23C, there was some carbon clustering at this location of the iron-carbon ribbon, but less than near the center of the ribbon. The carbon content at this portion of the iron-carbon ribbon was about 7.4778 atomic percent.

Figure 24:
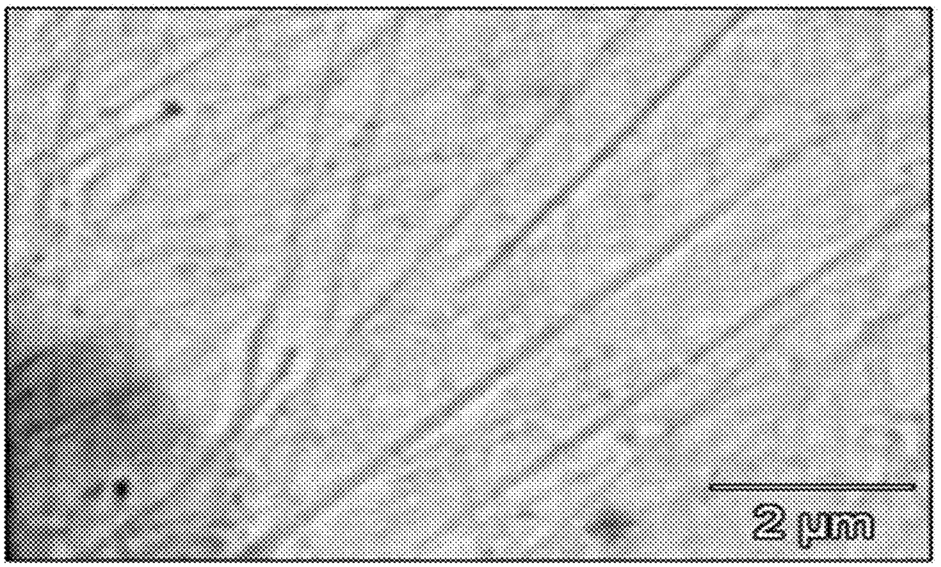
FIG. 24 is an image of the iron-carbon ribbon of FIG. 22.

FIG. 24 is an image of the iron-carbon ribbon of FIG. 22.

Figure 25:
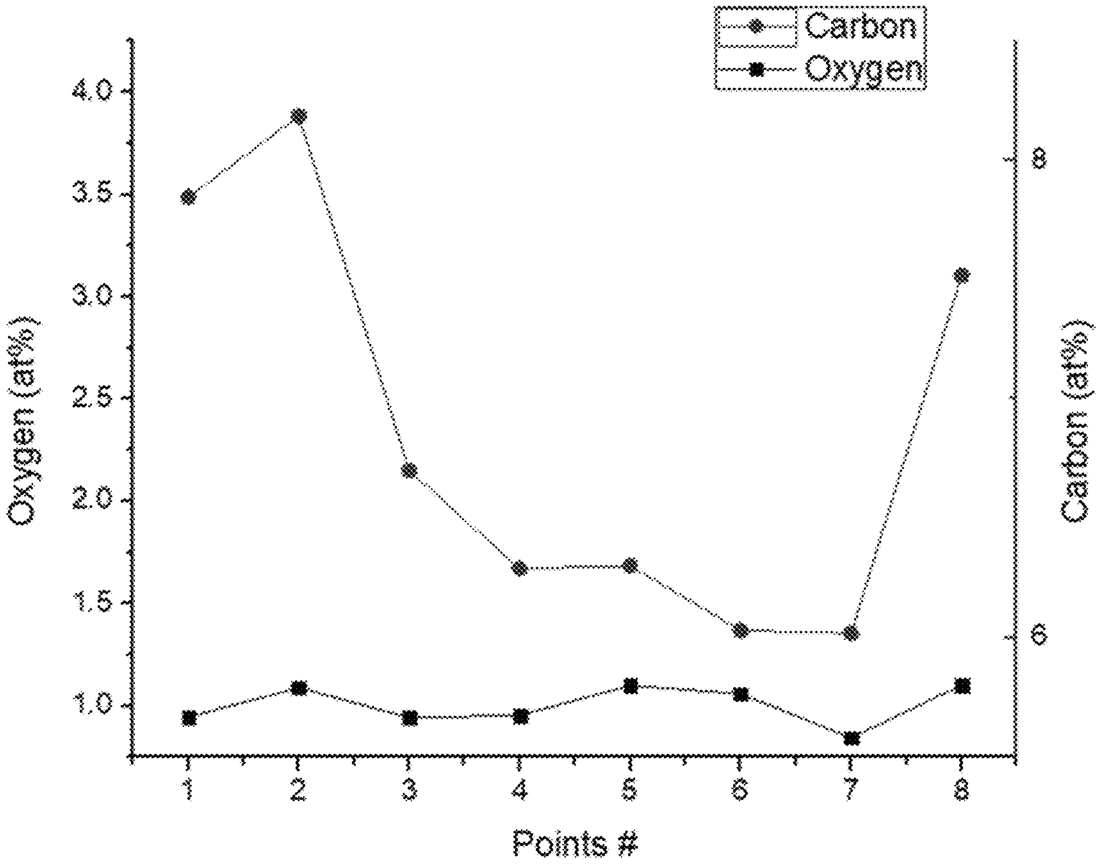
FIG. 25 is a plot of carbon and oxygen concentration as a function of position for the iron-carbon ribbon associated with FIGS. 15-24.

FIG. 25 is a plot of carbon and oxygen concentration as a function of position for the iron-carbon ribbon associated with FIGS. 15-24. The oxygen content was relatively low (about 1 atomic percent) and substantially constant as a function of position across the iron-carbon ribbon. The carbon concentration was within about 2 atomic percent (between about 6 and about 8 atomic percent) across the iron-carbon ribbon.

Figure 26:
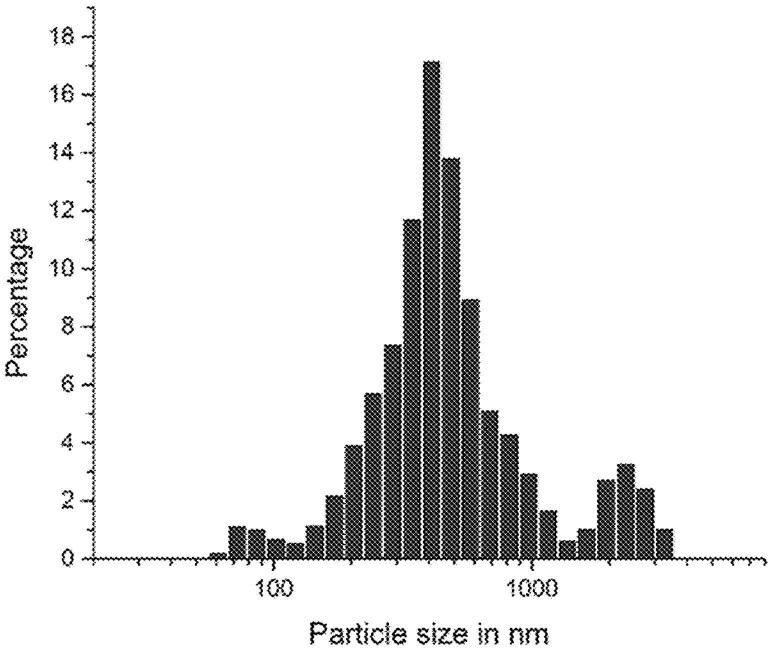
FIG. 26 is a histogram of particle size after ball milling of iron-carbon ribbons to form iron-carbon powder.

The iron-carbon powder was then ball milled in a Retsch PM100 planetary ball mill, available from Retsch GmbH, Haan, Germany. FIG. 26 is a histogram of particle size after ball milling of iron-carbon ribbons to form iron-carbon powder. As shown in FIG. 26, the powder size distribution was centered in the range of 344 nm to 486 nm.

Figure 27:
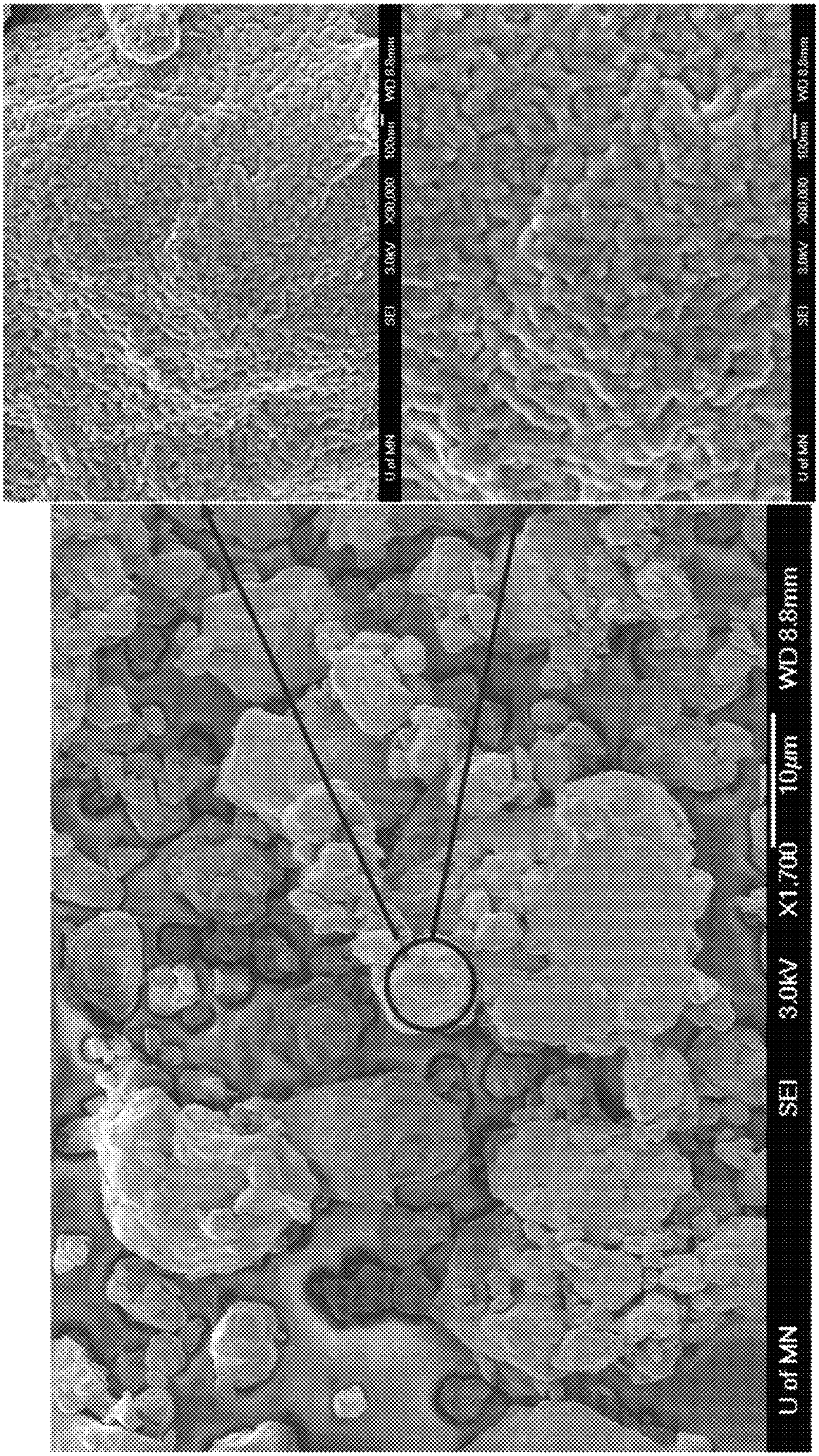
FIG. 27 shows three scanning electron micrography images of iron-carbon powder.

FIG. 27 shows three scanning electron micrography images of iron-carbon powder after ball milling. As shown in FIG. 27, the particles are largely agglomerated.

Figure 28:
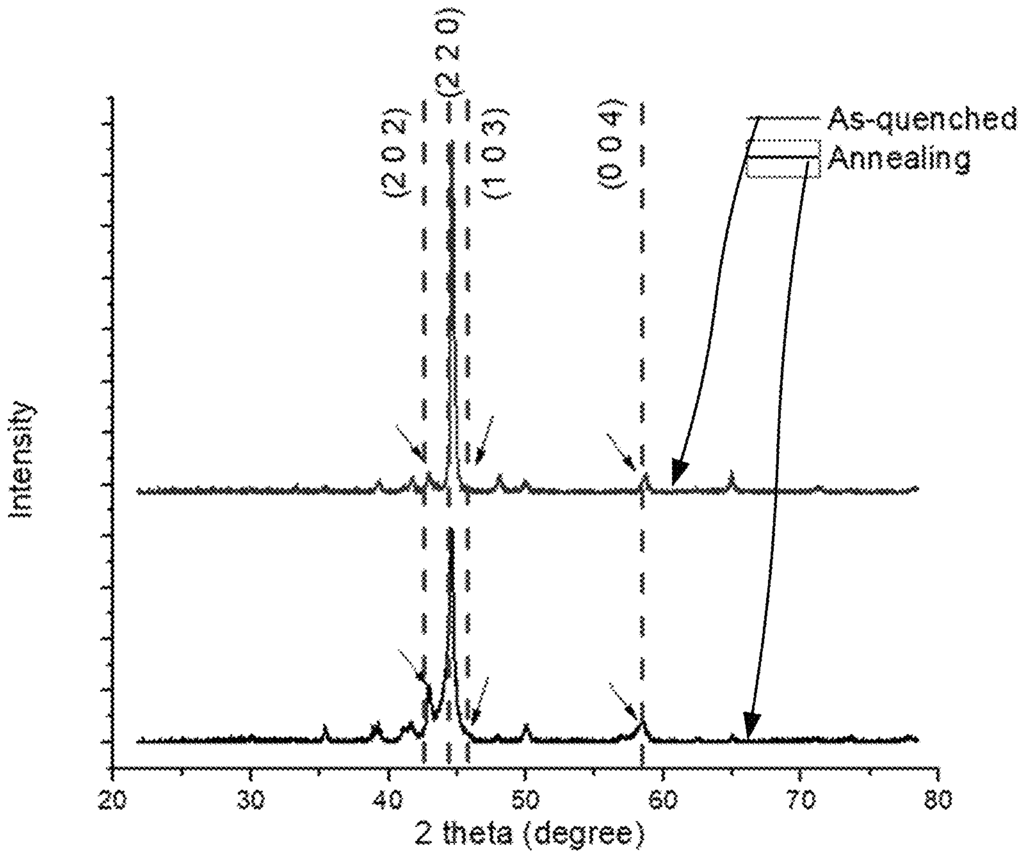
FIG. 28 is an x-ray diffraction plot for iron-carbon-nitrogen material showing formation of iron nitride martensite phase.

FIG. 28 is an x-ray diffraction plot for iron-carbon-nitrogen material after quenching and after annealing showing formation of iron nitride martensite phase. Quenching was performed in water and/or liquid nitrogen for a time between 15 and 30 minutes, and annealing was performed at a temperature of 150° C. for 2 hours in nitrogen gas.

Figure 29:
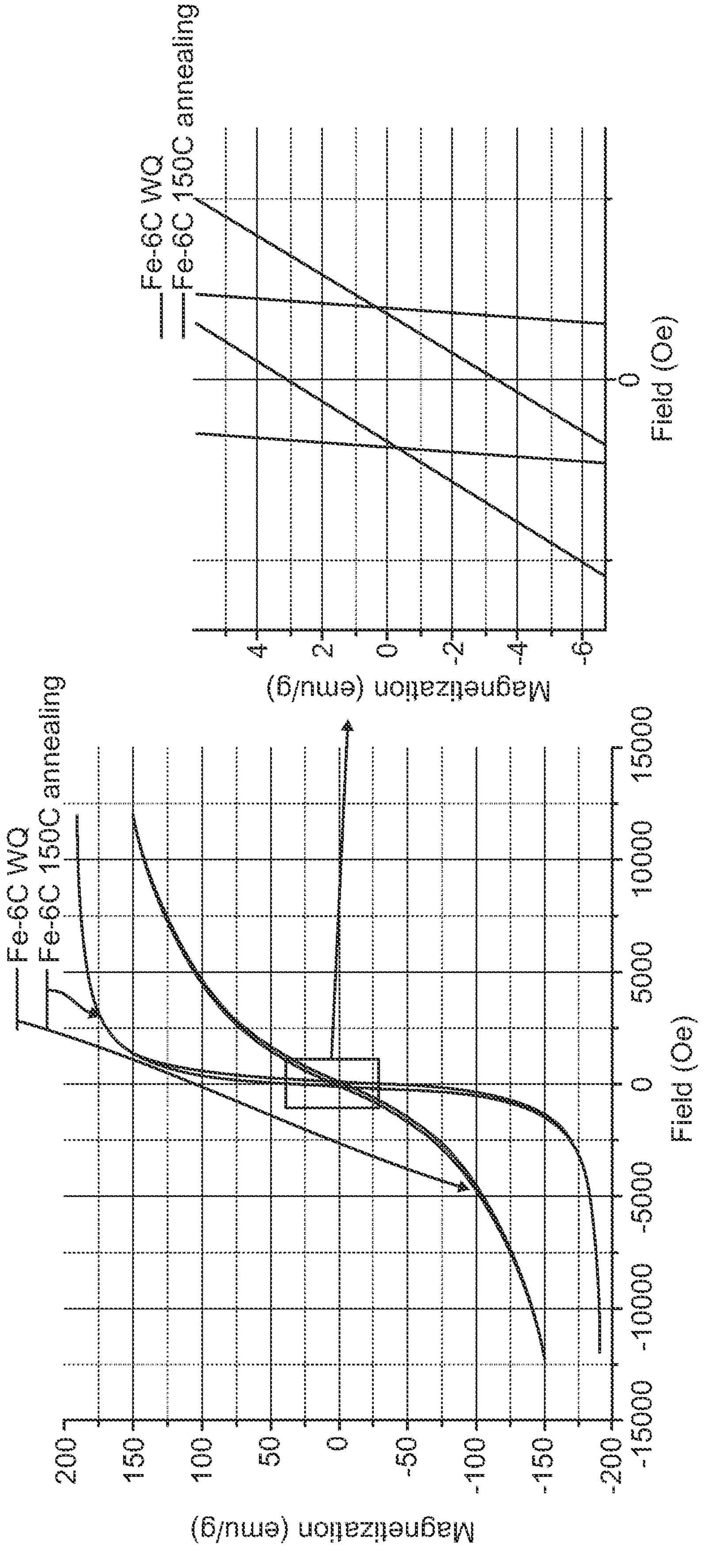
FIG. 29 is a plot of magnetization versus magnetic field for the iron-carbon-nitrogen material of FIG. 28.

FIG. 29 is a plot of magnetization versus magnetic field for the iron-carbon-nitrogen material of FIG. 28 after water quenching and annealing at 150° C. for 2 hours in nitrogen gas. As shown in FIG. 29, the saturation magnetization increased after annealing from about 150 emu/g to about 190 emu/g and the coercivity increased from about 84 Oersted to about 91 Oersted.

Figure 30:
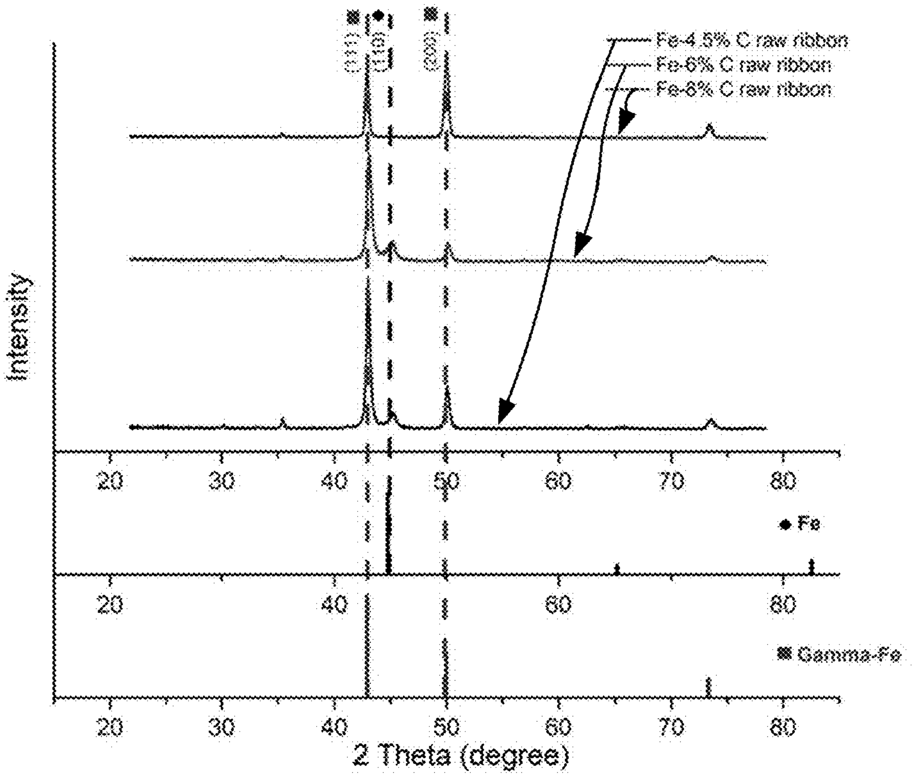
FIG. 30 is an x-ray diffraction plot for iron-carbon-nitrogen ribbons having different carbon content.

FIG. 30 is an x-ray diffraction plot for iron-carbon-nitrogen ribbons having different carbon content. The iron-carbon-nitrogen ribbons were formed by nitriding iron-carbon ribbons having 4.5 atomic percent, 6 atomic percent, and 8 atomic percent carbon at 660° C. at 90 sccm H2 and 10 sccm NH3 for 2 hours, followed by water cooling and liquid nitrogen cryo-treatment. The ribbon with higher carbon content exhibits less residual bcc iron and more fcc structure Fe—N solid solution. The wide peak at 43 may be an overlapping peak of γ-(Fe, N) solid solution and martensite.

Figure 31:
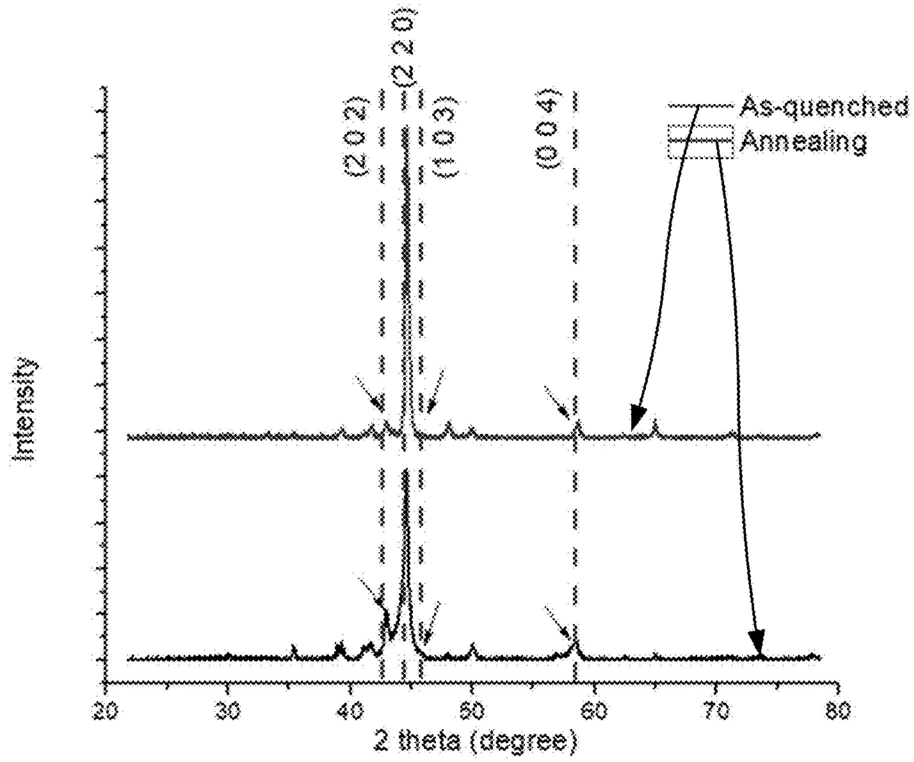
FIG. 31 is an x-ray diffraction plot for an iron-carbon-nitrogen ribbon including 6 atomic percent carbon showing formation of iron nitride martensite.
Figure 32:
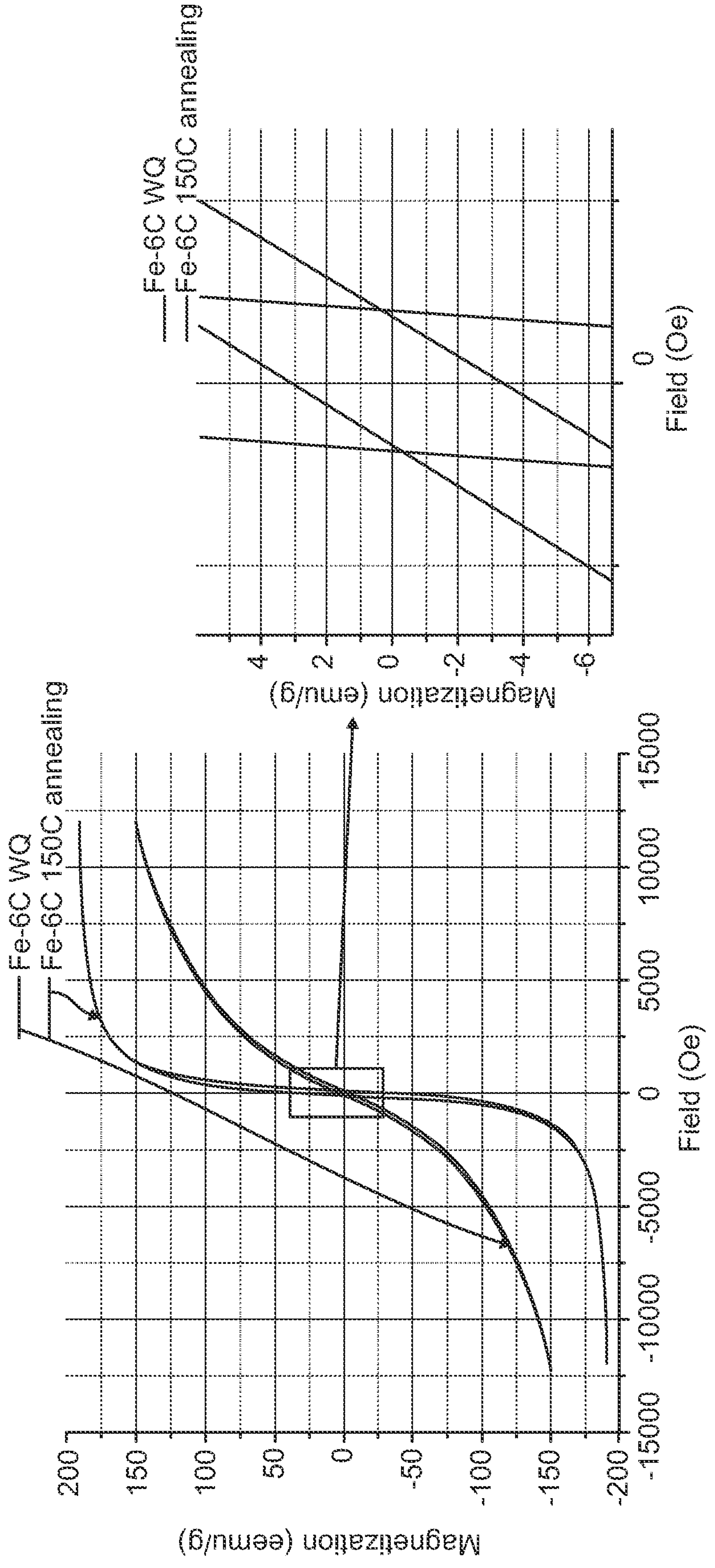
FIG. 32 is a plot of magnetization versus magnetic field for the iron-carbon-nitrogen ribbon of FIG. 31.

FIG. 31 is an x-ray diffraction plot for an iron-carbon-nitrogen ribbon including 6 atomic percent carbon showing formation of iron nitride martensite after annealing at 150° C. for 2 hours in nitrogen gas. FIG. 32 is a plot of magnetization versus magnetic field for the iron-carbon-nitrogen ribbon of FIG. 31 after water quenching and after annealing. As shown in FIG. 32, the saturation magnetization increased after annealing from about 150 emu/g to about 190 emu/g and the coercivity increased from about 84 Oersted to about 91 Oersted.

Figure 33:
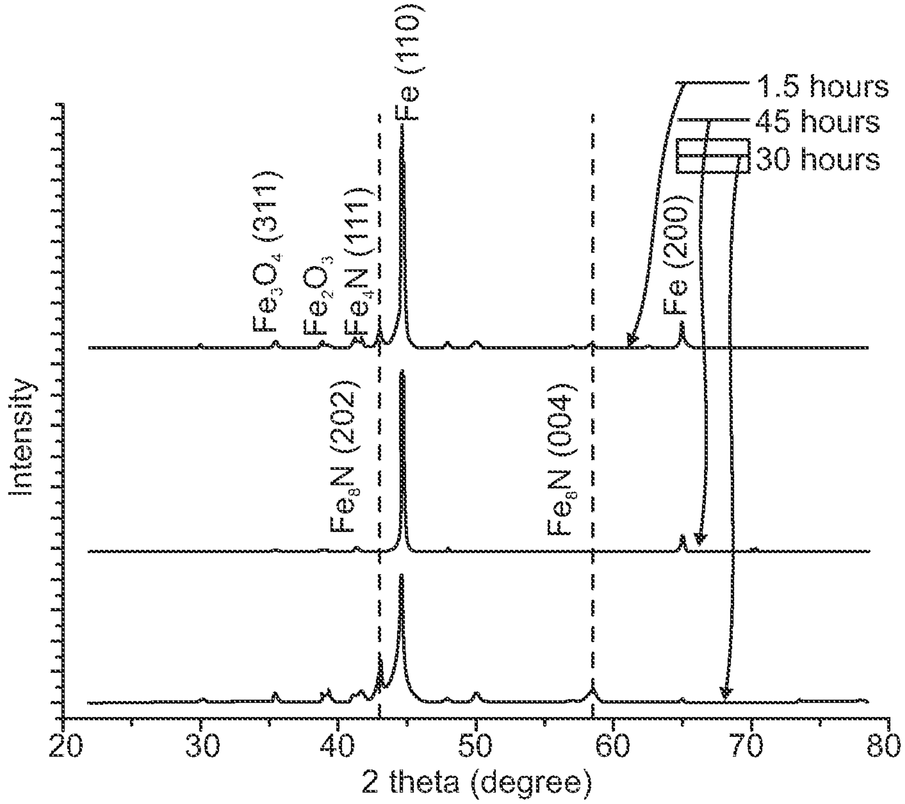
FIG. 33 is an x-ray diffraction plot for iron-carbon-nitrogen ribbons after nitriding for different lengths of time.

FIG. 33 is an x-ray diffraction plot for iron-carbon-nitrogen ribbons after nitriding for 30 minutes, 45 minutes, or 90 minutes at 600° C. with 92 sccm NH3 and 8 sccm H2, followed by 30 minutes exposure to nitrogen gas at 600° C., water quenching, and annealing at 150° C. for 2 hours in nitrogen gas. As shown in FIG. 33, the peak of $Fe_8N$ at (0 0 4) become broader and stronger after annealing, particularly for the sample nitrided for 30 minutes.

Figure 34:
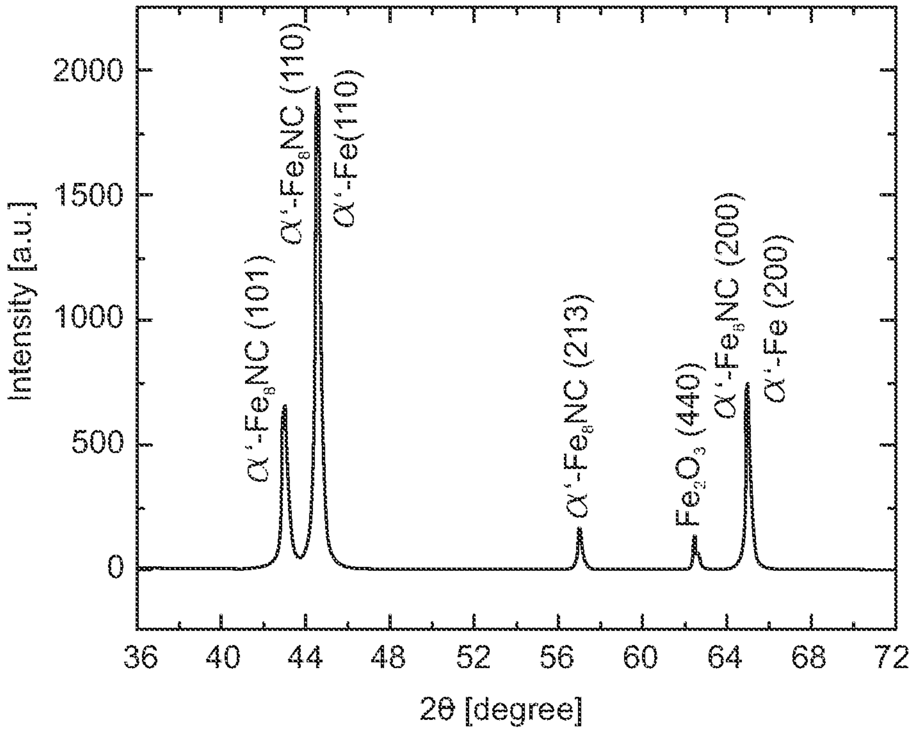
FIG. 34 is an x-ray diffraction plot for a soft magnetic material that includes iron, carbon, and nitrogen.

FIG. 34 is an x-ray diffraction plot for a soft magnetic material that includes iron, carbon, and nitrogen. The α'-$Fe_8NC$ peaks locate at about 43 for (101), about 44.6° for (110), about 57° for (213), and 65° for (200).

Figure 35:
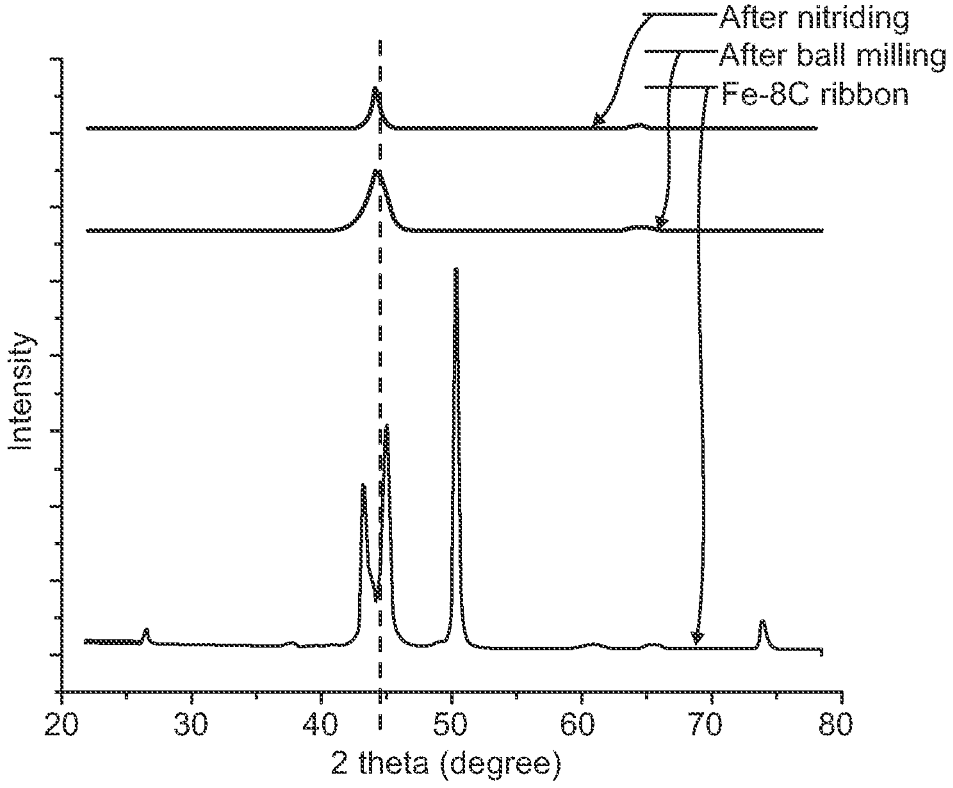
FIG. 35 is an x-ray diffraction plot for an iron-carbon-nitrogen material including 6 atomic percent carbon after melt spinning, after ball milling, and after nitriding.
Figure 36:
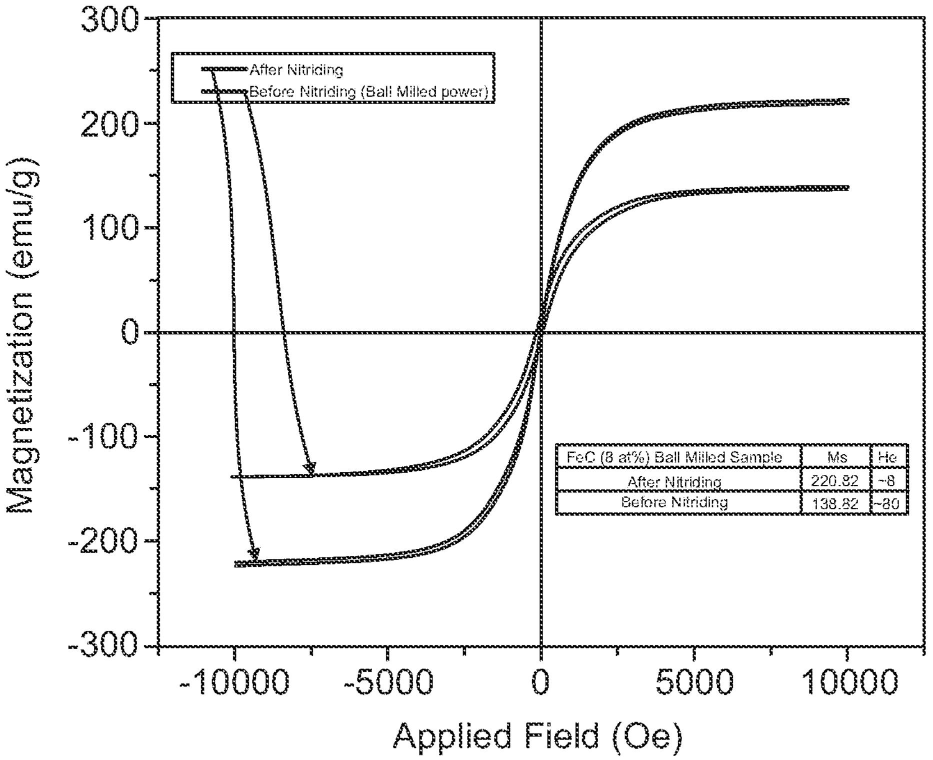
FIG. 36 is a plot of magnetization versus magnetic field for the iron-carbon nitrogen powder of FIG. 35.

FIG. 35 is an x-ray diffraction plot for an iron-carbon-nitrogen material including 8 atomic percent carbon after melt spinning, after ball milling, and after nitriding. FIG. 36 is a plot of magnetization versus magnetic field for the iron-carbon-nitrogen powder of FIG. 35 before and after nitriding. As shown in FIG. 36, the iron-carbon-nitrogen powder had a saturation magnetization of 138.82 emu/g and a coercivity of about 80 Oersteds before nitriding and a saturation magnetization of about 220.82 emu/g and a coercivity of about 8 Oersteds after low temperature nitriding in ammonia at about 150° C.

Figure 37:
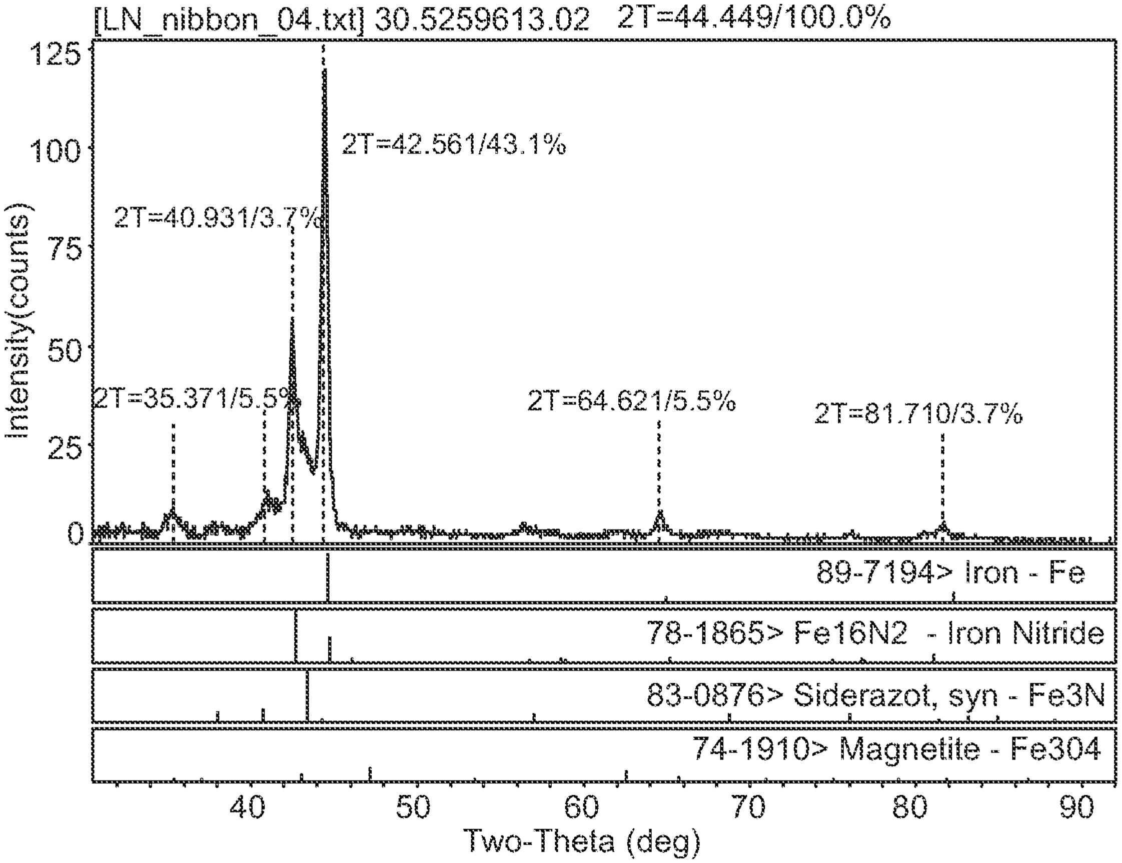
FIG. 37 is an x-ray diffraction plot for an iron-carbon-nitrogen ribbon including 6 atomic percent carbon after preparation that include oxidizing and reducing.
Figure 38:
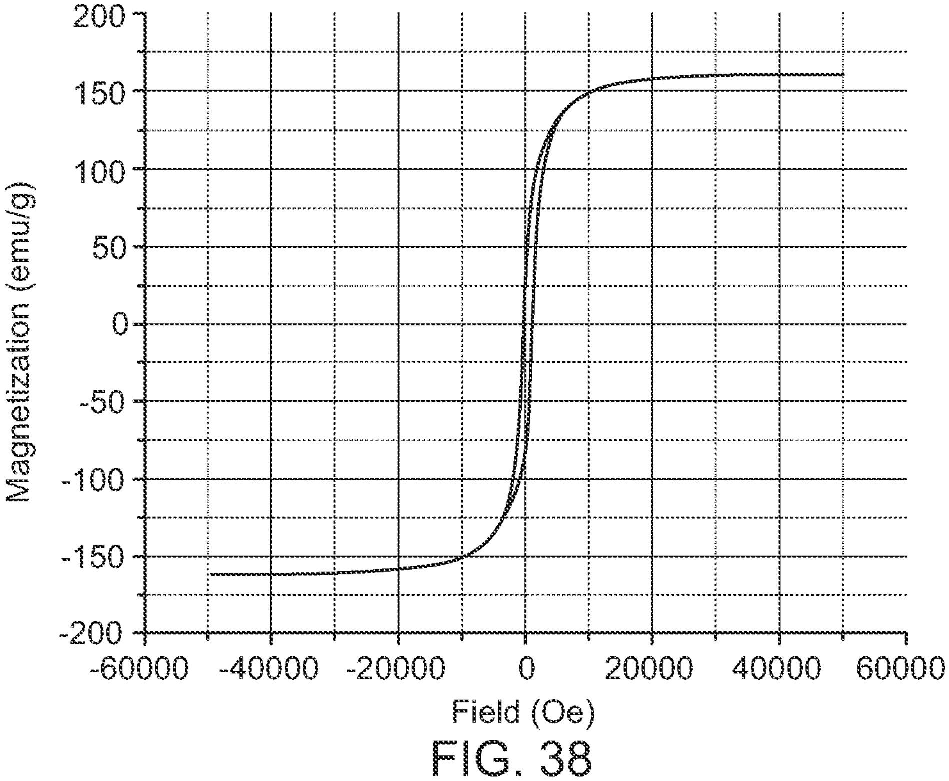
FIG. 38 is a plot of magnetization versus magnetic field for the iron-carbon nitrogen ribbon of FIG. 37.

FIG. 37 is an x-ray diffraction plot for an iron-carbon-nitrogen ribbon including 6 atomic percent carbon after preparation that included oxidizing at 975° C. for 30 minutes and reducing at 350° C. for 2 hours in hydrogen gas. The sample was then nitrided in ammonia at 150° C. for 10 hours. FIG. 38 is a plot of magnetization versus magnetic field for the iron-carbon nitrogen ribbon of FIG. 37. As shown in FIG. 38, the sample exhibiting a saturation magnetization of about 161 emu/g and a coercivity of about 800 Oersteds.

Figure 39:
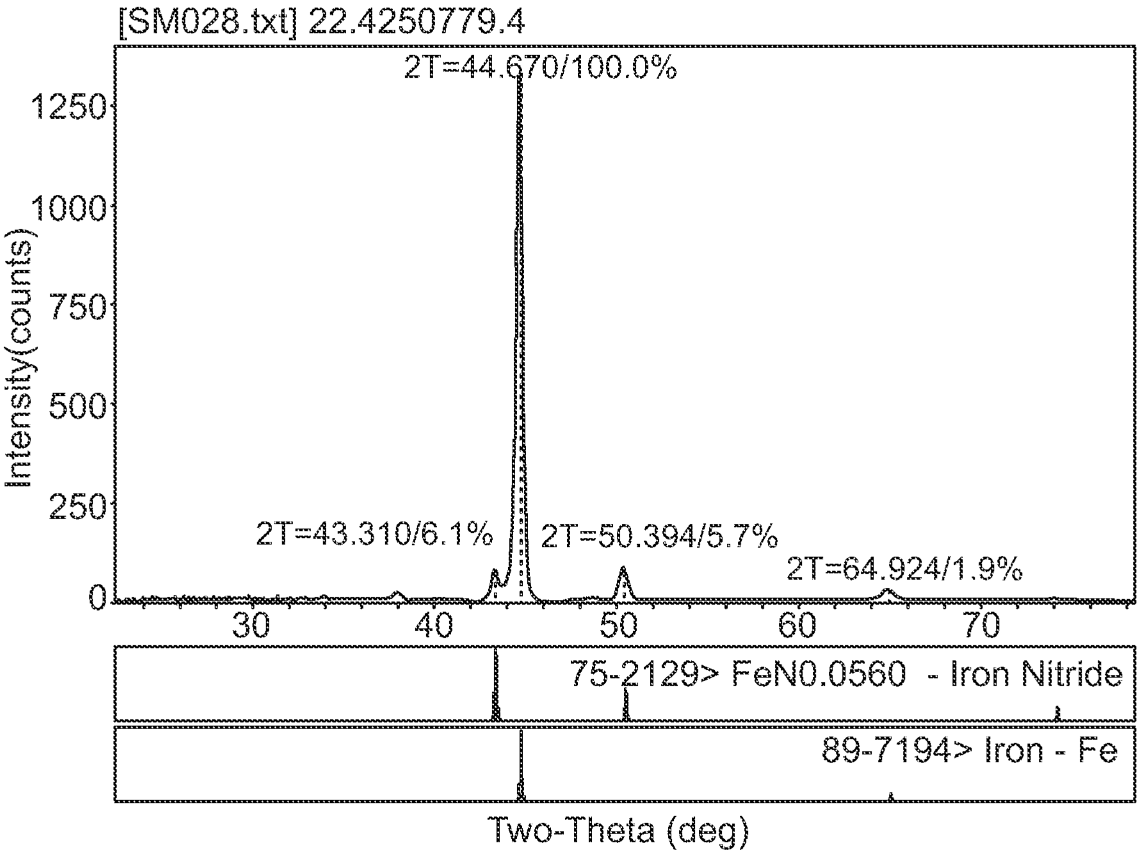
FIG. 39 is an x-ray diffraction plot for an iron-carbon-nitrogen ribbon including 6 atomic percent carbon after preparation that did not include oxidizing and reducing.
Figure 40:
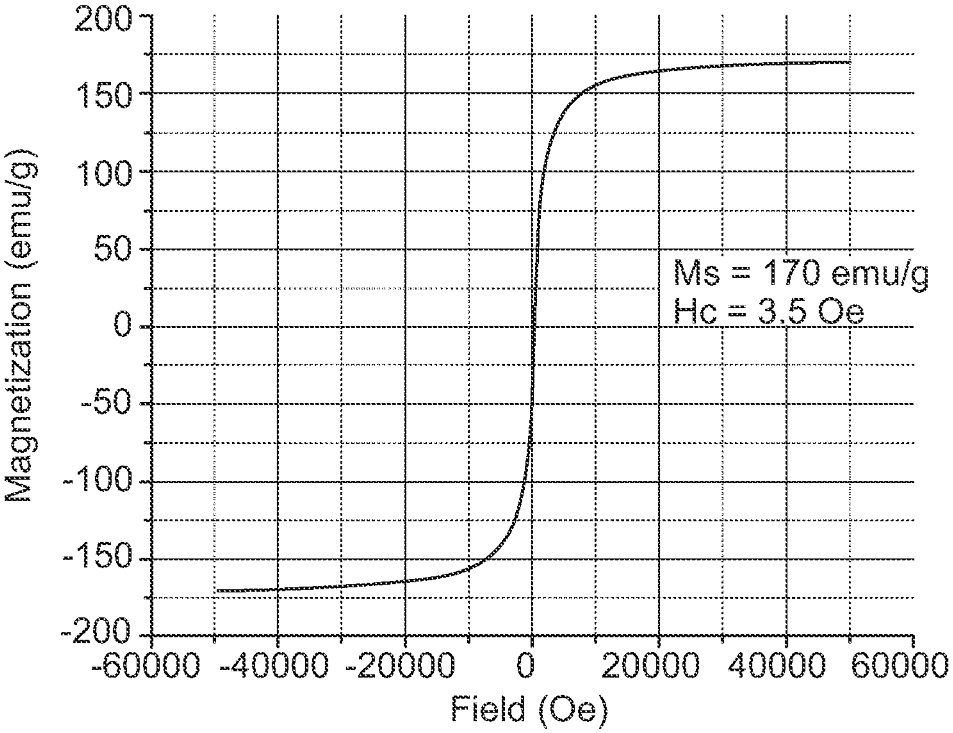
FIG. 40 is a plot of magnetization versus magnetic field for the iron-carbon-nitrogen ribbon of FIG. 39.

FIG. 39 is an x-ray diffraction plot for an iron-carbon-nitrogen ribbon including 6 atomic percent carbon after preparation that did not include oxidizing and reducing. FIG. 40 is a plot of magnetization versus magnetic field for the iron-carbon-nitrogen ribbon of FIG. 39. As shown in FIG. 40, the sample exhibiting a saturation magnetization of about 170 emu/g and a coercivity of about 3.5 Oersteds.

Figure 41:
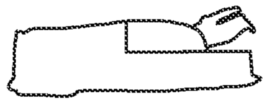
FIG. 41 is an image of an example FeC ribbon including about 13 atomic percent carbon after nitriding.

FIG. 41 is an image of an example FeCN ribbon including about 13 atomic percent carbon after nitriding. As shown in FIG. 41, areas of the ribbon were shiny, which could represent unoxidized or unnitrided iron.

Various samples were prepared using melt spinning of iron-carbon mixtures, followed by oxidation, reduction, and nitriding. Table 1 summarizes the processing parameters:

TABLE 1

| Sample | Pre-Treatment | Reduction | Nitriding |
|---|---|---|---|
| 0831Fe9C | Oxidized at 975° C. for 30 minutes | 350° C. for 2 hours in 100 scccm $H_2$ | 150° C. for 10 hours in ammonia at 60 sccm $NH_3$ |
| 0831Fe11C | Oxidized at 975° C. for 30 minutes | 350° C. for 2 hours in 100 scccm $H_2$ | 150° C. for 10 hours in ammonia at 60 sccm $NH_3$ |
| 0831Fe13C | Oxidized at 975° C. for 30 minutes | 350° C. for 2 hours in 100 scccm $H_2$ | 150° C. for 10 hours in ammonia at 60 sccm $NH_3$ |
| 0926Fe9C | Oxidized at 975° C. for 1 hour | 350° C. for 2 hours in 100 scccm $H_2$ | 150° C. for 10 hours in ammonia at 60 sccm $NH_3$ |

TABLE 1-continued

| Sample | Pre-Treatment | Reduction | Nitriding |
|---|---|---|---|
| 0926Fe11C | Oxidized at 975° C. for 1 hour | 350° C. for 2 hours in 100 scccm $H_2$ | 150° C. for 10 hours in ammonia at 60 sccm $NH_3$ |
| 0926Fe13C | Oxidized at 975° C. for 1 hour | 350° C. for 2 hours in 100 scccm $H_2$ | 150° C. for 10 hours in ammonia at 60 sccm $NH_3$ |

Figure 42:
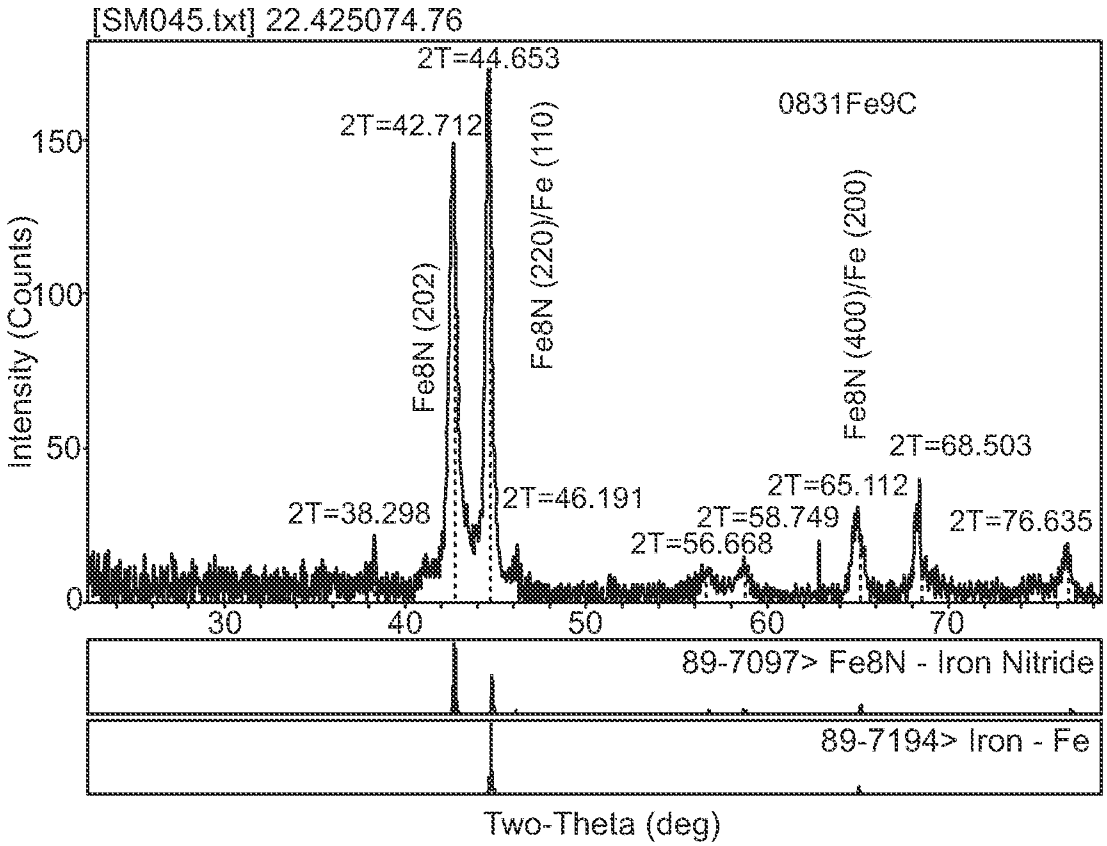
FIG. 42 is an x-ray diffraction plot for a sample prepared from an iron-carbon mixture including about 9 atomic percent carbon after oxidation, reduction, and nitriding.
Figure 43:
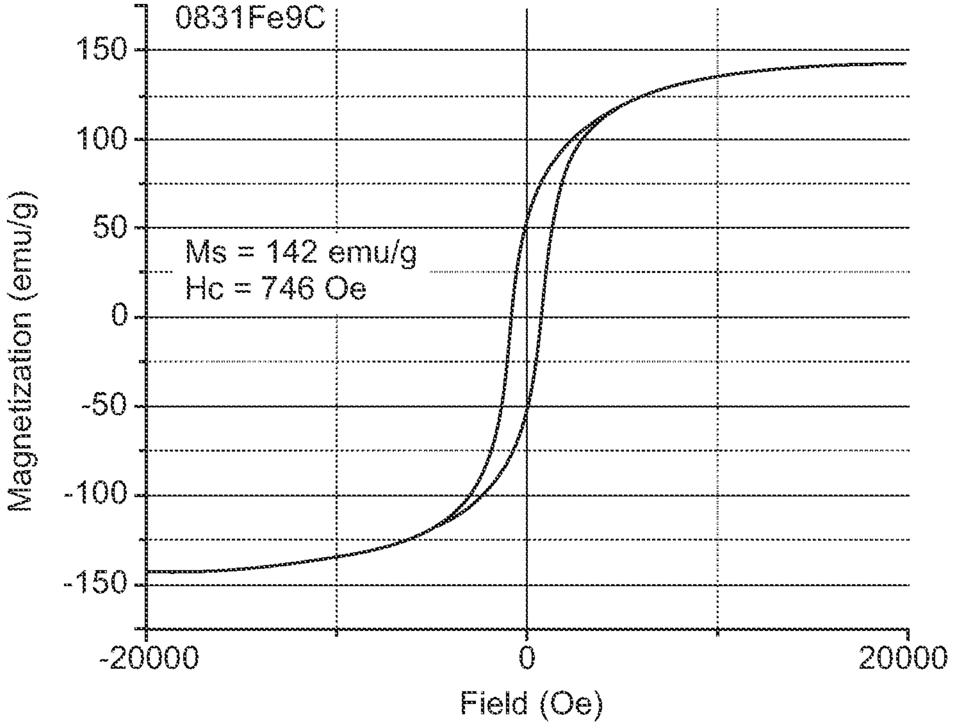
FIG. 43 is a plot of magnetization versus magnetic field for the iron-carbon nitrogen ribbon of FIG. 42.

FIG. 42 is an x-ray diffraction plot for a sample prepared from an iron-carbon mixture including about 9 atomic percent carbon after oxidation, reduction, and nitriding (0831Fe9C). As shown in FIG. 42, the sample exhibited clear $Fe_8N$ peaks. FIG. 43 is a plot of magnetization versus magnetic field for the iron-carbon nitrogen ribbon of FIG. 42. This sample exhibited relatively large coercivity (about 746 Oersted) and a saturation magnetization of about 142 emu/g.

Figure 44:
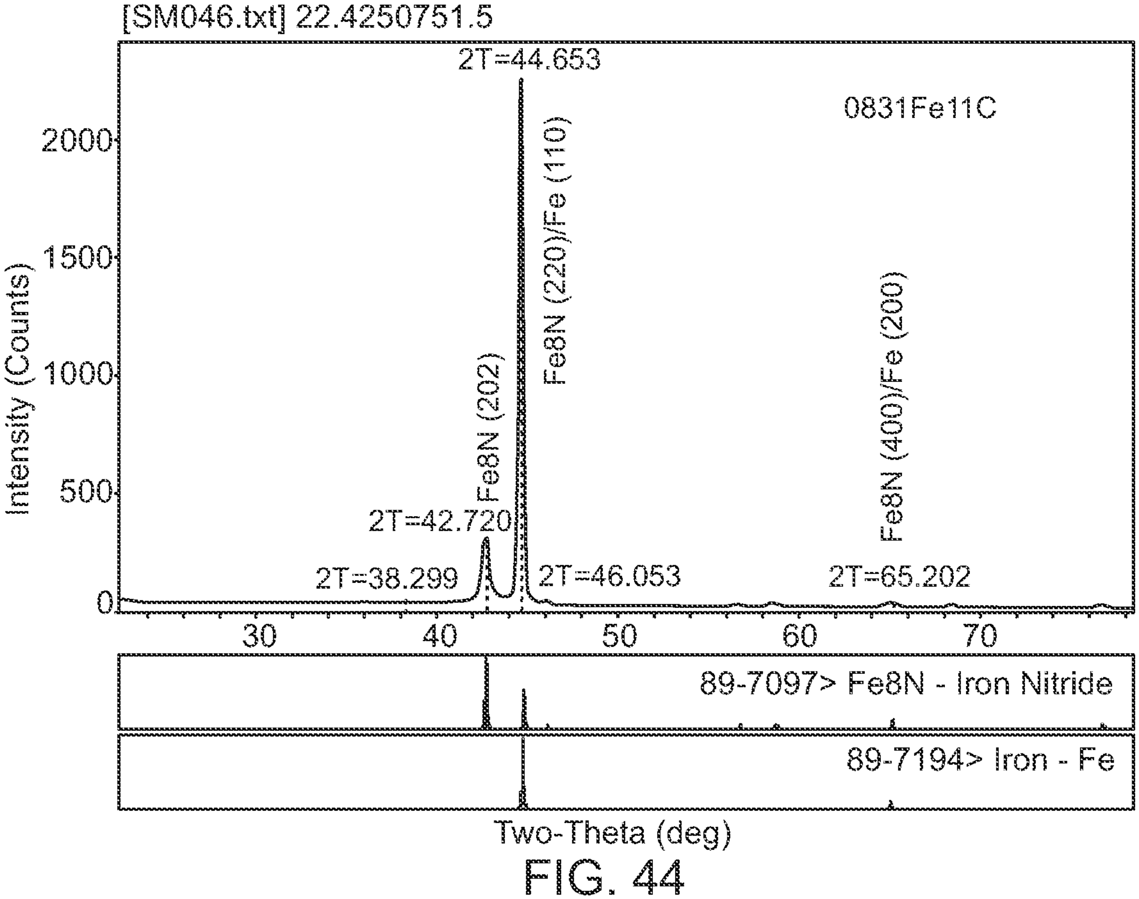
FIG. 44 is an x-ray diffraction plot for a sample prepared from an iron-carbon mixture including about 11 atomic percent carbon after oxidation, reduction, and nitriding.
Figure 45:
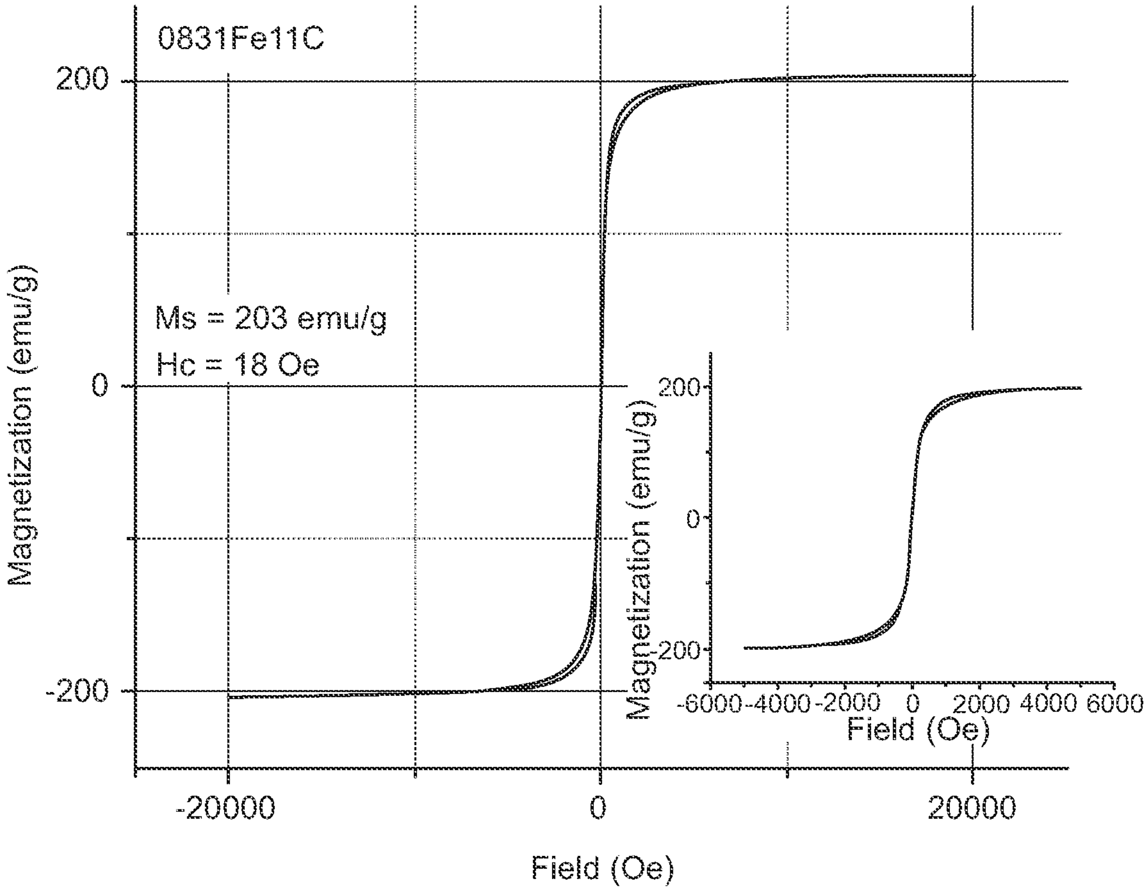
FIG. 45 is a plot of magnetization versus magnetic field for the iron-carbon nitrogen ribbon of FIG. 44.

FIG. 44 is an x-ray diffraction plot for a sample prepared from an iron-carbon mixture including about 11 atomic percent carbon after oxidation, reduction, and nitriding (0831Fe11C). As shown in FIG. 44, the sample exhibited clear $Fe_8N$ peaks. FIG. 45 is a plot of magnetization versus magnetic field for the iron-carbon nitrogen ribbon of FIG. 44. This sample exhibited smaller coercivity (about 18 Oersted) and a saturation magnetization of about 203 emu/g.

Figure 46:
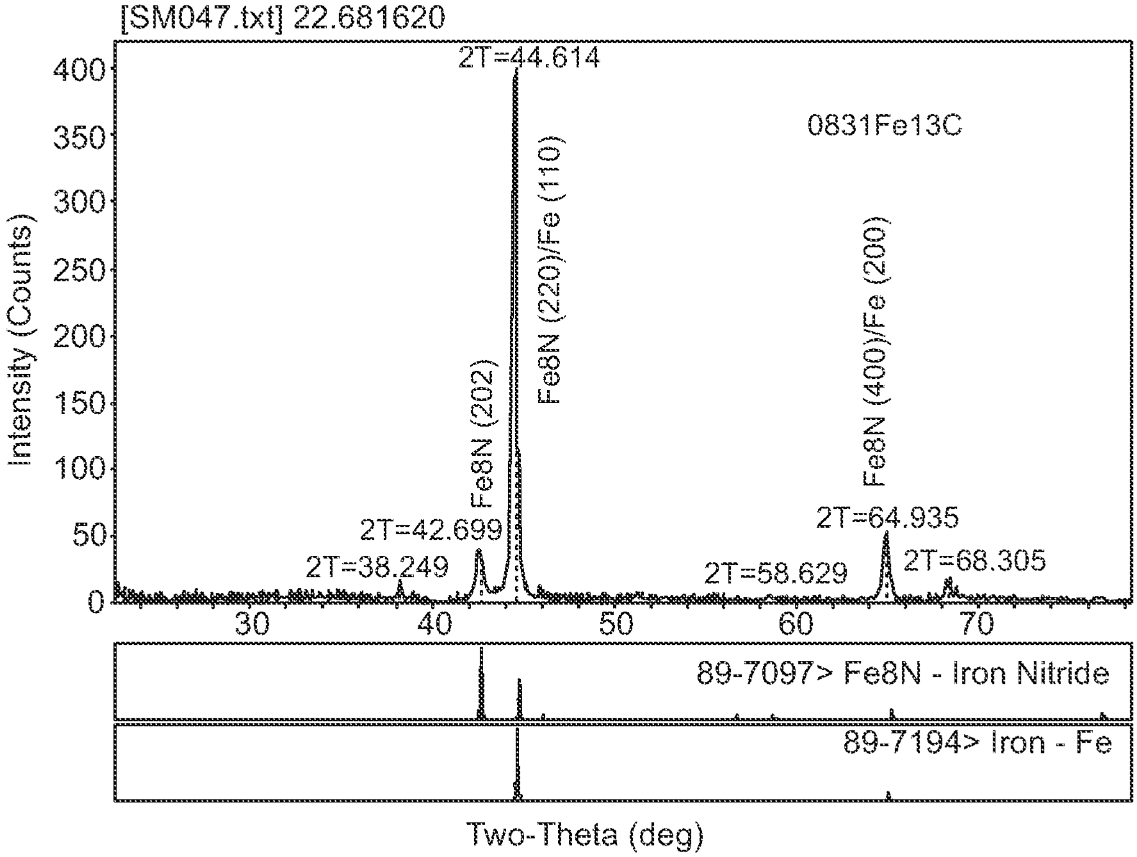
FIG. 46 is an x-ray diffraction plot for a sample prepared from an iron-carbon mixture including about 13 atomic percent carbon after oxidation, reduction, and nitriding.

FIG. 46 is an x-ray diffraction plot for a sample prepared from an iron-carbon mixture including about 13 atomic percent carbon after oxidation, reduction, and nitriding (0831Fe13C). As shown in FIG. 46, the sample exhibited clear $Fe_8N$ peaks.

Figure 47:
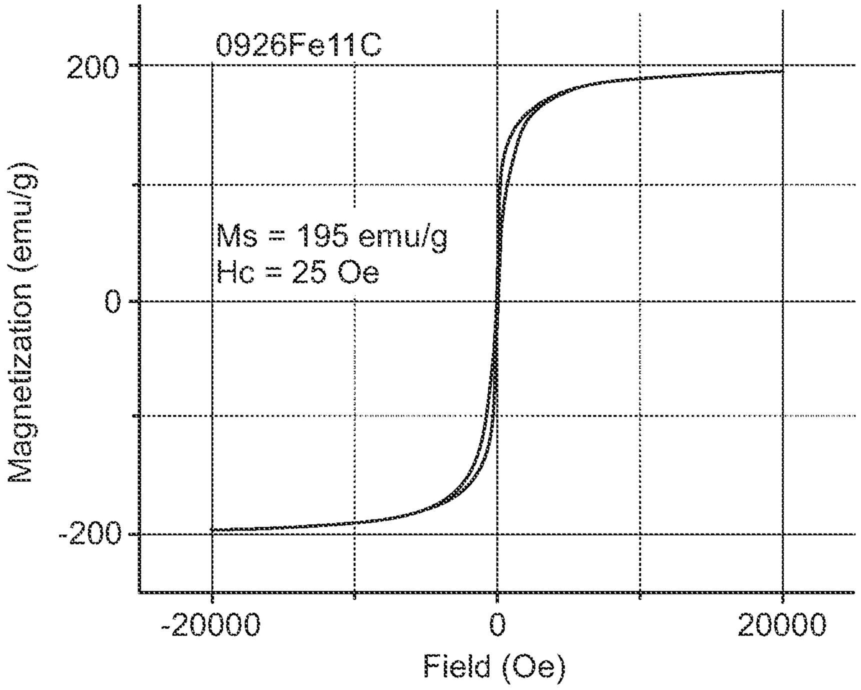
FIG. 47 is a plot of magnetization versus magnetic field for an iron-carbon nitrogen ribbon formed from an iron-carbon mixture including about 11 atomic percent after oxidation, reduction, and nitriding.
Figure 48:
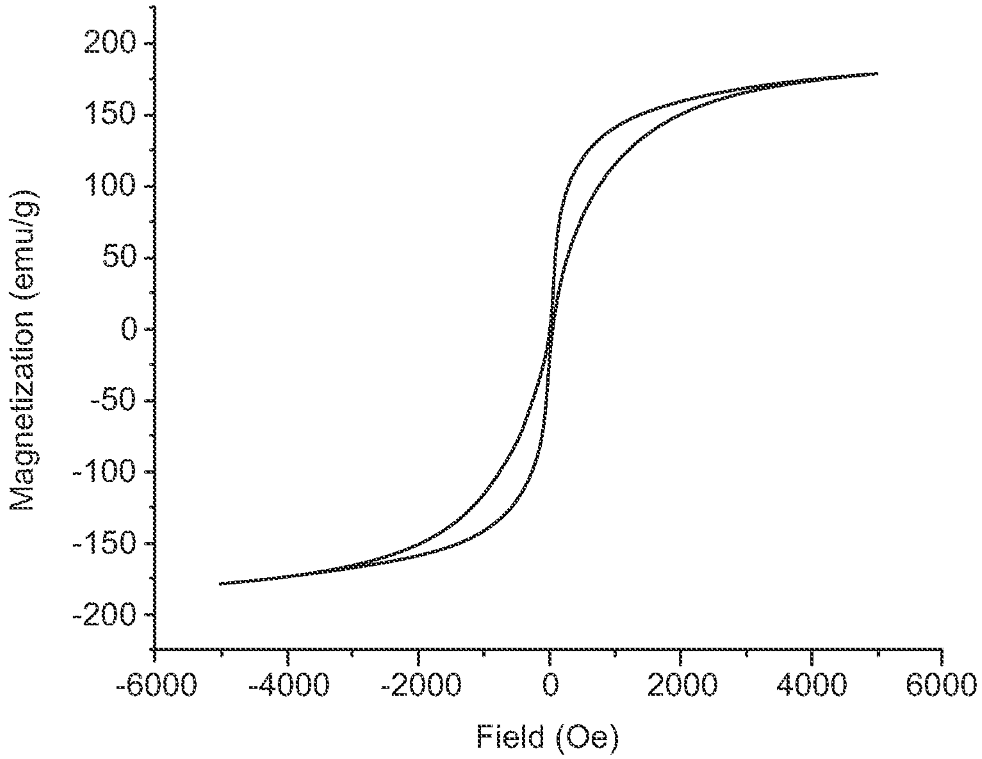
FIG. 48 is a plot of magnetization versus magnetic field for an iron-carbon nitrogen ribbon formed from an iron-carbon mixture including about 11 atomic percent after oxidation, reduction, and nitriding.

FIG. 47 is a plot of magnetization versus magnetic field for an iron-carbon nitrogen ribbon formed from an iron-carbon mixture including about 11 atomic percent after oxidation, reduction, and nitriding (0926Fe11C). This sample exhibited similar coercivity to the sample with similar carbon content that was oxidized for 30 minutes (about 25 Oersted) and a saturation magnetization of about 195 emu/g. FIG. 48 is a plot of the same data as FIG. 47 at different magnification.

Figure 49:
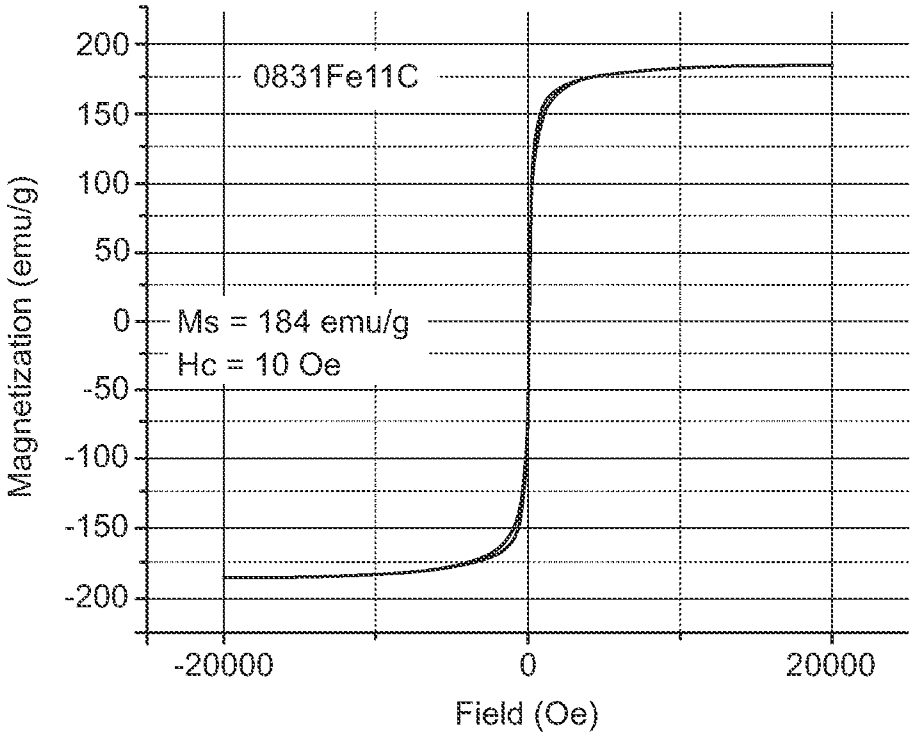
FIG. 49 is a plot of magnetization versus magnetic field for an iron-carbon nitrogen ribbon formed from an iron-carbon mixture including about 13 atomic percent after oxidation, reduction, and nitriding.
Figure 50:
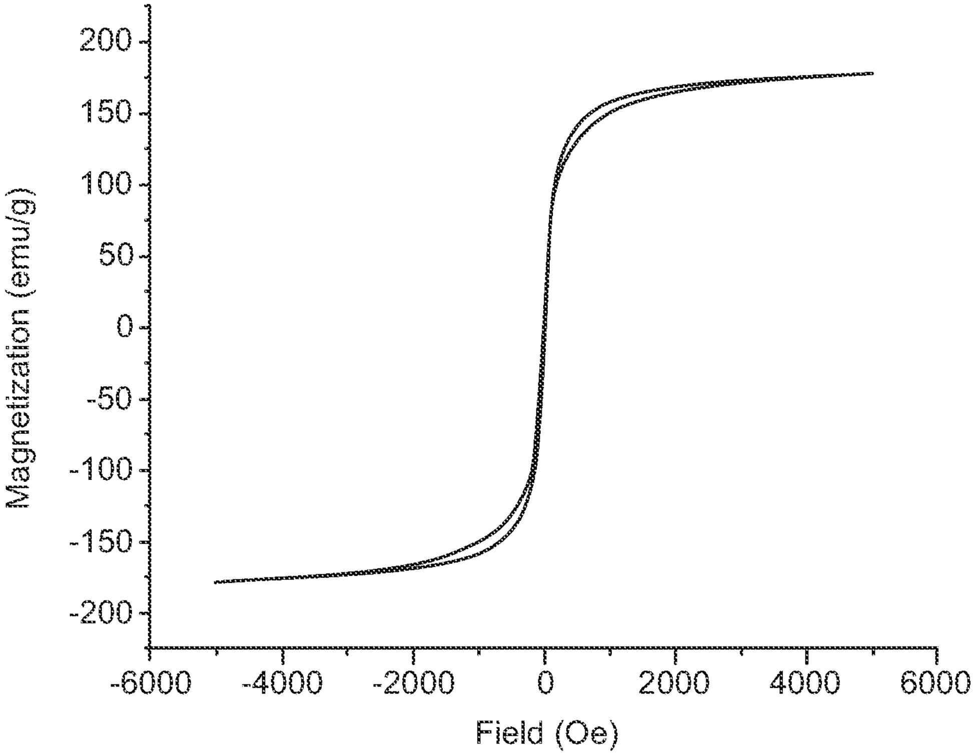
FIG. 50 is a plot of magnetization versus magnetic field for an iron-carbon nitrogen ribbon formed from an iron-carbon mixture including about 13 atomic percent after oxidation, reduction, and nitriding.

FIG. 49 a plot of magnetization versus magnetic field for an iron-carbon nitrogen ribbon formed from an iron-carbon mixture including about 13 atomic percent after oxidation, reduction, and nitriding (0831Fe13C). This sample exhibited smaller coercivity (about 18 Oersted) and a saturation magnetization of about 184 emu/g. FIG. 50 is a plot of the same data as FIG. 49 at different magnification.

Figure 51:
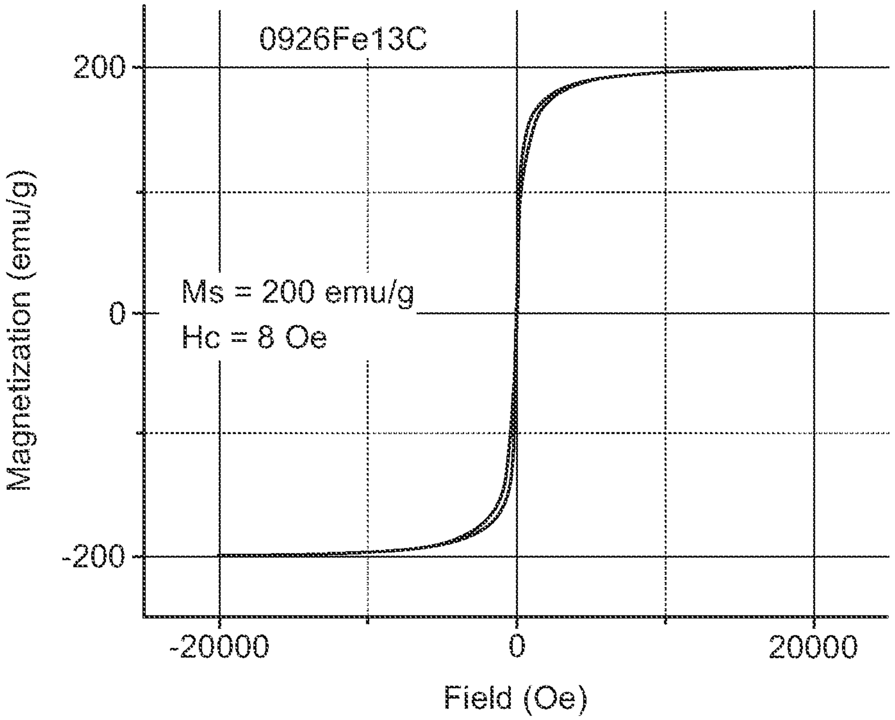
FIG. 51 is a plot of magnetization versus magnetic field for an iron-carbon nitrogen ribbon formed from an iron-carbon mixture including about 13 atomic percent after oxidation, reduction, and nitriding.
Figure 52:
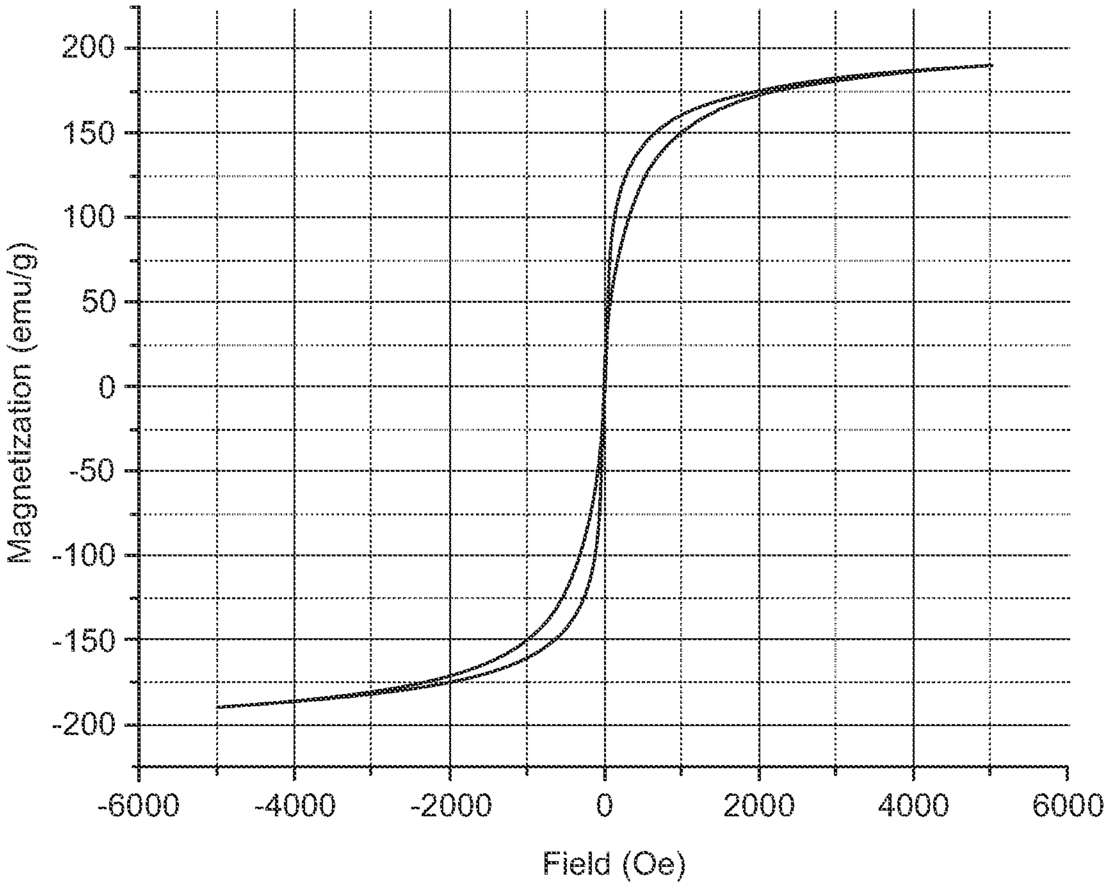
FIG. 52 is a plot of magnetization versus magnetic field for an iron-carbon nitrogen ribbon formed from an iron-carbon mixture including about 13 atomic percent after oxidation, reduction, and nitriding.

FIG. 51 a plot of magnetization versus magnetic field for an iron-carbon nitrogen ribbon formed from an iron-carbon mixture including about 13 atomic percent after oxidation, reduction, and nitriding (0926Fe13C). This sample exhibited smaller coercivity (about 8 Oersted) and a higher saturation magnetization of about 200 emu/g that the sample (0831Fe13C) that was oxidized for a shorter time. FIG. 52 is a plot of the same data as FIG. 51 at different magnification.

Figure 53:
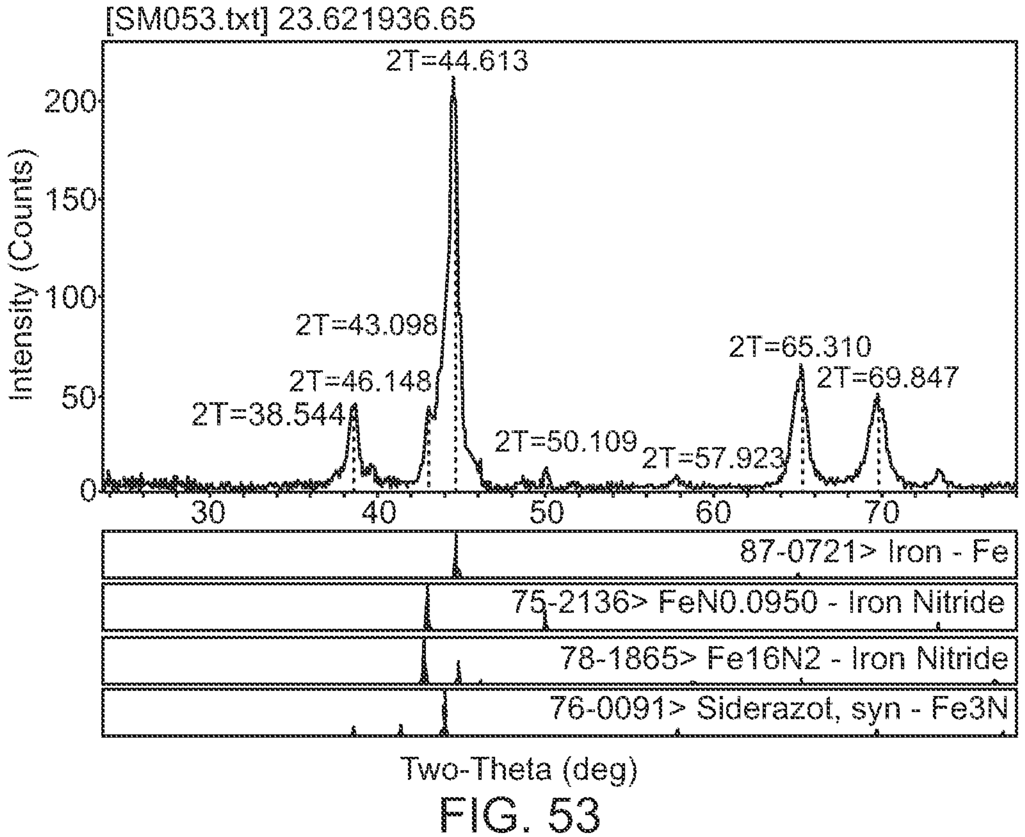
FIG. 53 is an x-ray diffraction plot for an iron-carbon-nitrogen ribbon including 13 atomic percent carbon after preparation that included arc melting of an iron-carbon mixture, melt spinning, and nitriding in ammonia at 150° C. for 10 hours.

FIG. 53 is an x-ray diffraction plot for an iron-carbon-nitrogen ribbon including 13 atomic percent carbon after preparation that included arc melting of an iron-carbon mixture, melt spinning, and nitriding in ammonia at 150° C. for 10 hours. Cast iron ingots with known carbon concentrations were wrapped in pure iron foils with selected thicknesses to achieve a desired carbon concentration. The ingots were melted in an arc melting machine (a SP-MSM20-7 compact vacuum arc melting system, available from MTI Corporation) at a temperature of about 1600° C. at 700 mTorr. Between 6 and 10 flips of the molten material were made to approach a homogeneous composition.

Figure 54:
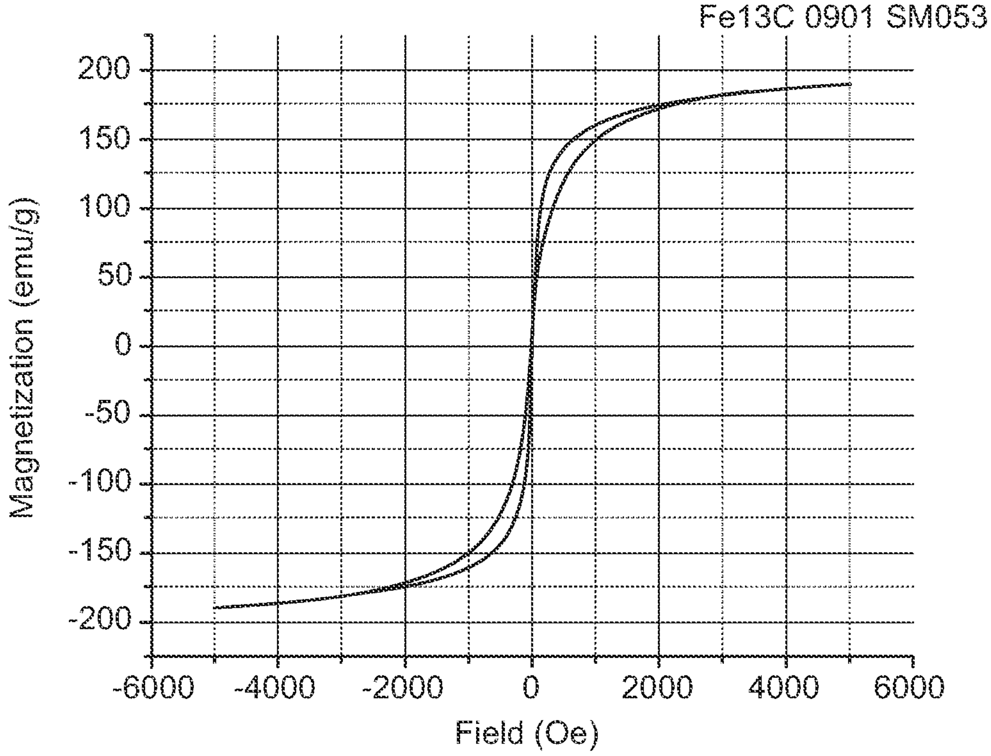
FIG. 54 is a plot of magnetization versus magnetic field for the iron-carbon nitrogen ribbon of FIG. 53.

The molten material was then melt spun using a Melt Spinner SC, available from Edmund Buhler GmbH. The gap distance was set at 0.3 mm and the wheel speed was about 50 Hz. The melting temperature was between about 1300° C. and about 1500° C., depending on the carbon content. The sample included some iron nitride, such as $Fe_3N$, $Fe_{16}N_2$, austenite iron nitride, and alpha Fe. FIG. 54 is a plot of magnetization versus magnetic field for the iron-carbon nitrogen ribbon of FIG. 53. As shown in FIG. 54, the sample exhibiting a saturation magnetization of about 188 emu/g and a coercivity of about 7 Oersteds.

Figure 55:
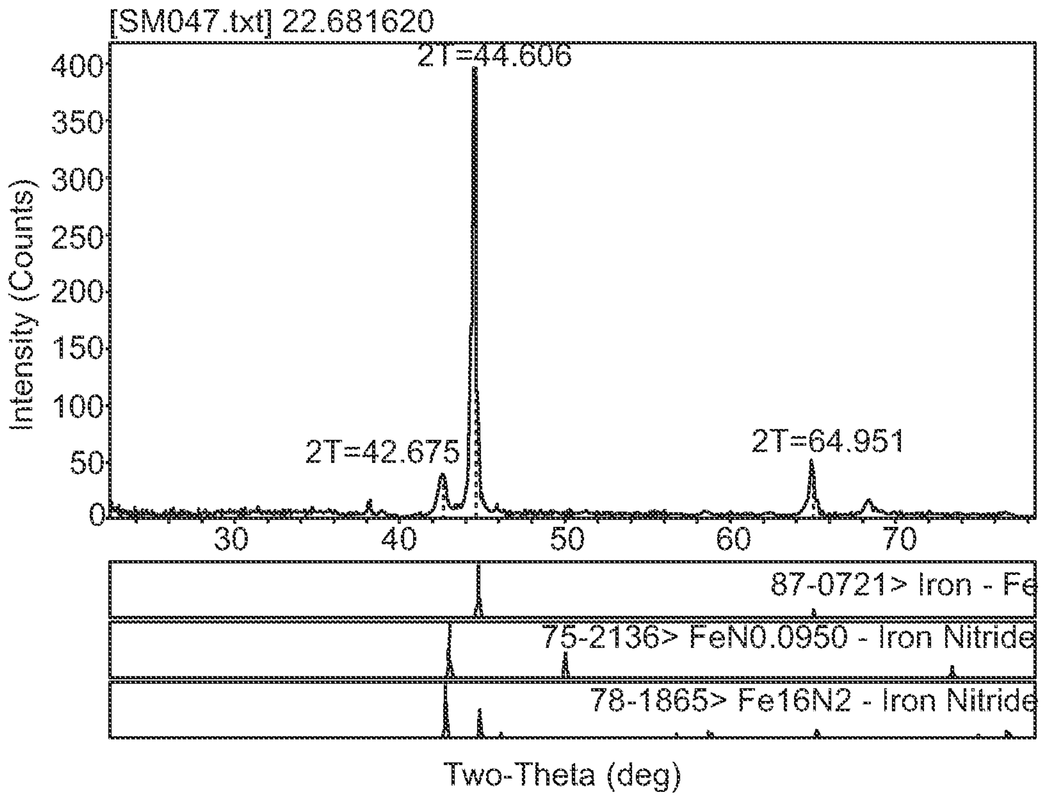
FIG. 55 is an x-ray diffraction plot for an iron-carbon-nitrogen ribbon including 13 atomic percent carbon after preparation that included arc melting of an iron-carbon mixture, melt spinning, and nitriding in ammonia at 150° C. for 10 hours.

FIG. 55 is an x-ray diffraction plot for an iron-carbon-nitrogen ribbon including 13 atomic percent carbon after preparation that included arc melting of an iron-carbon mixture, melt spinning, and nitriding in ammonia at 150° C. for 10 hours. Cast iron ingots with known carbon concentrations were wrapped in pure iron foils with selected thicknesses to achieve a desired carbon concentration. The ingots were melted in an arc melting machine (a SP-MSM20-7 compact vacuum arc melting system, available from MTI Corporation) at a temperature of about 1600° C. at 700 mTorr. Between 6 and 10 flips of the molten material were made to approach a homogeneous composition.

Figure 56:
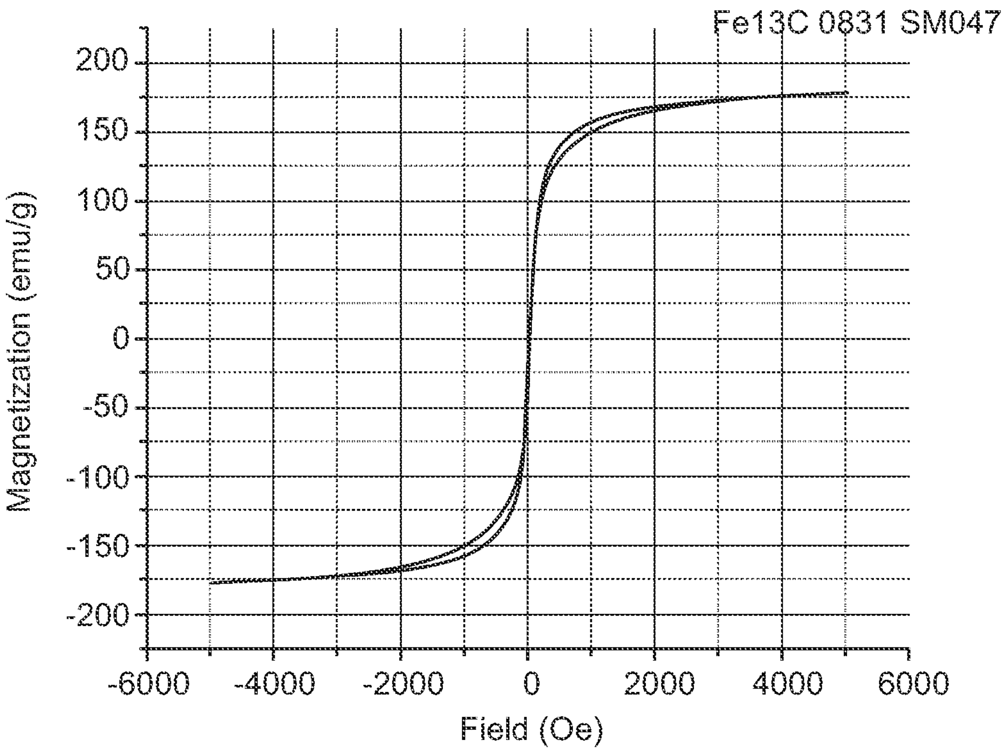
FIG. 56 is a plot of magnetization versus magnetic field for the iron-carbon nitrogen ribbon of FIG. 55.

The molten material was then melt spun using a Melt Spinner SC, available from Edmund Buhler GmbH. The gap distance was set at 0.3 mm and the wheel speed was about 50 Hz. The melting temperature was between about 1300° C. and about 1500° C., depending on the carbon content. The sample was prepared by oxidizing at 975° C. for 30 minutes and reducing at 350° C. for 2 hours in hydrogen gas prior to the nitriding in ammonia. The sample included some iron nitride, such as $Fe_3N$, $Fe_{16}N_2$, austenite iron nitride, and alpha Fe. FIG. 56 is a plot of magnetization versus magnetic field for the iron-carbon nitrogen ribbon of FIG. 55. As shown in FIG. 56, the sample exhibiting a saturation magnetization of about 176 emu/g and a coercivity of about 12 Oersteds.

Figure 57:
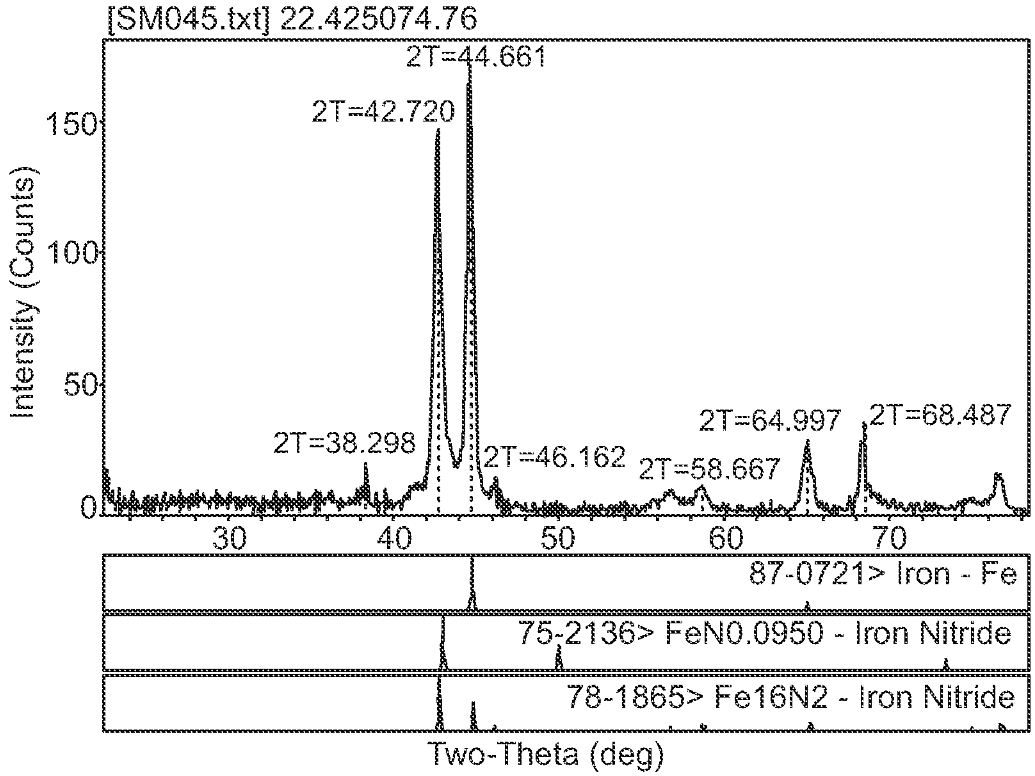
FIG. 57 is an x-ray diffraction plot for an iron-carbon-nitrogen ribbon including 9 atomic percent carbon after preparation that included arc melting of an iron-carbon mixture, melt spinning, and nitriding in ammonia at 150° C. for 10 hours.

FIG. 57 is an x-ray diffraction plot for an iron-carbon-nitrogen ribbon including 9 atomic percent carbon after preparation that included arc melting of an iron-carbon mixture, melt spinning, and nitriding in ammonia at 150° C. for 10 hours. Cast iron ingots with known carbon concentrations were wrapped in pure iron foils with selected thicknesses to achieve a desired carbon concentration. The ingots were melted in an arc melting machine (a SP-MSM20-7 compact vacuum arc melting system, available from MTI Corporation) at a temperature of about 1600° C. at 700 mTorr. Between 6 and 10 flips of the molten material were made to approach a homogeneous composition.

Figure 58:
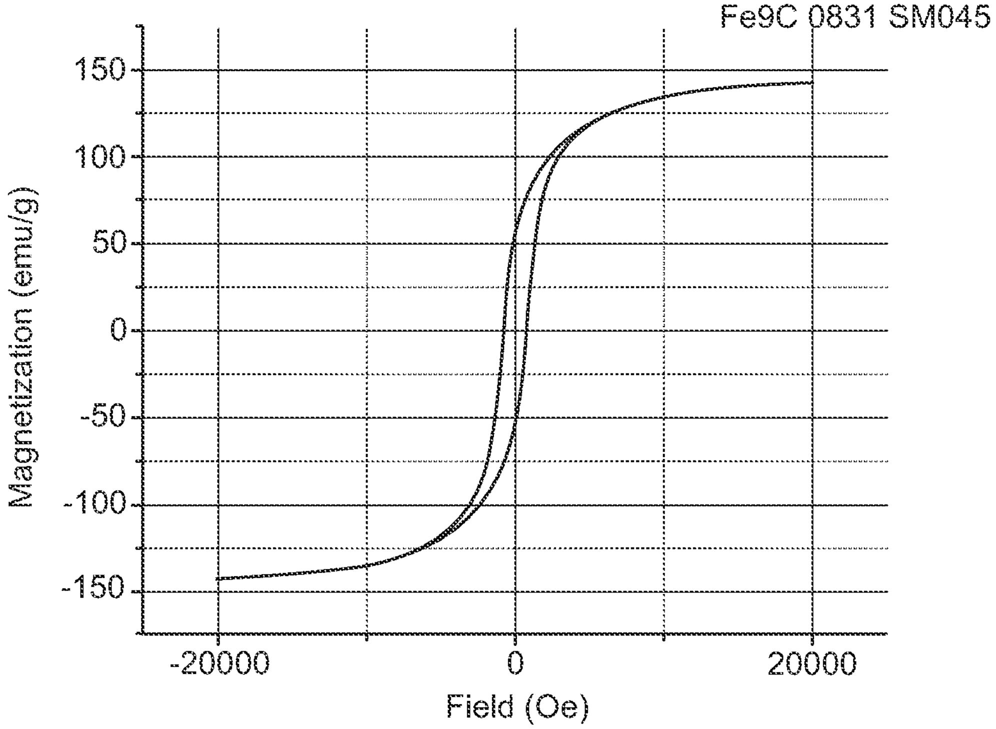
FIG. 58 is a plot of magnetization versus magnetic field for the iron-carbon nitrogen ribbon of FIG. 57.

The molten material was then melt spun using a Melt Spinner SC, available from Edmund Buhler GmbH. The gap distance was set at 0.3 mm and the wheel speed was about 50 Hz. The melting temperature was between about 1300° C. and about 1500° C., depending on the carbon content. The sample was prepared by oxidizing at 975° C. for 30 minutes and reducing at 350° C. for 2 hours in hydrogen gas prior to the nitriding in ammonia. The sample included some iron nitride, such as $Fe_3N$, $Fe_{16}N_2$, austenite iron nitride, and alpha Fe. FIG. 58 is a plot of magnetization versus magnetic field for the iron-carbon nitrogen ribbon of FIG. 57. As shown in FIG. 58, the sample exhibiting a saturation magnetization of about 142 emu/g and a coercivity of about 762 Oersteds.

Figure 59:
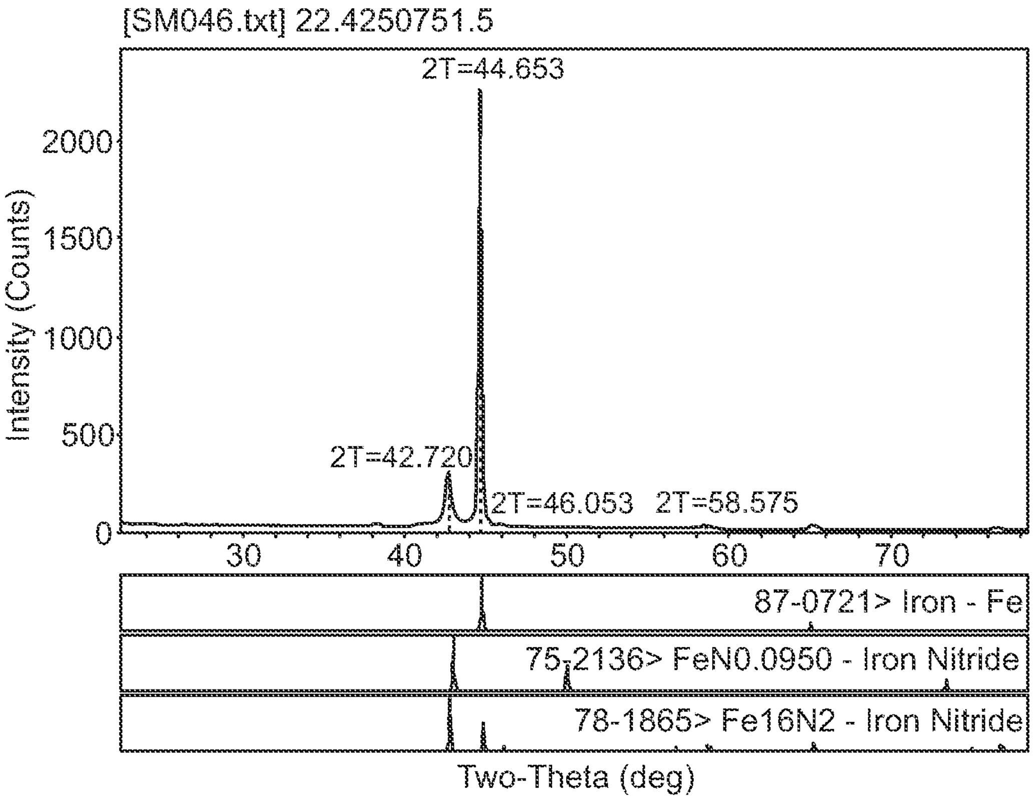
FIG. 59 is an x-ray diffraction plot for an iron-carbon-nitrogen ribbon including 11 atomic percent carbon after preparation that included arc melting of an iron-carbon mixture, melt spinning, and nitriding in ammonia at 150° C. for 10 hours.

FIG. 59 is an x-ray diffraction plot for an iron-carbon-nitrogen ribbon including 11 atomic percent carbon after preparation that included arc melting of an iron-carbon mixture, melt spinning, and nitriding in ammonia at 150° C. for 10 hours. Cast iron ingots with known carbon concentrations were wrapped in pure iron foils with selected thicknesses to achieve a desired carbon concentration. The ingots were melted in an arc melting machine (a SP-MSM20-7 compact vacuum arc melting system, available from MTI Corporation) at a temperature of about 1600° C. at 700 mTorr. Between 6 and 10 flips of the molten material were made to approach a homogeneous composition.

Figure 60:
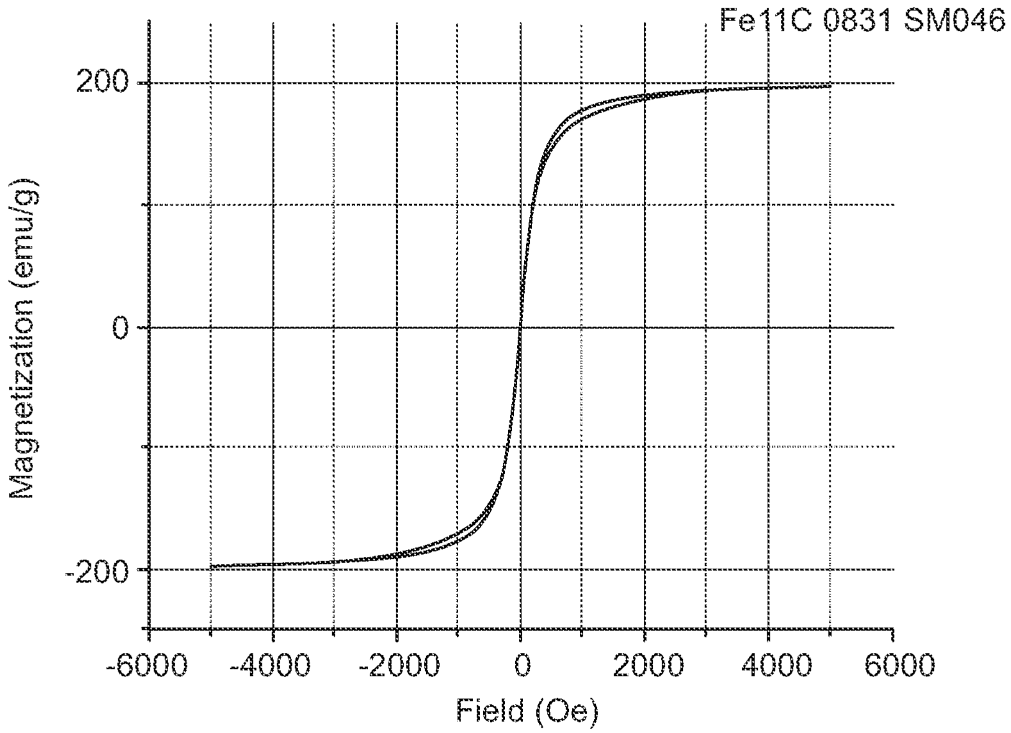
FIG. 60 is a plot of magnetization versus magnetic field for the iron-carbon nitrogen ribbon of FIG. 59.

The molten material was then melt spun using a Melt Spinner SC, available from Edmund Buhler GmbH. The gap distance was set at 0.3 mm and the wheel speed was about 50 Hz. The melting temperature was between about 1300° C. and about 1500° C., depending on the carbon content. The sample was prepared by oxidizing at 975° C. for 30 minutes and reducing at 350° C. for 2 hours in hydrogen gas prior to the nitriding in ammonia. The sample included some iron nitride, such as $Fe_3N$, $Fe_{16}N_2$, austenite iron nitride, and alpha Fe. FIG. 60 is a plot of magnetization versus magnetic field for the iron-carbon nitrogen ribbon of FIG. 59. As shown in FIG. 60, the sample exhibiting a saturation magnetization of about 198 emu/g and a coercivity of about 12 Oersteds.

Figure 61:
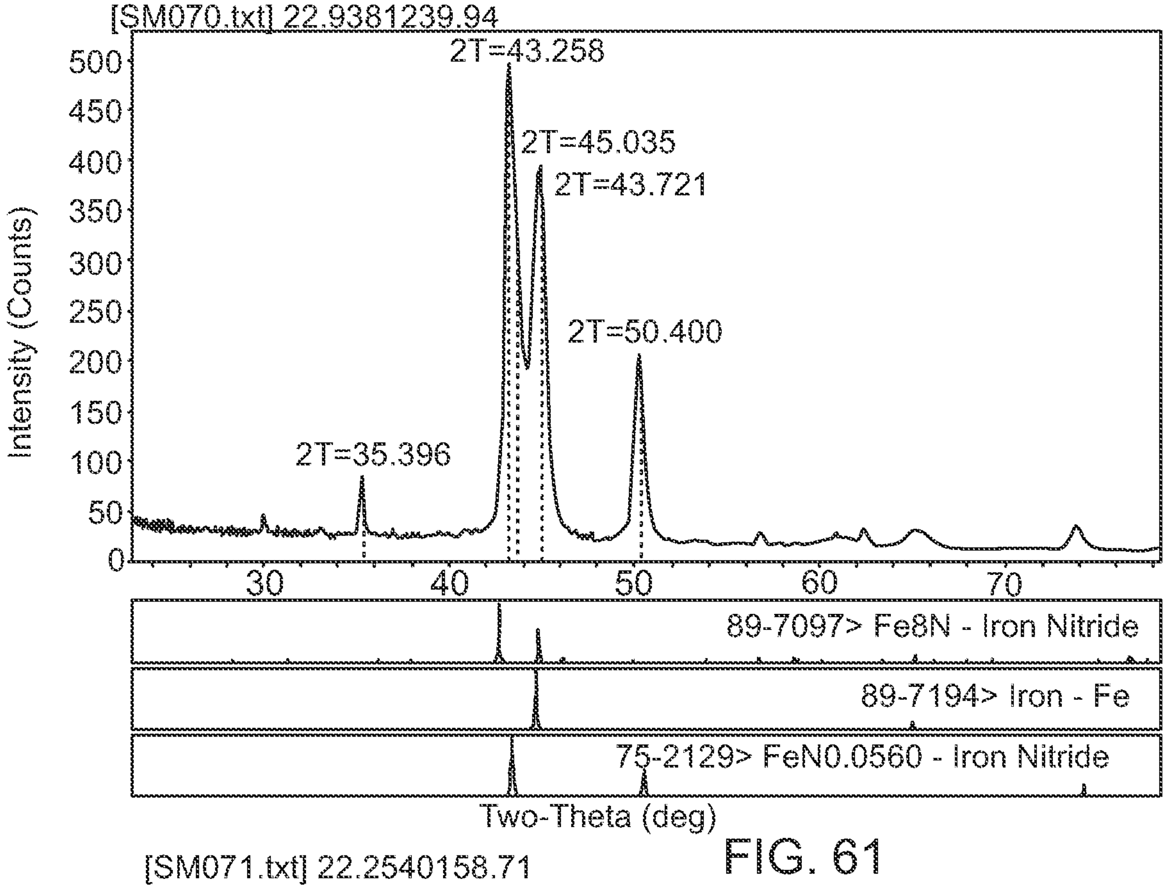
FIG. 61 is an x-ray diffraction plot for an iron-carbon-nitrogen ribbon including 11 atomic percent carbon after preparation that included arc melting of an iron-carbon mixture, melt spinning, and a high temperature nitriding process, with no liquid nitrogen quenching.

FIG. 61 is an x-ray diffraction plot for an iron-carbon-nitrogen ribbon including 11 atomic percent carbon after preparation that included arc melting of an iron-carbon mixture, melt spinning, and a high temperature nitriding process. Cast iron ingots with known carbon concentrations were wrapped in pure iron foils with selected thicknesses to achieve a desired carbon concentration. The ingots were melted in an arc melting machine (a SP-MSM20-7 compact vacuum arc melting system, available from MTI Corporation) at a temperature of about 1600° C. at 700 mTorr. Between 6 and 10 flips of the molten material were made to approach a homogeneous composition.

Figure 62:
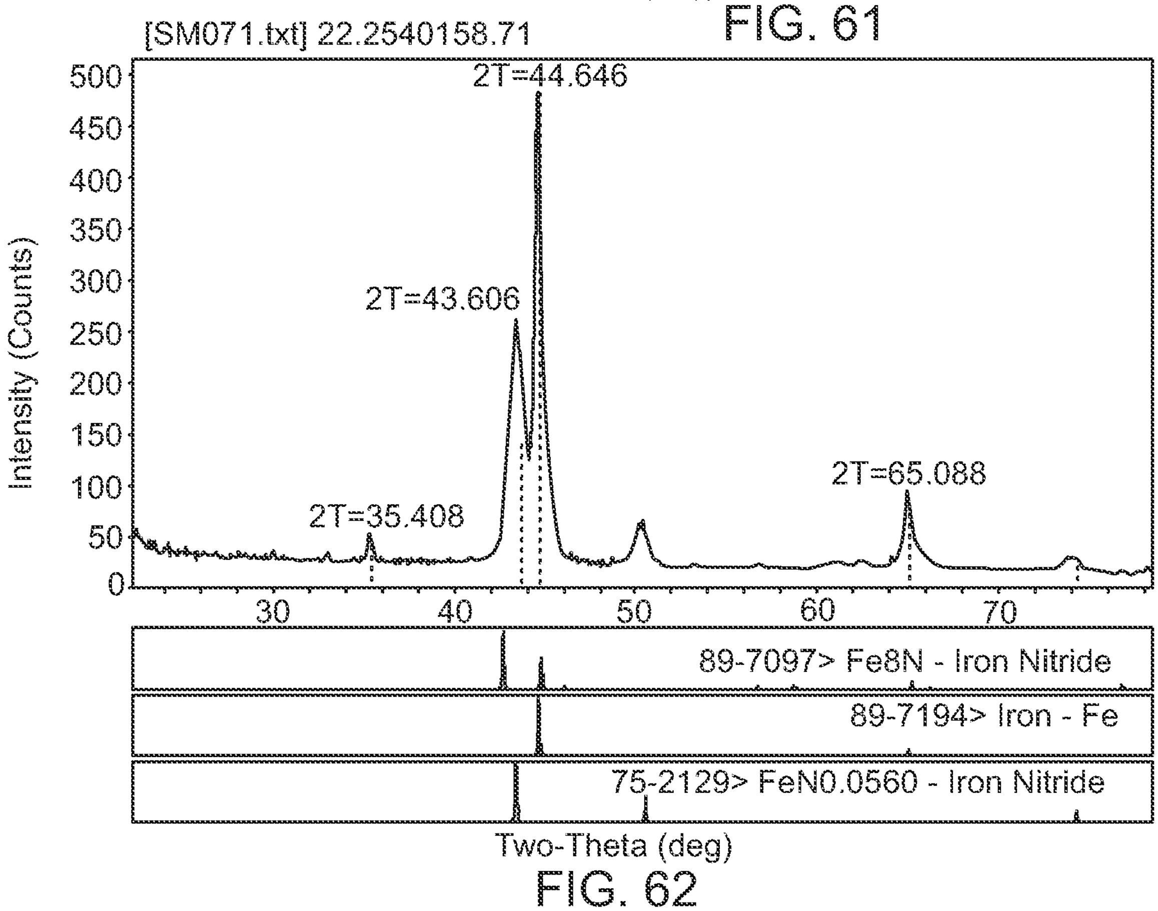
FIG. 62 is an x-ray diffraction plot for an iron-carbon-nitrogen ribbon including 11 atomic percent carbon after preparation that included arc melting of an iron-carbon mixture, melt spinning, and a high temperature nitriding process, with liquid nitrogen quenching after water cooling.

The molten material was then melt spun using a Melt Spinner SC, available from Edmund Buhler GmbH. The gap distance was set at 0.3 mm and the wheel speed was about 50 Hz. The melting temperature was between about 1300° C. and about 1500° C., depending on the carbon content. Iron-carbon-nitrogen ribbons were then formed by nitriding iron-carbon ribbons at 660° C. at 80 sccm $H_2$ and 20 sccm NH3 for 2 hours, followed by water cooling and, optionally, liquid nitrogen cryo-treatment. FIG. 61 is an x-ray diffraction plot for an iron-carbon-nitrogen ribbon including 11 atomic percent carbon after preparation that included arc melting of an iron-carbon mixture, melt spinning, and a high temperature nitriding process, with no liquid nitrogen quenching. FIG. 62 is an x-ray diffraction plot for an iron-carbon-nitrogen ribbon including 11 atomic percent carbon after preparation that included arc melting of an iron-carbon mixture, melt spinning, and a high temperature nitriding process, with liquid nitrogen quenching after water cooling.

Figure 63:
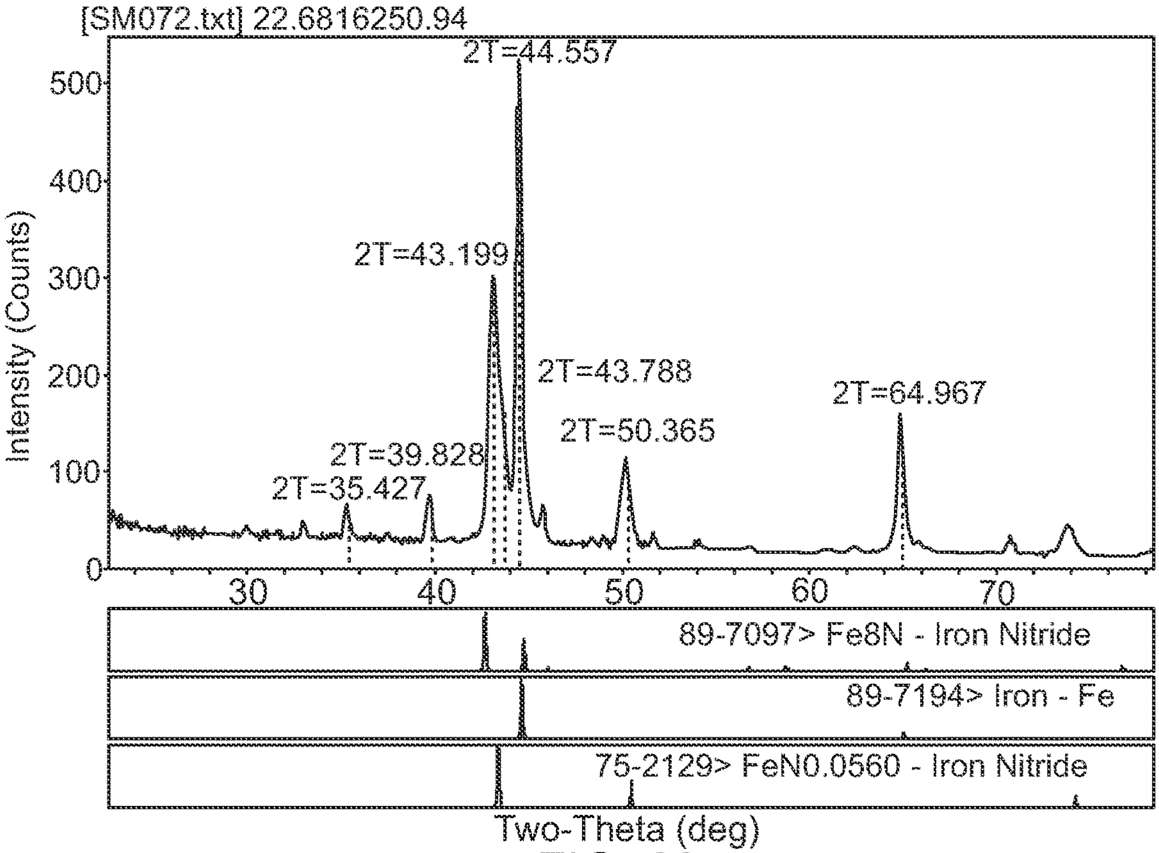
FIG. 63 is an x-ray diffraction plot for an iron-carbon-nitrogen ribbon including 13 atomic percent carbon after preparation that included arc melting of an iron-carbon mixture, melt spinning, and a high temperature nitriding process, with no liquid nitrogen quenching.
Figure 64:
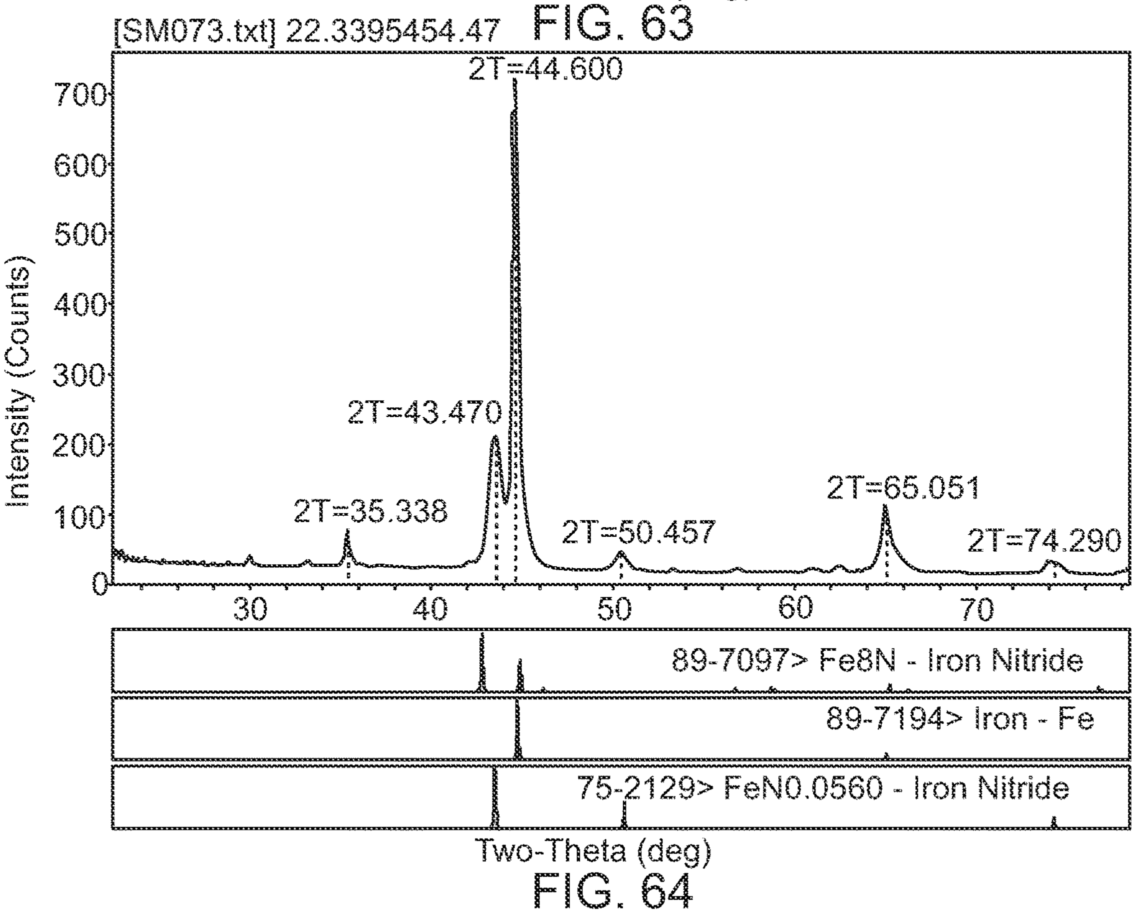
FIG. 64 is an x-ray diffraction plot for an iron-carbon-nitrogen ribbon including 13 atomic percent carbon after preparation that included arc melting of an iron-carbon mixture, melt spinning, and a high temperature nitriding process, with liquid nitrogen quenching after water cooling.

FIG. 63 is an x-ray diffraction plot for an iron-carbon-nitrogen ribbon including 13 atomic percent carbon after preparation that included arc melting of an iron-carbon mixture, melt spinning, and a high temperature nitriding process, with no liquid nitrogen quenching. FIG. 64 is an x-ray diffraction plot for an iron-carbon-nitrogen ribbon including 13 atomic percent carbon after preparation that included arc melting of an iron-carbon mixture, melt spinning, and a high temperature nitriding process, with liquid nitrogen quenching after water cooling. For all samples, the coercivity was about 100 Oersteds and a low magnetic saturation. However, the coercivity was larger than samples formed using the low temperature nitriding process.

The disclosure of each patent, patent application, and publication cited or described in this document are hereby incorporated herein by reference, in its entirety.

What is claimed is:

1. A method comprising:

forming a soft magnetic material by a technique comprising:

melting a precursor composition comprising iron to form a molten composition comprising iron, melt spinning the molten composition to form a melt-spun product, forming nano-pores in the melt-spun product, at least one of nitridizing the melt-spun product having the nano-pores, introducing N in the precursor composition, or introducing N in the molten composition, and at least one of introducing Z in the melt-spun product having the nano-pores, introducing Z in the precursor composition, or introducing Z in the molten composition, and wherein the soft magnetic material comprises at least one of:

at least one of an $\alpha''$-$Fe_{16}(N_xZ_{1-x})_2$ phase domain or an $\alpha'$-$Fe_8(N_xZ_{1-x})$, wherein x is a number greater than zero and less than one; or at least one of an $\alpha''$-$Fe_{16}N_2$ phase domain or an $\alpha'$-$Fe_8N$ phase domain, and at least one of an $\alpha''$-$Fe_{16}Z_2$ phase domain or an $\alpha'$-$Fe_8Z$ phase domain, wherein Z includes at least one of C, B, or O.

2. A method comprising:

forming a bulk soft magnetic material by a technique comprising:

melting a precursor composition comprising iron and carbon to form a molten composition comprising iron and carbon, melt spinning the molten composition to form a melt-spun product, forming nano-pores in the melt-spun product, nitridizing the melt-spun product having the nano-pores, introducing Z in the melt-spun product having the nano-pores, and compacting the melt-spun product having the nano-pores and including Z to form the bulk soft magnetic material, wherein the soft magnetic material comprises at least one of:

at least one of an $\alpha''$-$Fe_{16}(N_xZ_{1-x})_2$ phase domain or an $\alpha'$-$Fe_8(N_xZ_{1-x})$, wherein x is a number greater than zero and less than one; or at least one of an $\alpha''$-$Fe_{16}N_2$ phase domain or an $\alpha'$-$Fe_8N$ phase domain, and at least one of an $\alpha''$-$Fe_{16}Z_2$ phase domain or an $\alpha'$-$Fe_8Z$ phase domain, wherein Z includes at least O.

3. The method of claim 1, wherein the molten composition comprises carbon, and wherein forming the soft magnetic material by the technique comprising melt spinning comprises:

melt spinning the molten composition comprising iron and carbon to form iron-carbon ribbons; and nitriding the iron-carbon ribbons to form an iron-carbon-nitrogen material.

4. The method of claim 1, wherein the molten composition comprises carbon, and wherein forming the soft magnetic material by the technique comprising melt spinning comprises:

melt spinning the molten composition comprising iron and carbon to form iron-carbon ribbons;

ball milling the iron-carbon ribbons to form iron-carbon powder; and nitriding the iron-carbon powder.

5. The method of claim 3, wherein the precursor composition comprises cast iron.

6. The method of claim 1, wherein the soft magnetic material comprises at least one dopant, and wherein the at least one dopant comprises at least one of Cu, Co, Ti, Mn, Al, V, Cr, Zn, Ga, Ge, Zr, Nb, Mo, P, Si, or Mg.

7. The method of claim 1, further comprising:

assembling a plurality of the soft magnetic materials to form a bulk soft magnetic material.

8. The method of claim 1, wherein forming the soft magnetic material by the technique comprising melt spinning comprises:

melt spinning the molten composition comprising iron to form iron ribbons; and carburizing and nitriding the iron ribbons to form an iron-carbon-nitrogen material.

9. The method of claim 1, wherein the molten composition comprises nitrogen, and wherein forming the soft magnetic material by the technique comprising melt spinning comprises:

melt spinning the molten composition comprising iron and nitrogen to form iron-nitrogen ribbons; and carburizing the iron-nitrogen ribbons to form an iron-carbon-nitrogen material.

10. The method of claim 3, wherein nitriding the iron-carbon ribbons comprises exposing the iron-carbon ribbons to a nitrogen source at a temperature of between 650° C. and 900° C.

11. The method of claim 3, further comprising cryo-treating the iron-carbon-nitrogen material in liquid nitrogen.

12. The method of claim 3, further comprising annealing the iron-carbon-nitrogen material in a nitrogen-containing atmosphere at a temperature between 100° C. and 210° C. for between 5 hours and 100 hours.

13. The method of claim 3, further comprising, prior to nitriding the iron-carbon ribbons, exposing the iron-carbon ribbons to a reducing atmosphere to reduce a concentration of oxides in the iron-carbon ribbon.

14. The method of claim 3, further comprising, prior to nitriding the iron-carbon ribbons, leaching some carbon from at least a surface of the iron-carbon ribbons to create porosity in the iron-carbon ribbons.

15. The method of claim 4, wherein nitriding the iron-carbon powder comprises exposing the iron-carbon powder to a nitrogen source at a temperature between 100° C. and 210° C. for between 5 hours and 100 hours.

16. The method of claim 4, further comprising, prior to nitriding the iron-carbon powder, exposing the iron-carbon powder to a reducing atmosphere to reduce a concentration of oxides in the iron-carbon powder.

17. The method of claim 4, further comprising, prior to nitriding the iron-carbon powder, leaching some carbon from at least a surface of the iron-carbon powder to create porosity in the iron-carbon powder.

18. The method of claim 4, wherein the precursor composition comprises cast iron.

19. The method of claim 5, wherein the cast iron is encapsulated in elemental iron.

20. The method of claim 10, wherein the nitrogen source comprises at least one of ammonia, ammonium nitrate, urea, an amide, or hydrazine.

21. The method of claim 13, further comprising, prior to exposing the iron-carbon ribbons to the reducing atmosphere, exposing the iron-carbon ribbons to an oxidizing atmosphere to form oxides in the iron-carbon ribbons, wherein exposing the iron-carbon ribbons to the reducing atmosphere removes at least some of the formed oxides and forms the nano-pores in the iron-carbon ribbons.

22. The method of claim 15, wherein the nitrogen source comprises at least one of ammonia, ammonium nitrate, urea, an amide, or hydrazine.

23. The method of claim 16, further comprising, prior to exposing the iron-carbon powder to the reducing atmosphere, exposing the iron-carbon powder to an oxidizing atmosphere to form oxides in the iron-carbon powder, wherein exposing the iron-carbon powder to the reducing atmosphere removes at least some of the oxides and forms the nano-pores in the iron-carbon powder.

* * * * *